United States Patent
Nagai et al.

(10) Patent No.: US 8,238,835 B2
(45) Date of Patent: Aug. 7, 2012

(54) WIRELESS COMMUNICATION SYSTEM, WIRELESS TERMINAL STATION, WIRELESS BASE STATION, AND WIRELESS COMMUNICATION METHOD

(75) Inventors: Yukimasa Nagai, Tokyo (JP); Takahisa Yamauchi, Tokyo (JP); Tetsuya Kosaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 539 days.

(21) Appl. No.: 12/518,162

(22) PCT Filed: Dec. 5, 2007

(86) PCT No.: PCT/JP2007/073515
§ 371 (c)(1),
(2), (4) Date: Oct. 1, 2009

(87) PCT Pub. No.: WO2008/069245
PCT Pub. Date: Jun. 12, 2008

(65) Prior Publication Data
US 2010/0014463 A1  Jan. 21, 2010

(30) Foreign Application Priority Data

Dec. 7, 2006  (JP) ................................. 2006-331084
Apr. 27, 2007  (JP) ................................. 2007-120073

(51) Int. Cl.
*H04B 17/00* (2006.01)
(52) U.S. Cl. ..................................... 455/67.11; 455/423
(58) Field of Classification Search .................. None
See application file for complete search history.

(56) References Cited

U.S. PATENT DOCUMENTS

| | | | | |
|---|---|---|---|---|
| 2003/0195005 | A1* | 10/2003 | Ebata | ............................ 455/445 |
| 2004/0063430 | A1 | 4/2004 | Cave et al. | |
| 2006/0063492 | A1* | 3/2006 | Iacono et al. | .............. 455/67.11 |
| 2006/0268816 | A1 | 11/2006 | Adachi et al. | |

FOREIGN PATENT DOCUMENTS

| | | |
|---|---|---|
| JP | 2000 307494 | 11/2000 |
| JP | 2003 309508 | 10/2003 |
| JP | 2004 32062 | 1/2004 |
| JP | 2004-165834 | 6/2004 |
| JP | 2005 286866 | 10/2005 |
| JP | 2005 323219 | 11/2005 |
| JP | 2006 25335 | 1/2006 |
| JP | 2006 500873 | 1/2006 |

(Continued)

OTHER PUBLICATIONS

Japanese Decision of a Patent Grant issued Feb. 21, 2012 in patent application No. 2008-548316 with English translation.

(Continued)

*Primary Examiner* — John Blanton
*Assistant Examiner* — Alan Lindenbaum
(74) *Attorney, Agent, or Firm* — Oblon, Spivak, McClelland, Maier & Neustadt, L.L.P.

(57) ABSTRACT

A first wireless terminal station transmits beam transmission direction identification information in all directions. A second wireless terminal station receives the transmission direction identification information, combines reception direction identification information and the transmission direction identification information, and transmits directivity direction combination information to a wireless base station. The first and the second wireless terminal stations form directional beams in directions indicated by the directivity direction combination information to thereby perform a direct communication.

20 Claims, 55 Drawing Sheets

FOREIGN PATENT DOCUMENTS

| | | |
|---|---|---|
| JP | 2006 333271 | 12/2006 |
| JP | 2006 352296 | 12/2006 |
| JP | 2007 318433 | 12/2007 |
| WO | 2006/031499 A2 | 3/2006 |
| WO | 2008 029686 | 3/2008 |

OTHER PUBLICATIONS

U.S. Appl. No. 12/439,586, filed Mar. 2, 2009, Yamauchi, et al.

"Draft Amendment to Standard for Information Technology—Telecommunications and information exchange between systems—Local and metropolitan area networks—Specific requirement—Part 11: Wireless LAN Medium Access Control (MAC) and Physical Layer (PHY) specifications", IEEE P802.11n/D1.06, pp. i-xxv and 1-363, (Nov. 2006).

"High Rate Ultra Wideband PHY and MAC Standard", Standard ECMA-368 and 369, ECMA International, $3^{rd}$ Edition, pp. i-viii, 1-330, i-ii and 1-51, (Dec. 2, 2008).

Harada, Hiroshi et al.. "CoMPA PHY proposal", IEEE P802.15 Working Group for Wireless Personal Area Networks (WPANs), IEEE 802.15-07-0693-02-003c, Slides 1-111, (May 7, 2008).

* cited by examiner

FIG.6

| Element ID | Current Beam Number | Total Beam Number | Support Range | Beam Range | Switching Time | Device Discovery Support | Direct Transmission Support |
|---|---|---|---|---|---|---|---|
| | | | | | | | |

FIG.7

| INFORMATION ELEMENT | VALUE | REMARKS |
|---|---|---|
| Element ID | 0x1F | NOT PARTICULARLY LIMITED TO THIS VALUE. UNUSED OR RESERVED ID THAT CAN BE DISTINGUISHED FROM OTHER IEs CAN BE GIVEN. |
| Current Beam Number | b01 | VALUES OF DIRECTIONAL BEAM NUMBERS 0 TO 5 CURRENTLY IN USE |
| Total Beam Number | 6 | NUMBER OF DIRECTIONAL BEAMS THAT WIRELESS BASE STATION CAN CONTROL AND SWITCH IN PRESENT INVENTION, 6 |
| Support Range | 360 | RANGE PER ONE SYSTEM NUMERICAL VALUE TWO-DIMENSIONALLY INDICATING 360° CAN BE NOTIFIED THREE-DIMENSIONALLY |
| Beam Range | 60 | RANGE PER ONE DIRECTIONAL BEAM NUMERICAL VALUE TWO-DIMENSIONALLY INDICATING 60° CAN BE NOTIFIED THREE-DIMENSIONALLY |
| Switching Time | 1 $\mu$ sec | MINIMUM TIME REQUIRED FOR SWITCHING BEAM (OR SWITCHING TIME FOR REQUEST FROM SYSTEM) IN PRESENT INVENTION, SET TO 1 $\mu$ sec |
| Device Discovery Support | 1 | WHETHER Device Discovery FUNCTION FOR SEARCHING FOR OTHER WIRELESS TERMINALS IS SUPPORTED 1: Support 0: Non-support |
| Direct Transmission Support | 1 | WHETHER INTER-TERMINAL COMMUNICATION IS SUPPORTED<br><br>IN CASE OF WIRELESS BASE STATION 1: Support, AS SYSTEM, INTER-TERMINAL COMMUNICATION IS PERMITTED 0: Non-support, AS SYSTEM, INTER-TERMINAL COMMUNICATION IS REJECTED<br><br>IN CASE OF WIRELESS TERMINAL STATION 1: Support, OWN TERMINAL COPES WITH INTER-TERMINAL COMMUNICATION 0: Non-support, OWN TERMINAL DOES NOT COPE WITH INTER-TERMINAL COMMUNICATION |

| Element ID | Station Number (2) | MAC ID (WIRELESS TERMINAL STATION 1) | MAC ID (WIRELESS TERMINAL STATION 2) | Combination Map |

FIG.33

| Value | Frame Type |
|---|---|
| 0 | Beacon |
| 1 | Control frame |
| 2 | Command frame |
| 3 | Aggregation Data frame |
| 4 | Aggregation Data + ACK (ADDED ANEW) |
| 5 | Aggregation Data + Command (ADDED ANEW) |

FIG.39

| Value | Frame Type |
|---|---|
| 0 | Beacon |
| 1 | Control frame |
| 2 | Command frame |
| 3 | Aggregation Data frame |
| 4 | Aggregation Data + ACK (ADDED ANEW) |
| 5 | Aggregation Data + Command (ADDED ANEW) |

FIG.50

| Element ID (INDICATE ENTRY CONTROL IE) | Length (INDICATE LENGTH OF ELEMENT) | STANDBY TIME | LONGEST WAITING TIME | CONNECTABLE CLASS/ENTRY CONTROL CLASS |
|---|---|---|---|---|

FIG.51

| Element ID (INDICATE VENDOR INDEPENDENT EXTENDED IE) | Length | Type | Vendor OUI | Vender Specific Information |
|---|---|---|---|---|

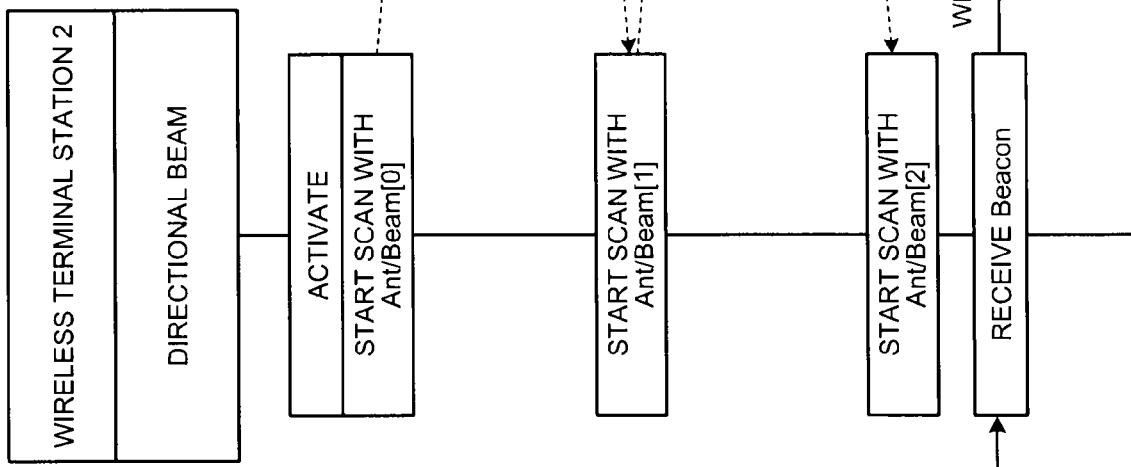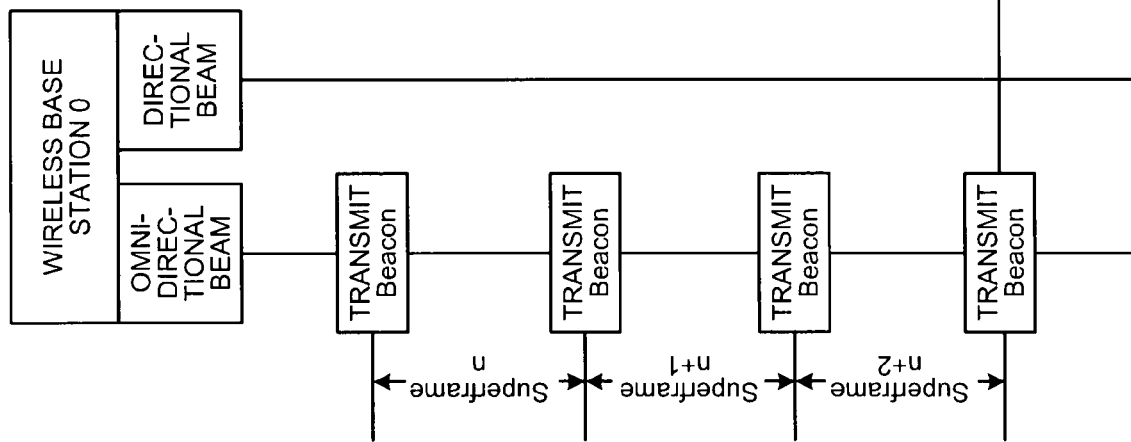
FIG.54

WIRELESS COMMUNICATION SYSTEM, WIRELESS TERMINAL STATION, WIRELESS BASE STATION, AND WIRELESS COMMUNICATION METHOD

TECHNICAL FIELD

The present invention relates to a wireless communication system that performs communication using directional beams, and, more particularly to a wireless communication terminal station that has a function of specifying a combination of directional beams that wireless terminal stations covered by a common wireless base station use when the wireless terminal stations perform direct communication.

BACKGROUND ART

Most of antennas used in conventional wireless LAN (Local Area Network) systems and Ultra-wideband (UWB) wireless systems depend on characteristics of frequency bands used in the systems and have directivity of relatively wide angles. Therefore, applications that can be used in and environments that can be applied to the systems are varied and expected to continue to spread in future. However, there is an increasing demand for an increase in transmission speed of wireless communication in recent years. Wireless communication systems that use a millimeter wave band and the like in which an ultra-wideband can be secured are examined (e.g., IEEE 802.15.3c).

Compared with a microwave band, the millimeter wave band has advantages that directivity is high and the influence of interference is small, and security can be assured. In the past, as an alternative of wired communication, the millimeter wave band is used in a part of inter-building communication (see FIG. 59), a video transmission system for home televisions, and the like. As standards, "ARIB STD-T69", "ARIB STD-T74", and the like are specified.

In general, attenuation of power in a space is larger in the millimeter wave band compared with the microwave band and the like. Therefore, communication areas are limited and environments of use and applications are limited. Because of a relatively narrow directional pattern (also referred to as directional beam or antenna beam), a carrier or the like needs to set a wireless apparatus with directivity thereof adjusted in advance.

On the other hand, after the wireless apparatus is set, it is likely that adjustment of directivity is necessary because of a change in environment or the like. Therefore, a technology for realizing efficient adjustment of directivity is also examined (e.g., Patent Documents 1 and 2). Patent Document 1 discloses a technology for, in parallel to path control, realizing efficiency by adjusting directivity using a general antenna control technology. Patent Document 2 discloses a technology for setting directional beams opposite to each other between terminal stations by controlling directional antennas based on location information or the like received from communication partners.

In the past, to realize improvement of physical transmission speed, a multi-value modulation system, spatial multiplexing (MIMO), wider band, and the like have been adopted. To realize MAC efficiency matching the transmission speed, configuration of Superframe, improvement an access system, improvement of an ARQ system, and the like have been performed for each of systems.

Among the measures, as a MAC technology for improving transmission efficiency according to transmission speed, a frame aggregation technology for coupling a plurality of short packets as one large packet and transmitting the packet is proposed. In the conventional wireless LAN system, an A-MSDU (Aggregate MAC Service Data Unit) system and an A-MPDU (Aggregate MAC Protocol Data Unit) system are proposed in a standard called IEEE 802.11n (e.g., Nonpatent Document 1). A frame aggregation technology for MSDU is also proposed in an ultra-wideband wireless system (see Nonpatent Document 2).

Patent Document 1: Japanese Patent Application Laid-open No. 2003-309508
Patent Document 2: Japanese Patent Application Laid-open No. 2004-32062
Nonpatent Document 1: IEEE 802.11n-Draft1.06, Section 7.2.2.1, A-MSDU, Section 7.4 A-MPDU
Nonpatent Document 2: High Rate Ultra-wideband PHY and MAC Standard, (ECMA-368, 369)

DISCLOSURE OF INVENTION

Problem to be Solved by the Invention

However, the wireless communication systems disclosed in Patent Documents 1 and 2 are not devised for a multiple access system for, for example, covering a plurality of wireless terminal stations and are not devised for wireless terminal stations to perform communication within an allocated time period according to the control by a wireless base station.

In the wireless communication system disclosed in Patent Document 2, there is a description concerning a control technology for a directional antenna used for communication in the millimeter wave band. Because a control signal in a unidirectional frequency band (a frequency band lower than the millimeter wave band) to control the directional antenna, there is a problem in that cost increases because, for example, a terminal station needs to have a plurality of modems and control units.

Concerning transmission efficiency, problems explained below are present.

A PHY frame format specified in the ultra high-speed wireless LAN includes, as shown in FIG. 60, a Preamble section for synchronization, a PLCP Header section including a modulation system/an encoding ratio for the following PSDU section, a PSDU length, and the like, and a PSDU section as a data section. Tail Bits and Pad bits are added as required. The PSDU section includes a MAC header, an MSDU of an actual data portion, and an FCS (Frame Check Sequence) for determining correctness of an MPDU. Therefore, the PHY frame format is a frame format in which an A-MSDU or an A-MPDU is extremely easily established.

However, in general, a PSDU is transmitted in a transmission system/an encoding ratio higher in efficiency than a PLCP Header. Therefore, although a large number of pieces of information can be efficiently transmitted, a BER (Bit Error Rate) is low compared with the PLCP Header. Therefore, although the PLCP Header is normally received, when an error is caused in the MPDU because of an FCS, in some case, information in the MAC Header cannot be read.

In that case, on a reception side of a frame, although the presence of the frame can be detected, in addition to a problem in that a Frame Body cannot be simply decoded, a problem occurs in that control information included in the MAC Header (e.g., virtual carrier sense information and destination/transmission source addresses) cannot be received and necessary minimum information cannot be acquired. When an MSDU length increases, for example, when the A-MSDU is used, although MAC efficiency is improved, there is a problem in that robustness of the MAC Header falls.

On the other hand, the PHY frame format specified in the ultra-wideband wireless system includes the MAC Header in the PLCP Header. Therefore, the MAC Header can be transmitted with relatively robust transmission system/encoding ratio. However, in the frame aggregation technology proposed in the ultra-wideband wireless system, plural MSDUs are aggregated and the MAC Header and the FCS are added to the aggregated frames. Therefore, there is a problem in that, in a situation in which a propagation path is deteriorated, a frame length cannot be increased or frame retransmission is often performed and throughput is not increased. Further, because a target of frame aggregation is only a Data frame, frame aggregation with other ACK frames and Command frames cannot be performed. Therefore, for example, there is a problem in that, when bidirectional traffic occurs, it is necessary to transmit an ACK frame responding to a received frame separately from an aggregated data frame.

The present invention has been devised in view of the above and it is an object of the present invention to obtain a wireless communication system that realizes control of a directional antenna without requiring a special configuration and realizes direct communication among wireless terminal stations. It is also an object of the present invention to obtain a wireless communication system that can cover a wide area and a plurality of wireless terminal stations while securing high transmission speed and confidentiality by using a millimeter band. It is also an object of the present invention to obtain a wireless communication system, a wireless terminal station, a wireless base station, and a wireless communication method that efficiently use a band. Further, it is an object of the present invention to realize highly efficient transmission by aggregating a plurality of frames or fragmenting to transmit the frames.

Means for Solving Problem

To solve the above problems and to achieve the object, the present invention relates to a wireless communication system including a wireless terminal station that performs a communication using directional beams formed in a plurality of directions. The wireless terminal station includes at least a first wireless terminal station that transmits beam transmission direction identification information in all directions, in which the information can be transmitted, over a period designated from a wireless base station covering the first wireless terminal station at a beam switching execution interval notified to the wireless base station in advance, and a second wireless terminal station that performs, when the second wireless terminal station is covered by the wireless base station together with the first wireless terminal station, a reception operation for the transmission direction identification information, which is transmitted from the first wireless terminal station, in all reception directions over a period designated from the wireless base station at an antenna switching execution interval designated from the wireless base station, combines reception direction identification information and the transmission direction identification information at the reception of the transmission direction identification information to specify the combined reception direction identification information and the transmission direction identification information as directivity direction combination information, and transmits the directivity direction combination information to the first wireless terminal station. The wireless communication system further includes a wireless base station that determines the period and the antenna switching execution interval based on a number of directivity directions of directional beams notified from the first and second wireless terminal stations and the beam switching execution interval. The first wireless terminal station and the second wireless terminal station form the directional beams in directions indicated by the directivity direction combination information to thereby perform a direct communication.

Effect of the Invention

According to the present invention, the wireless communication terminal stations covered by the same base station exchange information concerning directional beams and, in direct communication, share the information of directional beams each other. Therefore, there is an effect that it is possible to realize direct communication using the directional beams. There is also an effect that it is possible to efficiently use a band compared with communication performed via the base station.

BRIEF DESCRIPTION OF DRAWINGS

FIG. 6 is a diagram of a configuration example of an independently defined IE (DBIE).

FIG. 7 is a table of an example of information included in the DBIE.

FIG. 33 is a diagram of a Frame Type field encoding example.

FIG. 39 is a diagram of a Frame Type field encoding example.

FIG. 50 is a diagram of a configuration example of an entry restricting IE.

FIG. 51 is a diagram of a configuration example of a vendor independent extended IE.

FIG. 54 is a diagram of an example of a sequence of a wireless terminal station in making connection to the wireless base station.

EXPLANATIONS OF LETTERS OR NUMERALS

Figure 1:
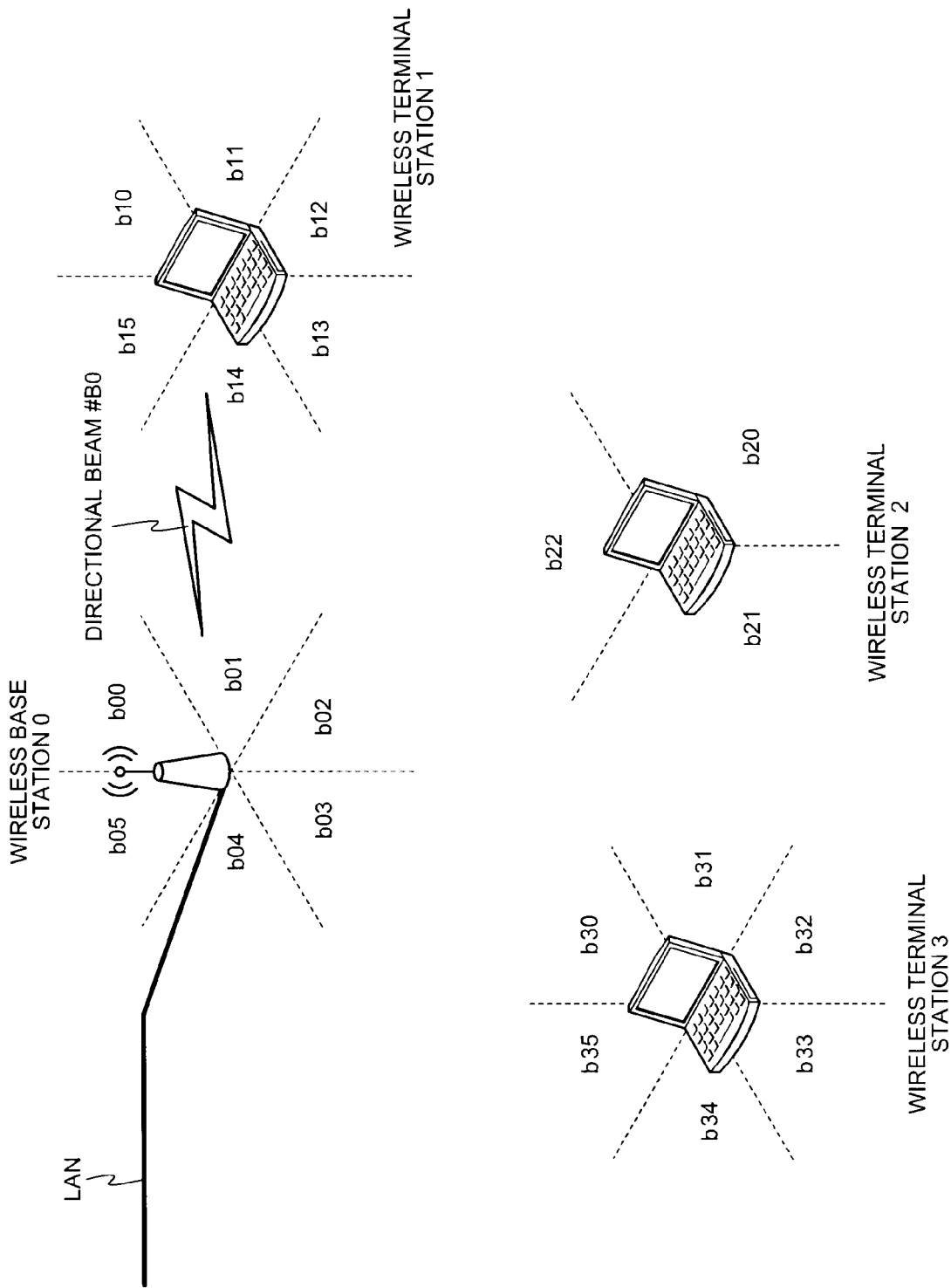
FIG. 1 is a diagram of a configuration example of a first embodiment of a wireless communication system according to the present invention.

0 wireless base station
1, 2, 3, 4 wireless terminal stations
10 interface unit
20 information storing unit
30 MAC control unit
31 scheduler
32 frame analyzing unit
33 retransmission control unit
34 data processing unit
40 modulating and demodulating unit
41 transmitting unit
42 receiving unit
43 quality measuring unit
50, 50a beam control units
60 antennas (antenna unit)
70 non-directional antenna unit

BEST MODE(S) FOR CARRYING OUT THE INVENTION

Embodiments of a wireless communication system according to the present invention are explained in detail below with reference to the drawings. The present invention is not limited by the embodiments.

First Embodiment

FIG. 1 is a diagram of a configuration example of a first embodiment of a wireless communication system according to the present invention. This wireless communication system includes a wireless base station (which may also be referred to as PNC or AP) 0 connected to, for example, a LAN as a wired network and a plurality of wireless terminal stations (which may also be referred to as DEV or STA) 1, 2, and 3 set in a service area of the wireless base station 0. In FIG. 1, areas divided by dotted lines arranged around the wireless base station 0 indicate directions of directional beams set for convenience in this embodiment. This indicates that, when the wireless base station 0 transmits data or the like in the respective directions, the wireless base station 0 can transmit the data or the like using directional beams formed in desired directions by setting directional beams of beam numbers (b00, b01, . . . , and b05) shown in the areas. The same applies to dotted lines arranged around the respective wireless terminal stations 1, 2, and 3. The directional beams can be something like beam forming formed by a plurality of antennas. Alternatively, a plurality of directional antennas can be provided and switched to create directional beams.

The wireless terminal stations 1 to 3 are information terminals such as personal computers, televisions, videos, and music players. The wireless base station 0 is connected to a wired network (LAN) in this embodiment. However, like the wireless terminal stations 1 to 3, the wireless base station 0 can be information terminals such as personal stations, televisions, videos, and music players. An interface of the network can be an interface for wireless connection rather than wired connection.

The wireless base station 0 performs communication with the wireless terminal stations 1 to 3 using directional beams. In FIG. 1, a state in which the wireless base station 0 and the wireless terminal station 1 perform communication using a directional beam #B0 is shown. As an example, a directional beam that the wireless base station 0 uses to communicate with the wireless terminal station 1 is represented as directional beam #b01 and a directional beam that the wireless terminal station 1 uses to communicate with the wireless base station 0 is represented as directional beam #b14. Because the wireless base station 0 and the wireless terminal station 1 use the directional beam, in FIG. 1, the wireless base station 0 and the wireless terminal station 1 perform communication after performing control for setting directivities thereof opposite to each other.

In this embodiment, the wireless terminal stations 1, 2, and 3 are the information terminals explained above. However, if the wireless terminal stations 1, 2, and 3 are once set, set potions are less easily changed. Therefore, an optimum direction and an optimum directional beam are present for each of the wireless terminal stations set in difference places.

In an example explained in this embodiment, a directional beams of the wireless base station 0 is divided into six directional beams (directional beams #b01 to #b05) in advance for convenience. However, directional beams that can be provided by the wireless base station 0 are not limited to the number described in this embodiment. The directional beams can be divided into a finite number of directions and a finite number of patterns in advance or can be adjusted to a finite number of directions and a finite number of patterns for each of the wireless terminal stations (a different direction and a different pattern are changed as appropriate for each of the wireless terminal stations that perform communication).

When the wireless terminal stations 2 and 3 perform communication with the wireless base station 0 corresponding thereto, as in the communication between the wireless base station 0 and the wireless terminal station 1, directional beams are used. However, directions and patterns of the directional beams of the respective wireless terminal stations are not limited to those shown in FIG. 1.

In this embodiment, wireless base stations and wireless terminal stations are distinguished explained as an infrastructure mode. However, the present invention is not limited to this. For example, the present invention is also applicable to a network form in which a wireless terminal station adaptively operates as a wireless base station or applicable to an Ad-hoc mode in which wireless terminal stations cooperatively operate in an autonomous distributed manner.

Figure 2:
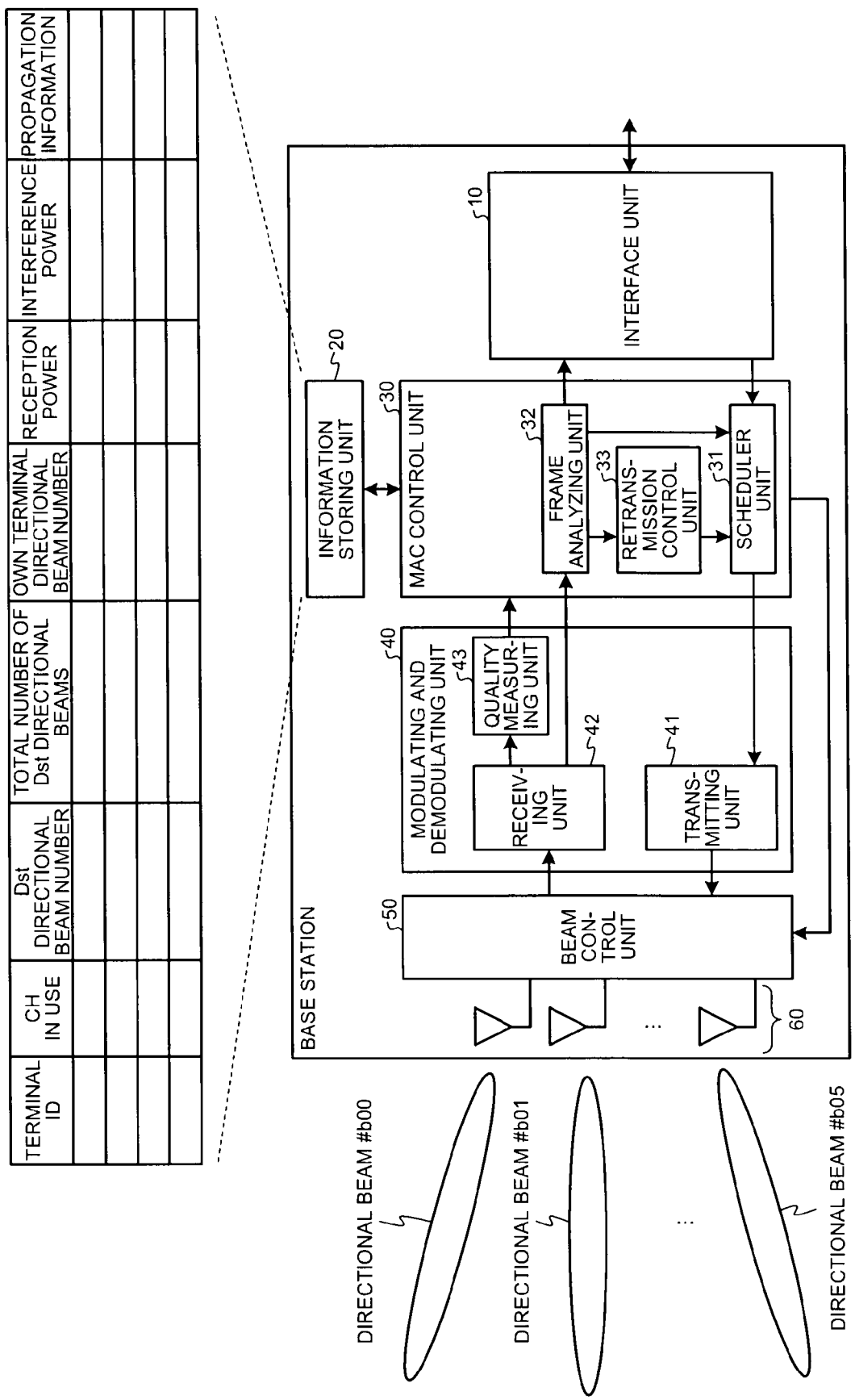
FIG. 2 is a diagram of a circuit configuration example of a wireless base station.

FIG. 2 is a diagram of a circuit configuration example of the wireless base station 0. The wireless base station 0 includes an interface unit 10 that performs input and output control for a wired network and apparatuses, an information storing unit 20 that stores information concerning antennas and directional beam directions, a MAC control unit 30 that performs access control for transmission and reception, a modulating and demodulating unit 40 that performs modulation and demodulation of transmission and reception signals, a beam control unit 50 that performs selection and control of directional beams according to antenna selection or antenna adjustment, and a plurality of antennas (an antenna unit) 60 commonly used for transmission and reception. The wireless base station 0 can transmit and receive a plurality of directional beams.

The MAC control unit 30 includes a scheduler unit 31 that determines transmission timing for data, a frame analyzing unit 32 that analyzes contents of a received frame, and a retransmission control unit 33 that instructs retransmission of a frame when retransmission of a received frame is necessary. The modulating and demodulating unit 40 includes a transmitting unit 41 that performs error correction and modulation for transmission data, a receiving unit 42 that analyzes received data and performs demodulation and error correction, and a quality measuring unit 43 that measures a quality of a received frame according to information such as reception power, S/N, and S/N from the receiving unit 42.

The antenna unit 60 includes antennas for transmitting and receiving data to and from other wireless communication apparatuses (other wireless base stations and wireless terminal stations) and is controlled by the beam control unit 50. The antennas included in the antenna unit 60 are phased array antennas that have directivity and are variable in an orientation. The antennas can be directional antennas that can mechanically change an orientation with a motor or the like. Further, the antennas can be directional antennas that include a plurality of directional antennas and can change an orientation by adaptively switching the antennas.

Transmission and reception operation for data in the wireless base station 0 having the configuration is explained with reference to FIG. 2.

When the interface unit 10 includes, as an example, an interface to a wired LAN, the interface unit 10 applies frame check to data input from a wired LAN and, after performing processing for a header and the like, passes the data to the MAC control unit 30. The interface unit 10 outputs received data (from a wireless terminal station) received from the MAC control unit 30 to the wired LAN after adding a header and a frame check sequence to change the received data to a format of the wired LAN. As other examples, interfaces for information terminals such as PCMCIA, USB, IEEE1394, SDI/O, and HDMI can also be mounted During data transmission to the wireless base terminals, after adding a MAC header and a frame check sequence to data received from the interface unit 10, the MAC control unit 30 passes the data to the transmitting unit 41 of the modulating and demodulating unit 40 according to timing determined by the scheduler unit 31. When the data is passed to the transmitting unit 41, the information storing unit 20 reads out information concerning a directional beam number of a transmission partner and notifies the beam control unit 50 of the directional beam number with which the wireless base station 0 desires to transmit the data. For example, when the wireless base station 0 transmits the data to the wireless terminal station 1 in a state in which the respective apparatuses are set as shown in FIG. 1, the MAC control unit 30 notifies the beam control unit 50 to use the "directional beam #b01".

During data reception, the MAC control unit 30 also notifies the beam control unit 50 of a beam direction in which the wireless base station 0 desires to perform reception. For example, when the wireless base station 0 receives data from the wireless terminal station 1 in a state in which the respective apparatuses are set as shown in FIG. 1, data from the wireless terminal station 1 can be received by turning directivity to the direction of the directional beam #b01. The received data is passed from the modulating and demodulating unit 40 to the MAC control unit 30. The MAC control unit 30 checks, with the frame analyzing unit 32, a frame check sequence and a destination address in a MAC header. As a result, when a frame is wrong or when the frame is directed to a terminal other than the own terminal, the MAC control unit 30 discards the frame. When NACK is returned, the MAC control unit 30 notifies the retransmission control unit 33 to that effect and instructs the retransmission control unit 33 to retransmit the data. If the frame requires a response, the MAC control unit 30 instructs the retransmission control unit 33 to transmit a response frame at timing notified to the scheduler unit 31. The frame analyzing unit 32 passes a normally-received data frame to the interface unit 10.

Further, the MAC control unit 30 receives information concerning a reception quality measured by the quality measuring unit 43 of the modulating and demodulating unit 40 and records, as required, information such as a terminal ID (an identification number), a CH number, a directional beam number, a total number of directional beams at a communication destination, a reception power value, and an interference power value included in the information in the information storing unit 20 and updates the information. By performing such operation, the MAC control unit 30 controls directional beams using the information read out from the information storing unit 20 and performs a communication with a desired wireless terminal station.

The configuration of the base station 0 and the operation of the respective units of the base station 0 during data transmission and reception are explained above. The same applies to configurations of the wireless terminal stations 1 to 3 and operation of respective units of the wireless terminal stations 1 to 3. The number of antennas and the number of directional beams can be different between the wireless base station 0 and the respective wireless terminal stations.

Figure 3:
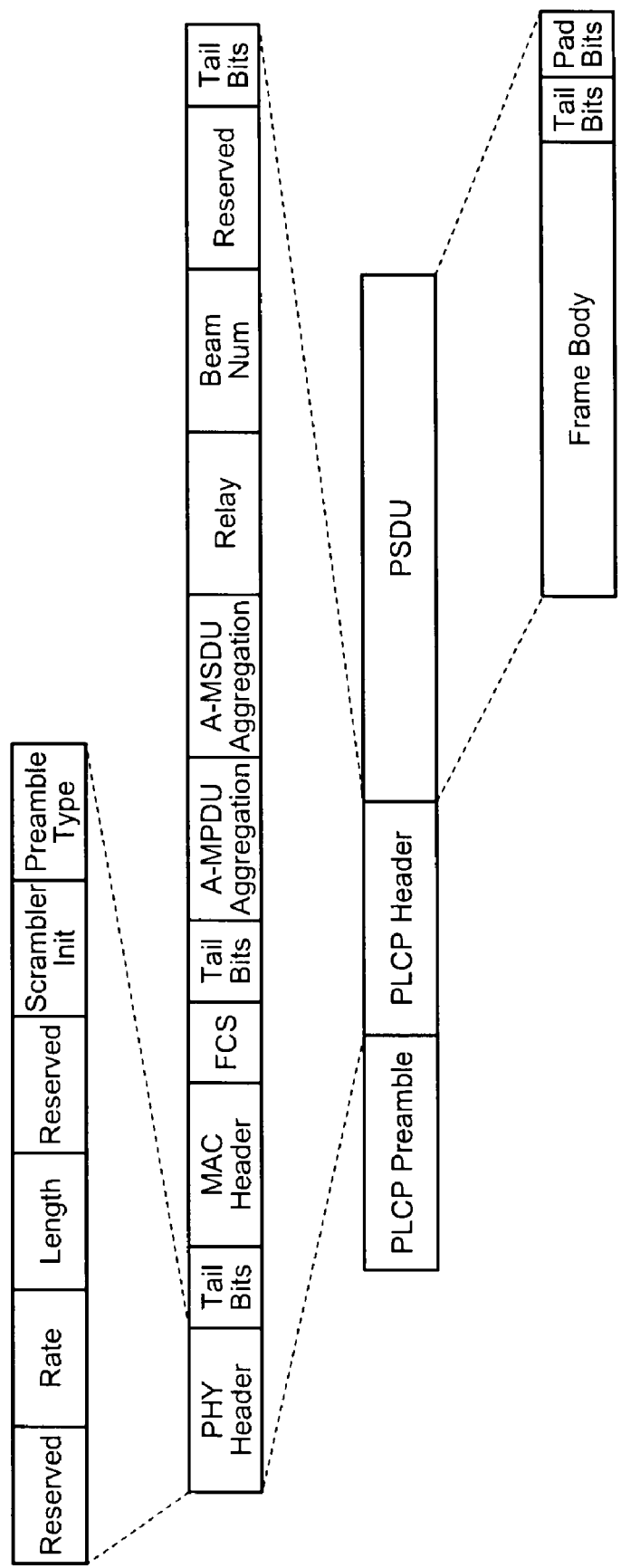
FIG. 3 is a diagram of an example of a PHY frame format exchanged between the wireless base station and a wireless terminal station.

FIG. 3 is a diagram of an example of a PHY frame format exchanged between the wireless base station 0 and the respective wireless terminal stations 1 to 3. A PHY frame includes a PLCP (Physical Layer Convergence Protocol) preamble section for performing time synchronization, frequency synchronization, AGC, carrier detection, and the like, a PLCP header section including information for demodulating a PSDU (PLCP Protocol Data section), a frame body section, and a PSDU section including Tail bits and Pad bits that are added as required.

The PLCP header section includes a PHY header including Rate information for demodulating the PSDU section, Length information indicating PSDU length, and preamble type information, directional beam number information (Beam Num), a MAC header that is added as required, an FCS (Frame Check Sequence), and Tail bits. On a data reception side, demodulation of the PSDU section after that is performed based on the Rate information, the Length information, a scrambler initial value (Scrambler Init), and a preamble type included in the PHY header. "Beam Num", "A-MPDU Aggregation", "A-MSDU Aggregation", and "Relay" can be included in the MAC header or information elements rather than the PLCP header. The information elements of the PLCP header are not limited to this format. A part of parameters can be deleted for an increase in efficiency or, if necessary information is included in the information elements, the information elements do not have to be this format. The directional beam number information is stored in an information storing unit (in the case of the base station, the information storing unit 20 shown in FIG. 2) together with "MAC ID" included in the MAC header.

The PSDU section includes a frame body of the MAC frame, Tail bits, and Pad bits. When the PLCP header section does not include the MAC header, the PSDU section includes the MAC header.

By including an identification code such as a spread code in a PLCP preamble section, it is also possible to embed the directional beam number information and the like in the PLCP preamble section.

Figure 4:
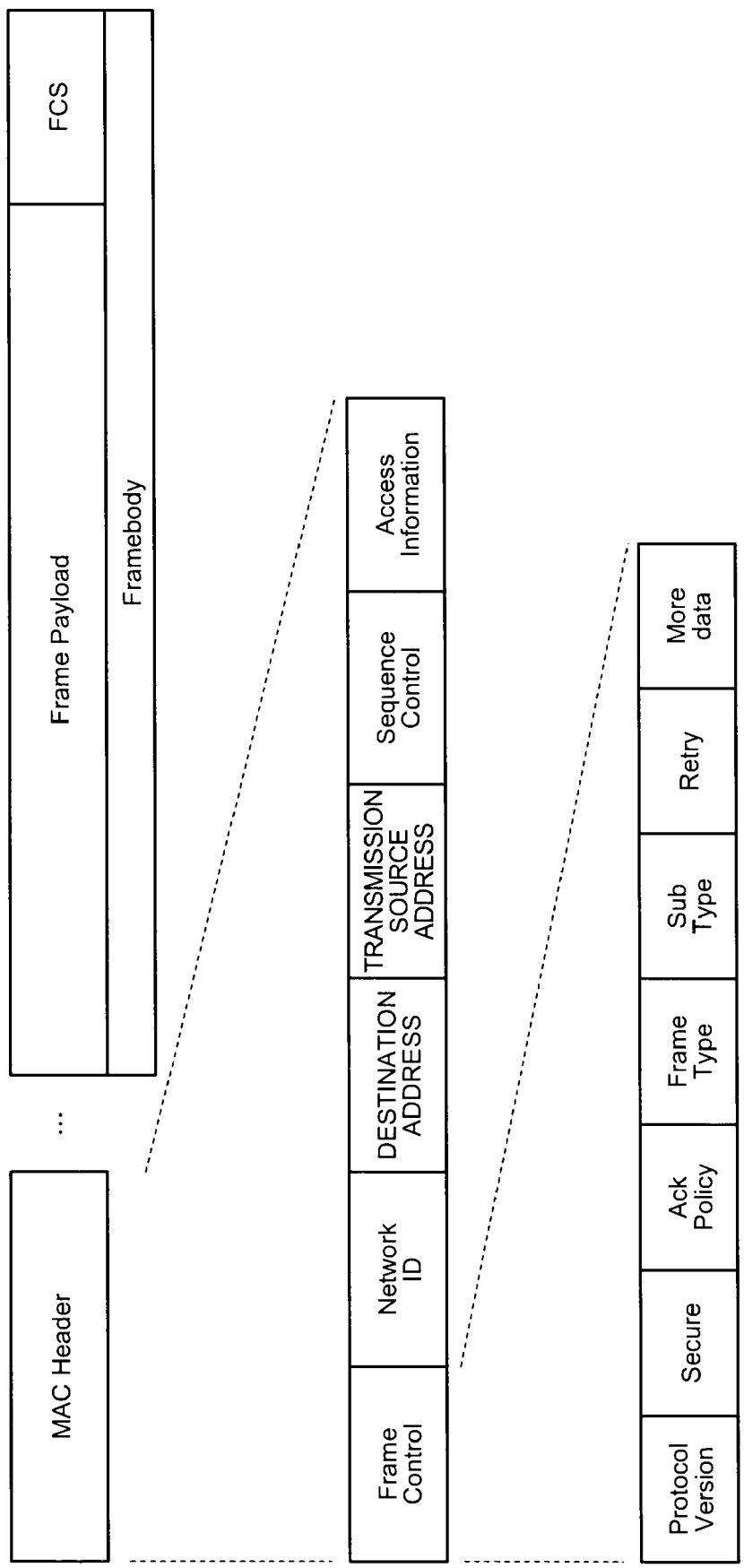
FIG. 4 is a diagram of an example of a MAC frame format exchanged between the wireless base station and the wireless terminal station.

FIG. 4 is a diagram of an example of a MAC frame format exchanged between the wireless base station 0 and the respective wireless terminal stations 1 to 3. The MAC frame includes a MAC header section including a type of a frame and a destination, a frame payload section, and a frame body including an FCS (Frame Check Sequence) for determining correctness of a frame. The MAC header section can be transmitted at a transfer rate different from that of the frame payload or can be transmitted at a transfer rate same as that of the frame payload. The FCS can be added individually.

The wireless base station and the respective wireless terminal stations can perform frame aggregation for aggregating a plurality of MAC frames and transmitting the aggregated MAC frames. When the frame aggregation is performed, a delimiter including a unique word for detecting a frame start position, length, and an individual destination can also be included.

The MAC header section includes a frame control field, a network ID as a network identification ID, a destination address, a transmission source address, sequence control for managing a sequence number and a fragment number, and access information for notifying information concerning an access system. Besides the destination address and the transmission source address, an address for routing, a field for notification, and the like can be included.

The frame control field includes a protocol version indicating a protocol type, information (Secure) indicating whether a frame is a security frame, an Ack policy for notifying a transmission method for ACK (Imm-ACK, Block-ACK, No-ACK, etc.), a frame type and a sub-type indicating a type of a frame, information (Retry) for notifying whether a frame should be retransmitted, and more data for notifying whether further data is present.

The Frame Payload section includes management messages such as Probe information, band request information, and announcement information designated by the frame type, control messages such as ACK information (BlockACK and Imm-ACK), band reservation information, and band allocation information, and data.

Figure 5:
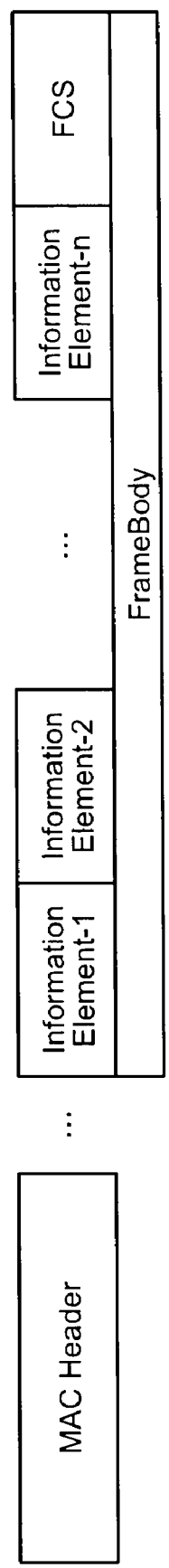
FIG. 5 is a diagram of an example of an information frame.

FIG. 5 is a diagram of an example of an announcement information frame (also referred to as Beacon) frame in this embodiment. The announcement information frame is a frame that a base station transmits to a service area at every fixed period. In this embodiment, the base station transmits, using, for example, the directional beams #0b1, #b02, ..., and #b05 (see FIGS. 1 and 2), the announcement information frame is transmitted in order in sub-service areas divided by the respective directional beams. The base station can transmit the announcement information frame to all the sub-service areas at the same timing. The announcement information frame includes a MAC header and a frame body (including a frame payload and an FCS). The frame payload includes a plurality of IEs (Information Elements), i.e., an information set. The IEs include information such as "Channel time allocation", "BSID", "parent piconet", "DEV association", "PNC shutdown", and "a list of wireless terminal stations to be connected".

The IEs are not only included in the announcement information frame but also included an authentication frame, a connection request frame, a DD (Device Discovery) frame, a DD report request (Device Discovery report request) frame, a DD report (Device Discovery report) frame, and the like. Information frames are not limited to the IE as long as fields of the same contents are included.

An IE independently defined and set anew in the present invention is explained. In this embodiment, the IE to be set anew is referred to as DBIE (Directional Beam Information Element) for convenience.

FIG. 6 is a diagram of a configuration example of the independently-defined IE (DBIE). As shown in FIG. 6, the DBIE includes Element ID information for identifying an element, Current Beam Number information indicating a directional beam number (or an antenna number) in use currently, Total Beam Number information indicating the number of directional beams (or the number of antennas) that the apparatuses (the wireless base station 0 or the wireless terminal stations 1 to 3), support range information indicating which degree of a range one apparatus (the wireless base station 0 or the wireless terminal stations 1 to 3) can cover, beam range information indicating which degree of a range one directional beam (antenna) can cover, minimum switching time information indicating minimum time (directional beam switching execution interval) necessary for switching directional beams, device discovery function support (Device Discovery Support) information indicating whether a device discovery function for searching for other wireless terminal stations (or wireless base stations) should be supported, and inter-terminal communication support (Direct Transmission Support) information indicating whether direct inter-terminal communication can be performed or communication can be performed with other wireless base stations during communication. Information included in the DBIE and order of arrangement of the information are not limited to this and the information can be sub-sets.

For example, information of the DBIE in the beacon frame that the wireless base station 0 shown in FIG. 1 transmits to sub-service areas has structure (contents) shown in FIG. 7.

Figure 8:
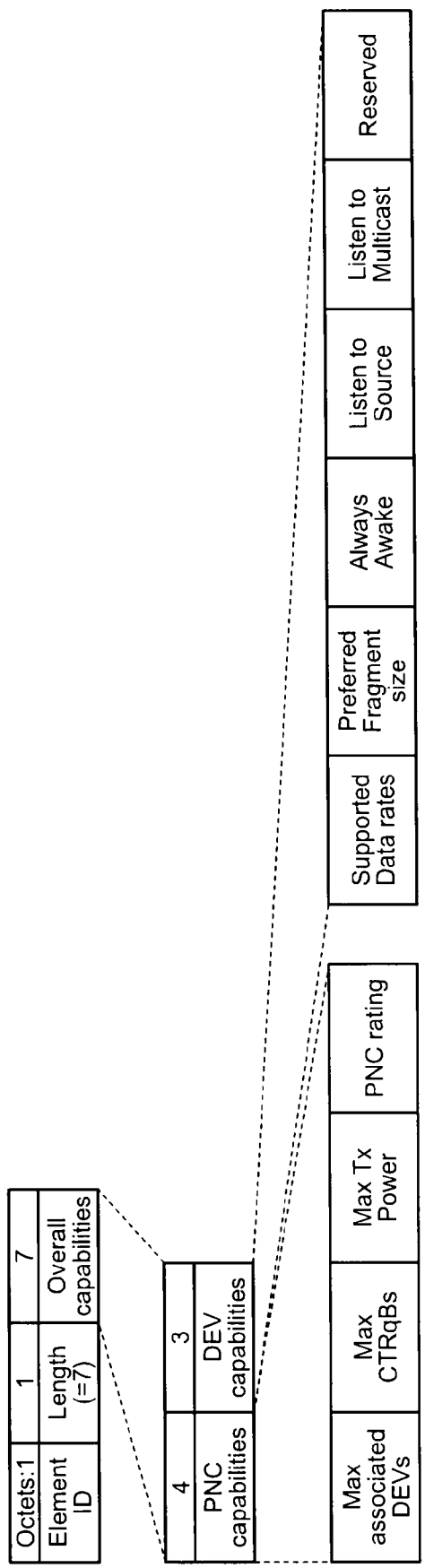
FIG. 8 is a diagram of a configuration example of a conventional "Capability IE".
Figure 9:
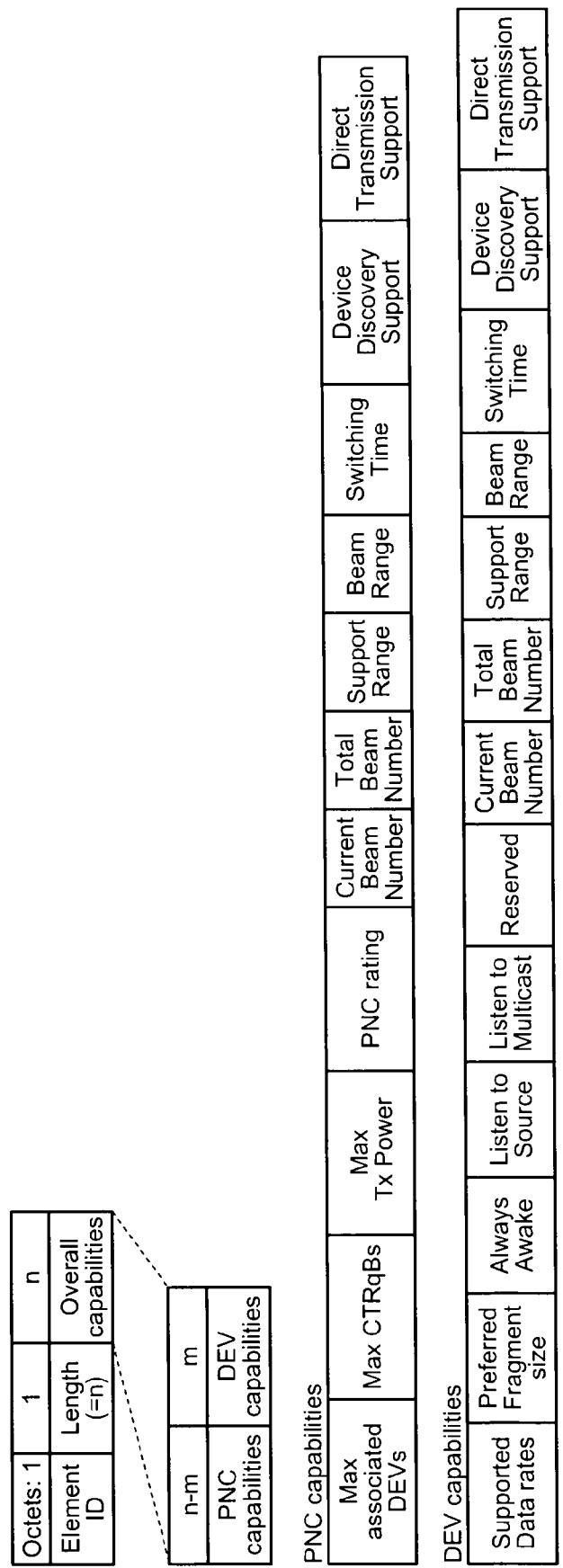
FIG. 9 is a diagram of a configuration example of an extended "Capability IE".
Figure 10:
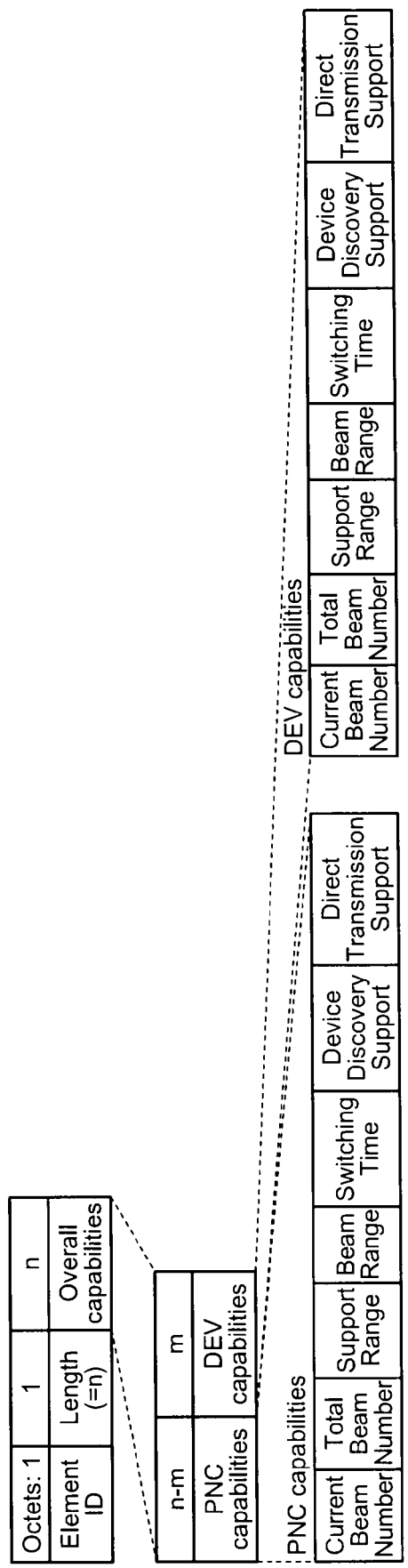
FIG. 10 is a diagram of a configuration example of an "Extended Capability IE".

An example in expanding the conventional "Capability IE" and notifying directional beam information is explained. First, the conventional "Capability IE" is explained. FIG. 8 is a diagram of a configuration example of the conventional "Capability IE". As shown in FIG. 8, the "Capability IE" includes three fields, "Element ID", "Length", and "Overall capabilities". The "Overall capabilities" field includes a "PNC capabilities" field for notifying information concerning a wireless base station and a "DEV capabilities" for notifying information concerning wireless terminal stations. Further, these fields include a plurality of information elements. In the conventional system, this "Overall capabilities" field is included in an authentication frame (Association request/response), a PNC handover frame (PNC handover request/response/information), a PNC information frame (PNC information/PNC information request), an announce frame (Announce), a channel state notification frame (Channel status request/response), and the like, whereby function information (capabilities information) of the wireless base station and the wireless terminal stations is notified.

The "Capability IE" extended for use in this embodiment is explained. The extended "Capability IE" additionally includes beam number in use (Current Beam Number) information indicating a directional beam number (or an antenna number) currently in use, total number of beams (Total Beam Number) information indicating the number of directional beams (the number of antennas) that the apparatuses (the wireless base station 0 or the wireless terminal stations 1 to 3) can control, support range information indicating which degree of a range one apparatus (the wireless base station 0 or the wireless terminal stations 1 to 3) can cover, beam range information indicating which degree of a range one directional beam (antenna) can cover, minimum switching time information indicating minimum time necessary for switching the directional beams, device discovery function support (Device Discovery Support) information indicating whether a device discovery function for searching for other wireless terminal stations (or wireless base stations) should be supported, and inter-terminal communication support (Direct Transmission Support) information indicating whether direct inter-terminal communication can be performed or communication can be performed with other wireless base stations during communication. Information included in the extended "Capability IE" and order of arrangement of the information are not limited to this. The element ID used in the conventional "Capability IE" can be used or an element ID of "Extended Capability IE" can be created anew. When the element ID is created anew, the element ID can include an added difference field. Details of the fields are the same as the fields of the DBIE.

As explained above, the parameters related to directional beam information is added to the conventional "Capability IE". Therefore, the wireless base station and the wireless terminal stations can specify, by exchanging this "Capability IE", directional antenna numbers and the like with which the wireless base station and the wireless terminal stations can communicate with each other. The wireless base station and the wireless terminal stations can appropriately select directional beams and the like during communication by writing the information in the information storing unit 20.

Figure 11:
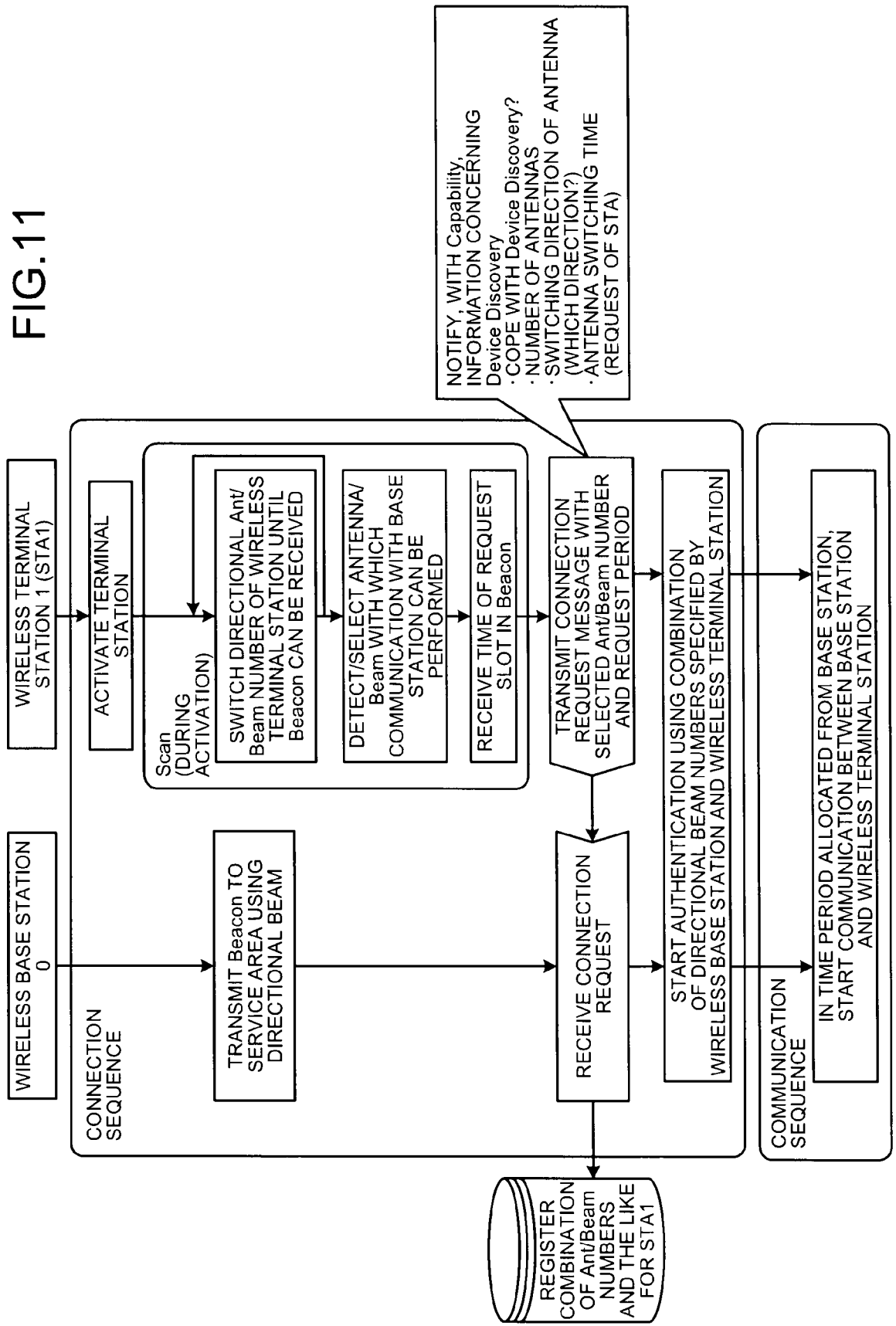
FIG. 11 is a diagram of an example of a sequence of the wireless terminal station in making connection to the wireless base station.

A sequence of the wireless terminal station in making connection to the wireless base station in the wireless communication system according to the present invention is specifically explained with reference to the drawings. In an example explained below, the wireless terminal station 1 makes connection to the wireless base station 0 in the wireless communication system shown in FIG. 1. FIG. 11 is a diagram of an example of the sequence of the wireless terminal station in making connection to the wireless base station.

In the wireless communication system shown in FIG. 1, the wireless base station 0 periodically transmits announcement information frame to the respective service areas using directional beams. This announcement information frame includes, besides a base station ID (a base station identifier), transfer rate information concerning transfer rate at which the base station can transmit data, and connected wireless terminal station information, a directional beam number, an antenna number, a maximum number of directional beams, and a DBIE (see FIGS. 6 and 7) of a currently-transmitted announcement information frame.

Figure 12:
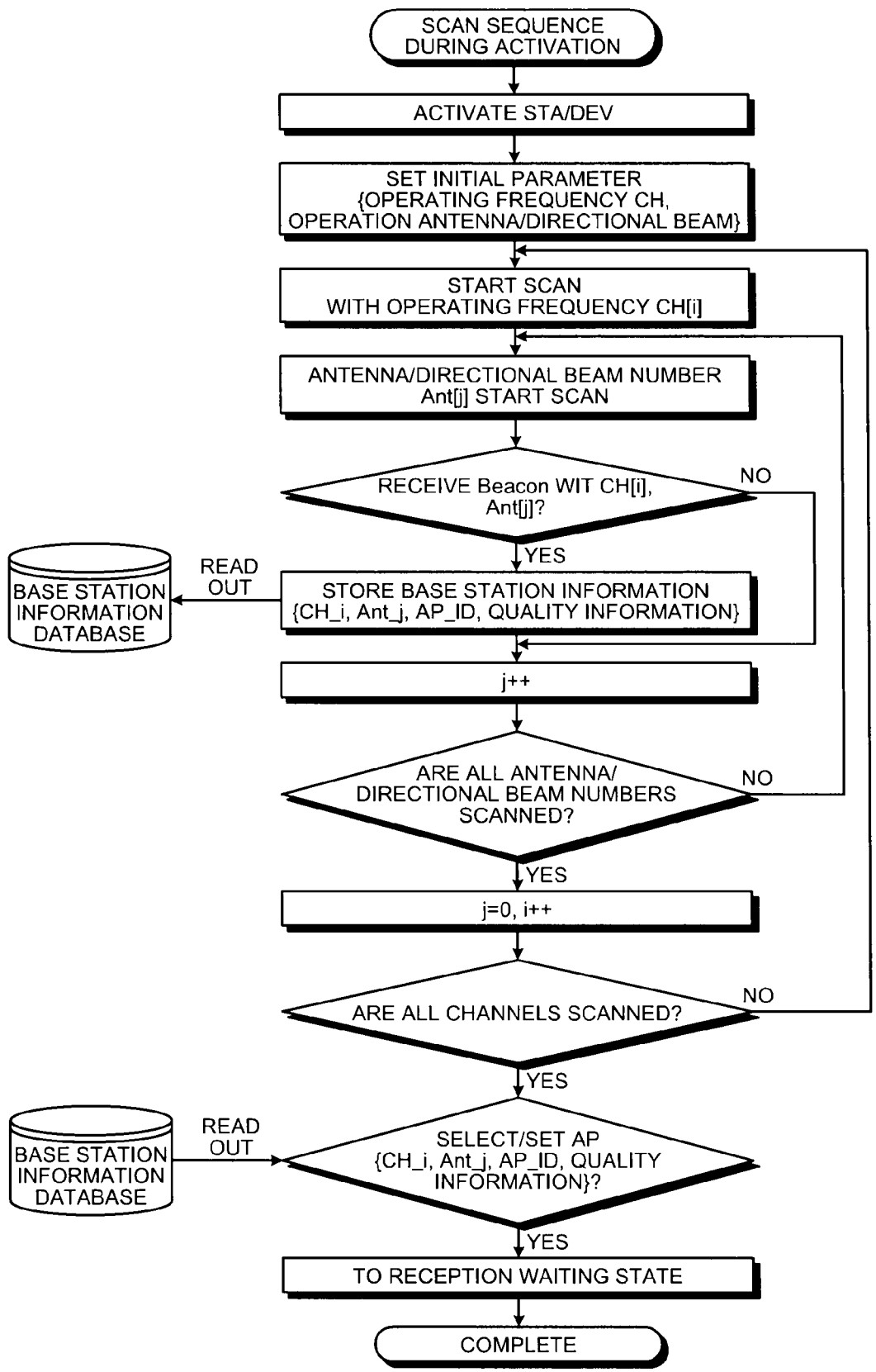
FIG. 12 is a diagram of an example of a sequence of the wireless terminal station in scanning the wireless base station.
Figure 13:
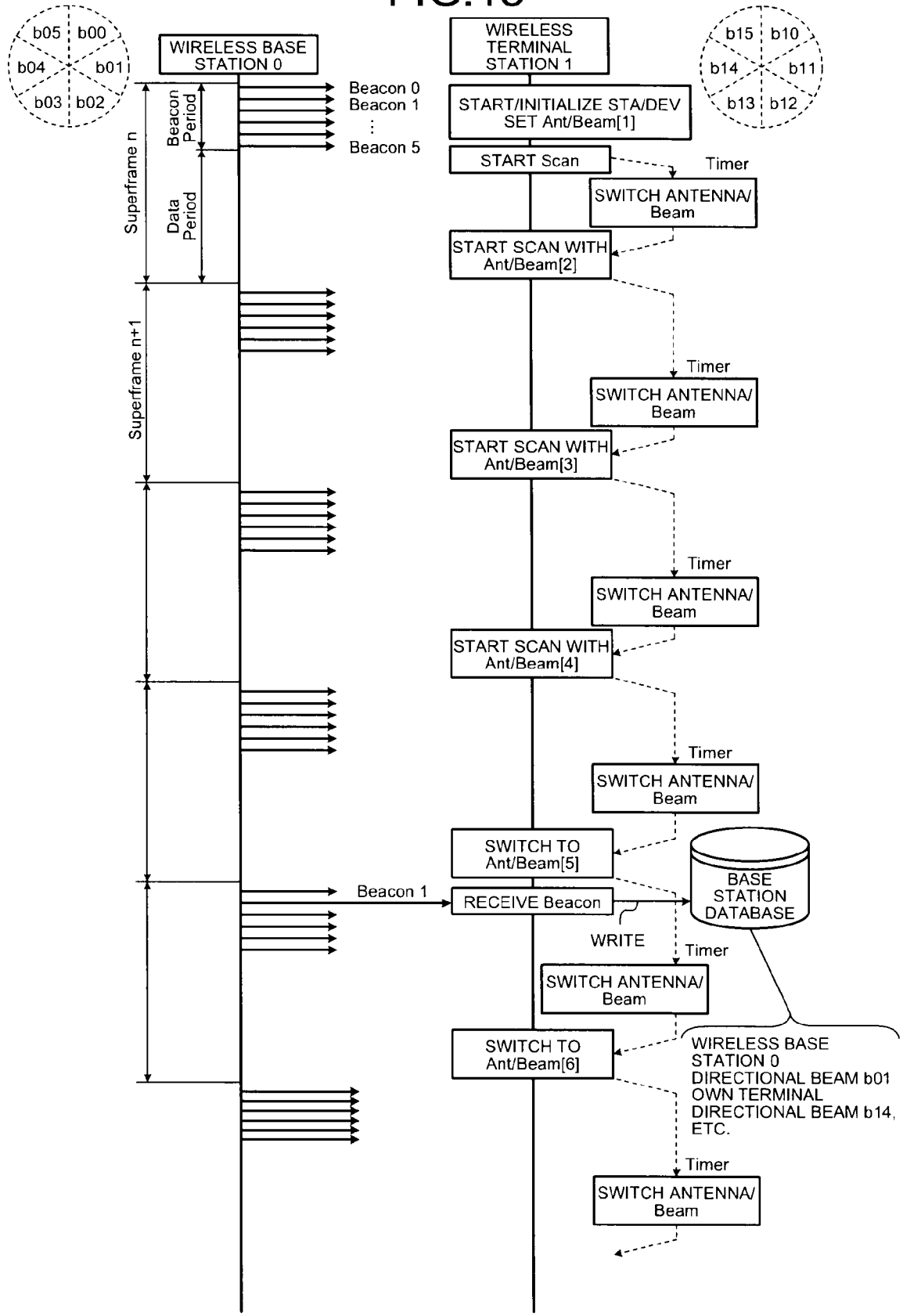
FIG. 13 is a diagram for explaining operation of the wireless terminal station in scanning the wireless base station.

On the other hand, when the wireless terminal station 1 is activated, the wireless terminal station 1 starts scan (scan sequence) to search for a wireless base station near the wireless terminal station 1. In the scan sequence, to receive announcement information frame from a wireless base station, the wireless terminal station 1 switches an antenna/directional beam and a frequency of the wireless terminal station 1, creates a list of wireless base stations with which the wireless terminal station 1 can communicate (including information such as antenna numbers/directional beam numbers, frequencies, base station IDs, and reception power), and selects an optimum wireless base station out of the list. A detailed scan sequence and scan operation can be indicated, for example, as shown in FIGS. 12 and 13. Specifically, the wireless terminal station 1 performs scan in all conditions (all selectable combinations of i and j) while sequentially switching an operation frequency (CH[i]) and an antenna/directional beam (Ant[j]). When wireless base stations are detected, the wireless terminal station 1 stores information concerning the base stations (details of contents are explained later) in a base station information database. The base station information database is built in an information storing unit (a unit corresponding to the information storing unit 20 of the wireless base station shown in FIG. 2) of the wireless terminal station 1. Switching time of the antenna/directional beam equivalent to "Switching Time" shown in FIGS. 6 and 7 and the like (time after switching is executed once until execution of the next switching) and frequency switching time (time after switching is executed once until execution of the next time) is set to a time interval sufficient for receiving announcement information frame from a wireless base station. In general, a value larger than an announcement information frame transmission interval is desirable. When the scan under all the conditions is finished and a wireless base station is detected, the wireless terminal station 1 selects a connection destination out of detected wireless base stations and starts waiting.

In the example shown in FIG. 1, as a result of executing the scan, the wireless terminal station 1 extracts an announcement information frame from the wireless base station 0. A directional beam number (in this example, b01) used by the wireless base station 0, a total number of directional beams (in this example, six), frequency information, a directional beam number (in this example, b14) that the terminal uses to communicate with the wireless base station 0, and the like are obtained as a scan result. The wireless terminal station 1 stores this scan result in the base station information database as base station information.

Detailed operation of the wireless terminal station 1 in executing the scan and making connection to the wireless base station 0 selected as a connection destination is explained below. Operation performed with the wireless base station 0 set as a connection destination is explained.

When the wireless base station 0 is set as the connection destination, the wireless terminal station 1 selects an antenna/directional beam (in this example, an antenna/directional beam with a number b14) corresponding to the wireless base station 0, to which the wireless terminal station 1 makes connection, and receives an announcement information frame of the wireless base station 0. The wireless terminal station 1 grasps a connection request slot/a band allocation slot (an allocation time period for band request) included in the received announcement information frame.

Subsequently, the wireless terminal station 1 transmits, using the connection request slot/the band request slot, a connection request message (also referred to as Probe request) including IEs (Information Elements) concerning a function of the terminal to the wireless base station 0 using the antenna/directional beam #14 of the selected number. The IEs include information such as information indicating whether the terminal copes with a device discovery function, the number of directional beams, a directional beam number currently in use in communication, directional beam switching minimum time (a minimum value of a time interval for executing directional beam switching), a supported modulation system, and an encoding ratio (see FIG. 6, FIG. 7, FIG. 9, and FIG. 10).

When the wireless base station 0 receives the connection request message from the wireless terminal station 1, the wireless base station 0 specifies a combination of an antenna number (a directional beam number) and the like, with which the wireless base station 0 can communicate with the wireless terminal station 1, based on information included in the connection request message (IEs concerning a function of the wireless terminal station 1) and stores information concerning the combination in the information storing unit 20 shown in FIG. 2. In addition to an ID of the wireless terminal station 1, a directional beam number (#b14), and a total number of directional beams (six), the wireless base station 0 stores a directional beam number (#b01) and the like that the wireless base station 0 uses. The information included in the IEs concerning the function of the wireless terminal station 1 is stored in a connected wireless terminal database. The connected wireless terminal database is built in, for example, the information storing unit 20. Further, the wireless base station 0 transmits a connection response message (also referred to as Probe response) to the wireless terminal station 1 as required.

The wireless base station 0 and the wireless terminal station 1 perform communication with each other using the found combinations of the antenna/directional beam numbers and performs authentication and the like. Consequently, the wireless terminal station 1 completes the connection to the wireless base station 0 and can shift to a communication sequence and perform data communication.

The operation of the wireless base station 0 and the wireless terminal station 1 in performing communication (a connection sequence) is explained above. Operation of the other wireless terminal stations 2 and 3 and the like making connection to the wireless base station 0 is the same. In a connection sequence including authentication and the like, the respective wireless terminal stations can also notify the wireless base station 0 of combinations of directional beam numbers of the other wireless base stations or wireless terminal stations detected in the scan sequence and quality information (reception power, etc.). The wireless base station 0 stores the notified information in the information storing unit 20 and use the information when the wireless terminal station is handed over to the other wireless base station. When a certain terminal station desires to perform direct communication with the other wireless terminal stations, if information is already present in the information storing unit 20, it is also possible to simplify or omit the device discovery procedure.

A procedure of the wireless terminal stations set in a service area of the wireless base station 0 in performing direct communication (direct inter-terminal communication) without the intervention of the wireless base station 0 is explained. In particular, a procedure for searching for a wireless terminal station as a communication partner destination and specifying the direction of a directional beam (antenna) used in performing direct communication (a device discovery procedure) is explained in detail.

Figure 14:
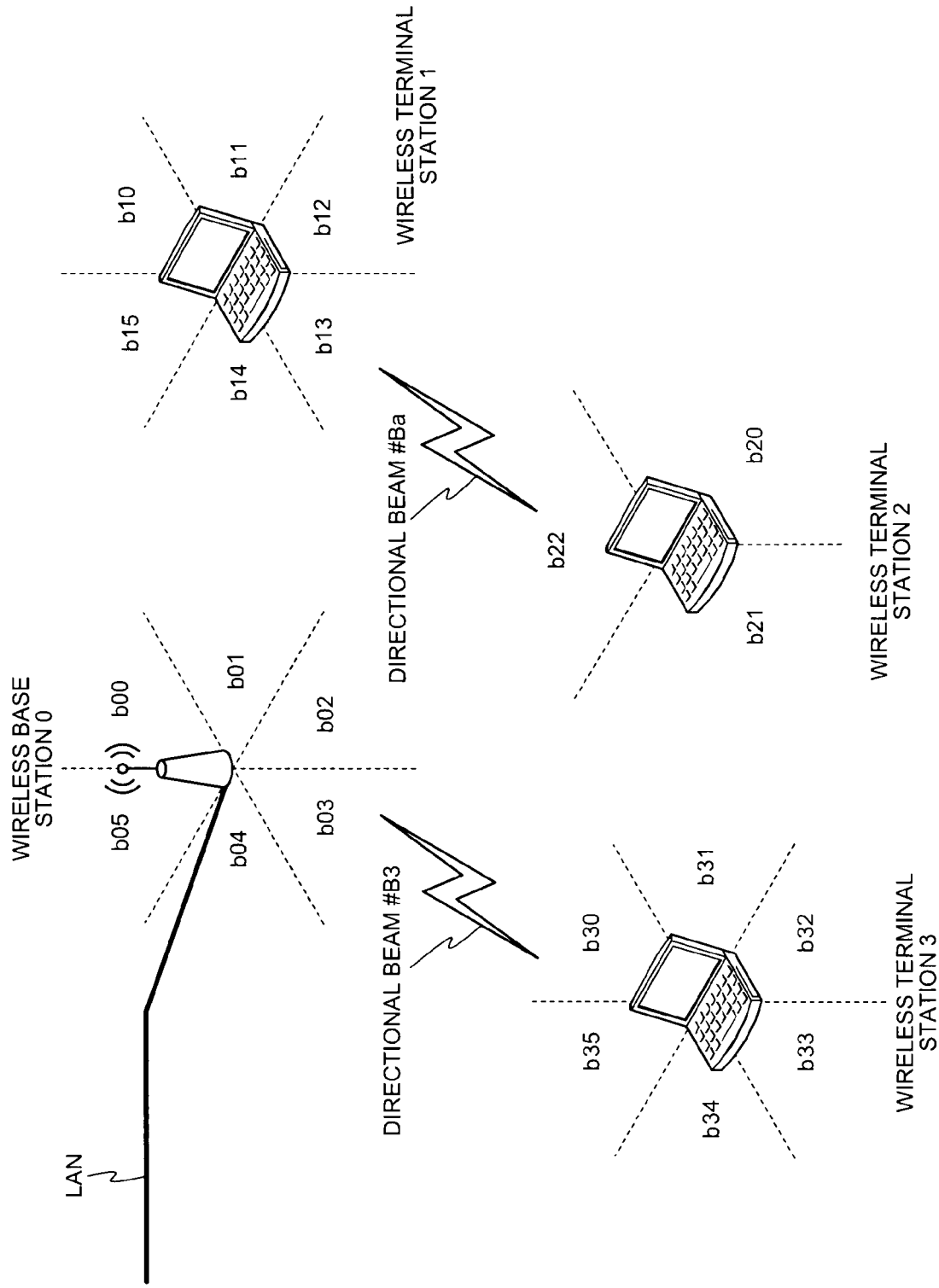
FIG. 14 is a diagram for explaining direct inter-terminal communication among wireless terminal stations set in a service area of the wireless base station.

FIG. 14 is a diagram for explaining direct inter-terminal communication among wireless terminal stations set in the service area of the wireless base station 0. A state in which the wireless terminal stations 1 and 2 perform the direct inter-terminal communication in the wireless communication system shown in FIG. 1 is shown. Differences from the operation (the connection sequence) of the wireless base station 0 and the wireless terminal station 1 in performing communication are mainly explained.

First, a situation of the wireless communication system shown in FIG. 14 is explained. In FIG. 14, a state in which the wireless base station 0 is performing communication with the wireless terminal station 3 using a directional beam #B3 and, on the other hand, the wireless terminal station 1 and the wireless terminal station 2 are performing direct inter-terminal communication using a directional beam #Ba is shown. More specifically, the wireless base station 0 is performing communication using a directional beam #b03 and the wireless terminal station 3 is performing communication using a directional beam #b30. The wireless base station 0 and the wireless terminal station 1 in the state shown in FIG. 14 use directional beams. Therefore, as in the communication performed between the wireless base station 0 and the wireless terminal station 1 explained above, the wireless base station 0 and the wireless terminal station 3 perform communication after performing control for setting directivities thereof opposite to each other.

The wireless terminal station 1 is performing communication using a directional beam #b13 and the wireless terminal station 2 is performing communication using a directional beam #b22. The wireless terminal station 1 and the wireless terminal station 2 in the state shown in FIG. 14 use directional beams. Therefore, as in the communication performed between the wireless base station 0 and the wireless terminal station 1 explained above, the wireless terminal station 1 and the wireless terminal station 2 perform communication after performing control for setting directivities thereof opposite to each other.

The wireless base station 0 and the respective wireless terminal stations use directional beams. Therefore, beams thereof do not interfere with each other in the state shown in FIG. 14.

Figure 15:
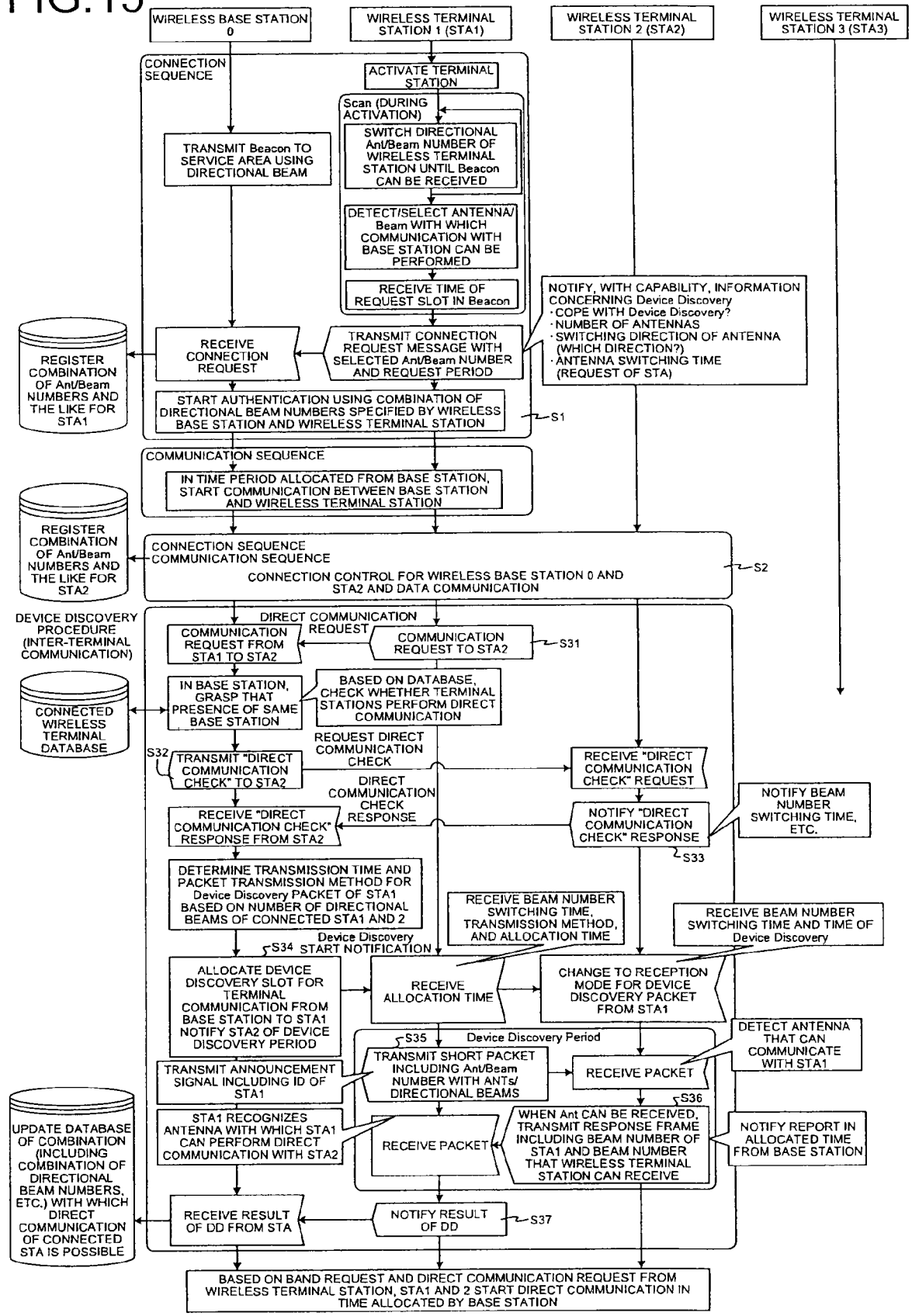
FIG. 15 is a sequence chart of procedures executed by respective apparatuses when a wireless terminal station 1 and a wireless terminal station 2 perform the direct inter-terminal communication.

The device discovery procedure is explained in detail with reference to FIG. 15. FIG. 15 is a sequence chart of a procedure executed by the apparatuses (the wireless base station and the wireless terminal stations) when the wireless terminal station 1 and the wireless terminal station 2 perform direct inter-terminal communication.

The wireless terminal station 1 executes operation (a sequence) of the wireless terminal station 1 in making connection to the wireless base station 0 explained with reference to FIG. 11 and shifts to a communication sequence (Step S1). Similarly, the wireless terminal station 2 executes operation in making connection to the wireless base station 0 and shifts to a communication sequence (Step S2). The wireless terminal stations 1 and 2 receive and recognize information concerning all the wireless terminal stations connected to the wireless base station 0 by receiving an announcement information frame periodically transmitted from the wireless base station 0. Under such a situation, when the wireless terminal station 1 performs communication with the wireless terminal station 2, the wireless terminal station 1 transmits a communication request frame including "a request for direct communication with the wireless terminal station 2" using a communication time period or a random access period allocated by the wireless base station 0 (Step S31). For example, in this embodiment, the wireless terminal station 1 transmits a "direct communication request" frame.

This "direct communication request" frame includes a DBIE (Directional Beam Information Element) or an extended "Capability IE", a time period for device discovery required by the wireless terminal station 1, and band information required in direct communication. The time period for device discovery required by the wireless terminal station 1 is determined from time necessary for the wireless terminal station 1 to transmit a DD frame (Device Discovery frame) explained later in all directional beam direction.

When the wireless base station 0 receives the "direct communication request" frame from the wireless terminal station 1, the wireless base station 0 determines whether the wireless terminal station 2 designated as a communication partner destination in the frame is present in a service area of the wireless base station 0. If the wireless terminal station 2 is present in the service area, the wireless base station 0 reads out connection information (search function support information, inter-terminal communication support information, etc.) of the wireless terminal station 2, antenna information stored in the information storing unit 20, and the like from the connected wireless terminal station database in the information storing unit 20. The wireless terminal station 2 determines, based on the read-out information, whether the wireless terminal station 2 can respond to the "direct communication request" from the wireless terminal station 1.

When it is determined that the wireless terminal station 2 is a terminal station that cannot respond to the "direct communication request", the wireless base station 0 can also inform, by sending a "direct communication response" frame, the wireless terminal station 1 that the wireless terminal station 2 does not cope with direct communication. However, in this embodiment, operation performed after the above operation when the wireless terminal station 2 has a function for performing direct communication is explained.

Figure 16:
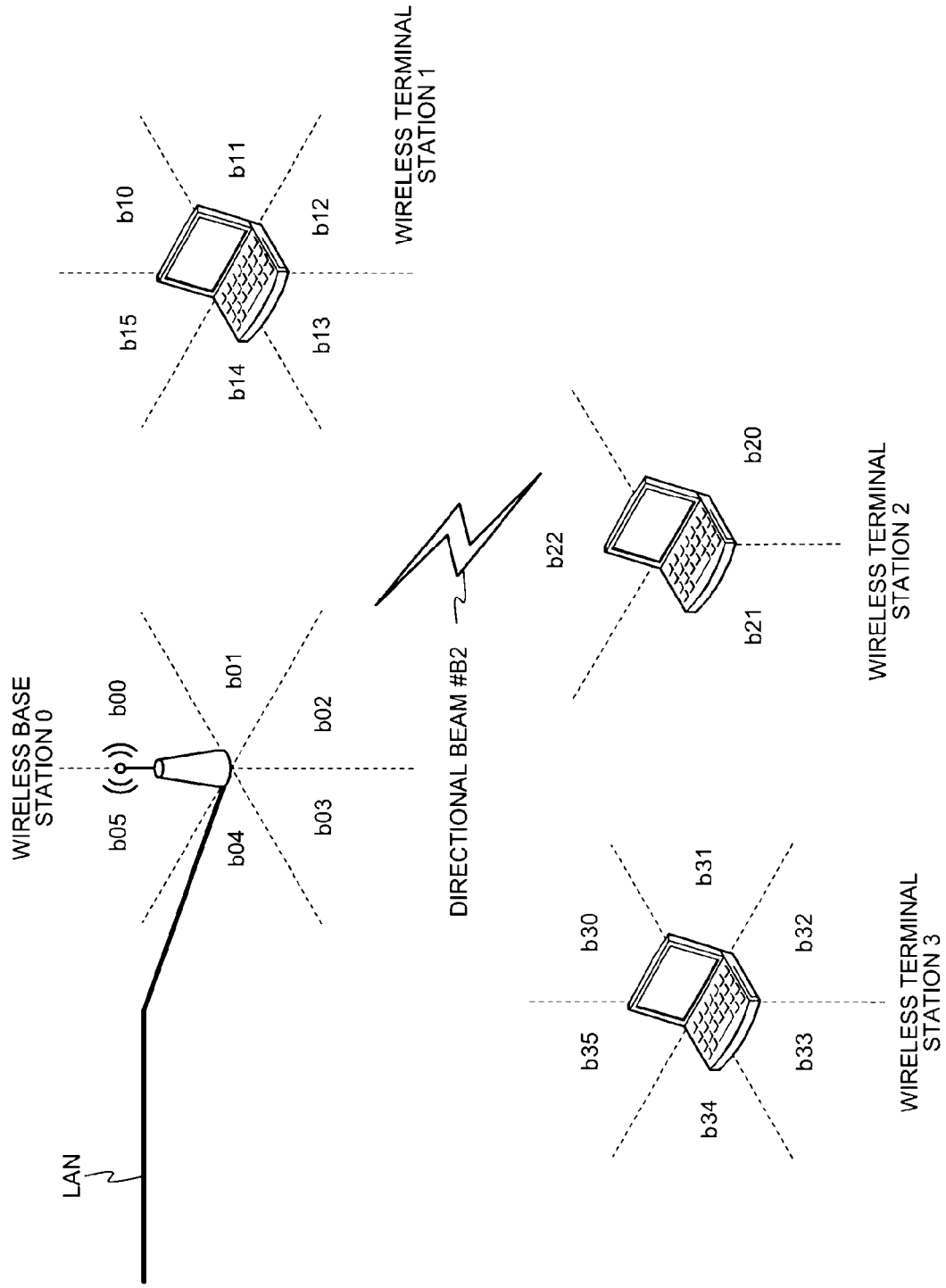
FIG. 16 is a diagram of a state in which the wireless base station and the wireless terminal stations perform communication.

When it is determined that the wireless terminal station 2 can responds to the "direct communication request" from the wireless terminal station 1, the wireless base station 0 transmits a "direct communication check" frame to the wireless terminal station 2 in order to check whether the wireless terminal station 2 can perform direct communication with the wireless terminal station 1 (Step S32). When the wireless terminal station 2 receives the "direct communication check" frame, the wireless terminal station 2 determines whether communication can be performed taking into account communication traffic and QoS of the terminal. When it is determined that direct communication is possible, the wireless terminal station 2 transmits a "direct communication check" response frame including an extended "Capability IE" to the wireless base station 0 (Step S33). When the wireless base station 0 has already received a DBIE or an extended "Capability IE" of the wireless terminal station 2 and stores information included in the DBIE or the extended "Capability IE", this request/response sequence for "direct communication check" (Steps S32 and S33) can be omitted FIG. 16 is a diagram of a state in which the wireless base station 0 and the wireless terminal station 2 communicate with each other. In this state, the wireless base station 0 and the wireless terminal station 2 are performing communication using a directional beam #B2. The wireless base station 0 uses a directional beam #b02 and the wireless terminal station 2 uses the directional beam #b22.

Returning to the explanation of the device discovery procedure shown in FIG. 15, the wireless base station determines transmission time and a frame transmitting method for a DD (Device Discovery) frame of the wireless terminal station 1 based on the number of directional beams of the wireless terminal stations 1 and 2 to which the wireless base station makes connection. In this embodiment, the wireless terminal station 1 can transmit and receive frames using directional beams in six directions. The wireless terminal station 2 can transmit and receive frames using directional beams in three directions. Therefore, when all the directional beams are combined, it is necessary to transmit eighteen frames. It is possible to calculate maximum time necessary for transmission of a DD frame from switching time for the directional beams (equivalent to "Switching Time" shown in FIGS. 6 and 7 and the like).

Subsequently, the wireless base station 0 transmits "Device Discovery start notification" including information such as start and end times of device discovery (Device Discovery Period, hereinafter referred to as DD period), directional beam switching timing, and an access method to the wireless terminal stations 1 and 2 using announcement information frame or an individual frame (Step S34). The other wireless terminal station 3 that receives this frame recognizes that the DD (Device Discovery) period has started and does not perform communication for a fixed time.

An "Imm-Device Discovery" system as a device discovery system in this embodiment is explained. In this "Imm-Device Discovery" system, in a DD period, a request source wireless terminal station (the wireless terminal station 1) transmits a DD frame to a request destination wireless terminal station (the wireless terminal station 2) (Step S35). If the request destination wireless terminal station receives the DD frame, the request destination wireless terminal station transmits a DD response (Device Discovery response) frame to the request source wireless terminal station (Step S36) at timing allocated in advance. Consequently, the request source wireless terminal station and the request destination wireless terminal station update information tables including directional beam numbers and the like of the wireless terminal stations.

Figure 17:
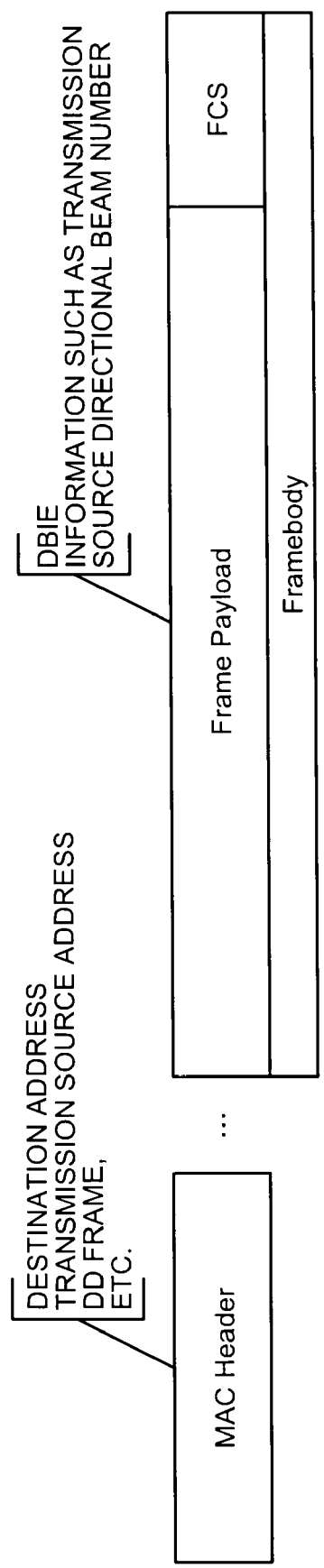
FIG. 17 is a diagram of a configuration example of a Device Discovery frame.

As shown in FIG. 17, the DD frame includes information such as a frame type, a transmission source address, and a directional beam number (a transmission source directional beam number) currently in use. Further, as required, the DD frame includes information such as a destination address (which may be any one of broadcast, multicast, and individual address) and a DBIE.

Figure 18:
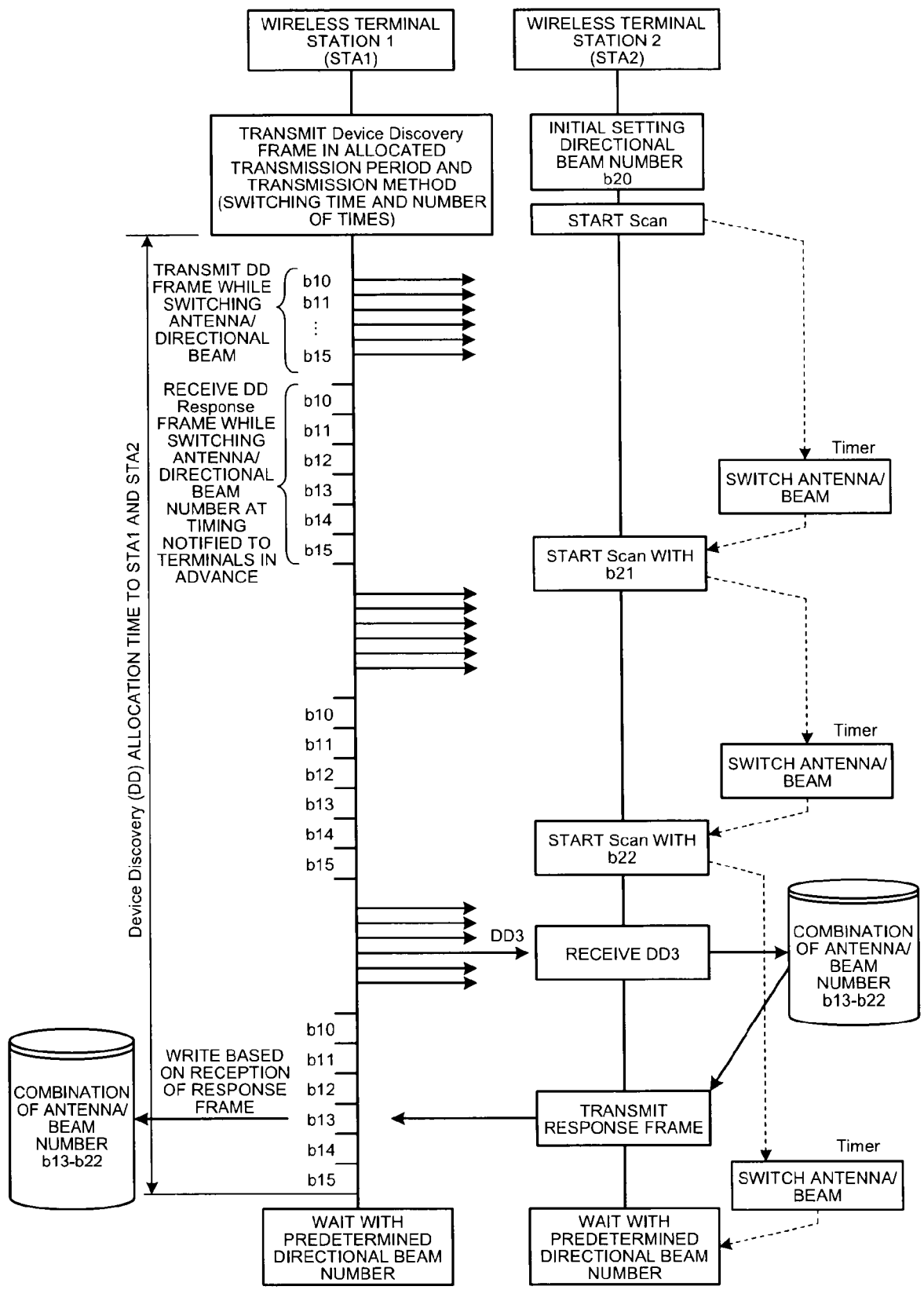
FIG. 18 is a diagram for explaining device discovery operation performed between the wireless terminal station 1 and the wireless terminal station 2.

A specific "Imm-Device Discovery" system is explained with reference to FIG. 18. The wireless terminal station 1 transmits a DD frame including a directional beam number currently in use by the wireless terminal station 1 according to a time period and a transmission method allocated by the wireless base station 0. Eighteen, which is the number of combinations of directional beam numbers that the wireless terminal station 1 and the wireless terminal station 2 can take, is set as the number of times of transmission of the DD frame.

The wireless terminal station 1 transmits the DD frame while switching a directional beam direction. Thereafter, the wireless terminal station 1 checks whether a DD response frame is received from respective directional beam directions to carry out device discovery. This operation is explained with reference to FIGS. 15 and 18.

First, the respective wireless terminal stations perform initial setting when the wireless terminal stations receive the "Device Discovery start notification" from the wireless base station 0 (see FIG. 15). The wireless terminal station 1 transmits, from designated time, a DD frame using directional beams in order of numbers b10, b11, . . . , and b15. As explained above, this DD frame includes information concerning directional beam numbers used by the wireless terminal station 1. The wireless terminal station 2 switches an antenna at switching timing notified by the wireless base station 0 in advance and attempts to receive the DD frame (see FIG. 18). The wireless terminal station 2 receives, with the directional beam #22, the DD frame (represented as DD3 in FIG. 18) including the directional beam number information (b13) from the wireless terminal station 1.

When the wireless terminal station 2 receives the DD frame from the wireless terminal station 1, the wireless terminal station 2 stores directional beam combination information of combination of the number (b22) of the directional beam used in the reception and the number (b13) of the directional beam used by the wireless terminal station 1, which is included in the DD frame, in the information storing unit 20 together with a reception power value, a terminal ID, and the like. Specific information stored in the information storing unit 20 is "b13, b22, the wireless terminal station 1, . . . ".

Subsequently, when the wireless terminal station 1 transmits the DD frame in all the directional beam numbers, the wireless terminal station 1 waits for, in a scheduled directional beam number, a response (Device Discovery Response) frame from the wireless communication terminal for a fixed time.

In this embodiment, because the wireless terminal station 2 receives the DD frame, the wireless terminal station 2 returns a response frame responding to the DD frame to the wireless terminal station 1 at timing determined in advance. In returning the response frame, the wireless terminal station 2 uses directional beam selected based on the directional beam combination information stored in the information storing unit 20 (a directional beam used in receiving the DD frame).

The response frame includes an address of the wireless terminal station 2 at the transmission source, the directional beam number (b22) currently in use, and the directional beam number (b13) with which the DD frame is received from the wireless terminal station 1. The response frame can include a destination wireless terminal station address (an address of the wireless terminal station 1).

When the wireless terminal station 1 receives the response frame from the wireless terminal station 2, the wireless terminal station 1 recognizes that direct communication is possible and stores the information (the address of the wireless terminal station 2, the directional beam number, etc.) notified in the response frame in the information storing unit 20. After that, the wireless terminal station 1 repeats the same operation the predetermined number of times until a predetermined time according to the method notified from the wireless base station 0. When it is found that the wireless terminal station 1 and the wireless terminal station 2 can communicate according to a plurality of combinations, an appropriate combination only has to be selected based on a communication quality. When the DD period ends, the respective wireless terminal stations select directional beam numbers/operating frequencies designated in advance. The respective wireless terminal stations select directional beam numbers/operating frequencies for transmitting frames to the wireless base station 0.

A transmission sequence for the DD frame in the DD period in this embodiment is not limited to the transmission sequence explained above. The transmission sequence can be any method as long as the wireless terminal stations exchange directional beam numbers and share a directional beam number (an antenna number) with which the wireless terminal stations can communicate. As a precaution against occurrence of an error in the DD frame and the response frame due to a situation of a propagation path, these frames can be transmitted a plurality of times, transmission power can be temporarily increased, or the frames can be transmitted by using a modulation system and an encoding ratio more robust than an normal frame. Exchange of the DD frame can be performed at an operating frequency same as an operating frequency of the wireless base station 0 or can be performed by using an unused frequency. Information concerning the exchange of the DD frame can be realized by the wireless base station 0 notifying the information to the respective wireless terminal stations in advance.

Returning to the explanation of the device discovery procedure shown in FIG. 15, when the DD period allocated to the wireless terminal station 1 and the wireless terminal station 2 ends, the wireless terminal station 1 notifies the wireless base station 0 of a result obtained in the DD period (Step S37). In notifying the result, the wireless terminal station 1 notifies combination information "b13, b22" or the like of directional beam numbers with which the wireless terminal station 1 and the wireless terminal station 2 can perform direct communicating (Device Discovery Report). When, because there is no response from the wireless terminal station 2 in the DD period, it is determined that direct communication cannot be performed, the wireless terminal station 1 notifies the wireless base station 0 of a result including content indicating "the wireless terminal station 2 cannot be detected". The notification of the result in the DD period (Device Discovery Report) can be individually performed by the wireless terminal station 1 and the wireless terminal station 1 or performed by only the wireless terminal station 1 that requests direct communication.

When the wireless base station 0 receives the result of the DD (Device discovery Report), the wireless base station 0 updates the database of combinations of the connected wireless terminal stations that can perform direct communication. After that, when a direct communication request is received from the wireless terminal stations 1 and 2, the wireless base station 0 notifies the wireless terminal stations 1 and 2 of time of direct communication using an announcement signal or the like. The wireless terminal stations 1 and 2 carries out data communication of file data and the like in an allocated time period (see FIG. 14). When the wireless terminal stations perform direct communication, the wireless base station 0 can allocate a frequency channel/a space channel same as the operating frequency of the wireless base station 0 or can allocate a frequency channel/a space channel different from the operating frequency.

As explained above, in this embodiment, the wireless terminal station 1 transmits the "direct communication request" to the wireless base station 0. As a result of collating the database, if it is determined that direct communication is possible, the wireless base station 0 performs "direct communication check" with the wireless terminal station 2 corresponding to the wireless terminal station 1 (designated as a partner of direct communication by the wireless terminal station 1). The wireless base station 0 notifies the wireless terminal station 1 and 2 of a time period and a method of device discovery determined based on the information acquired in the connection sequence with the wireless terminal station 1 and the information acquired in the connection sequence with the wireless terminal station 2 and allocates a DD period to the wireless terminal stations 1 and 2. The wireless terminal stations allocated with the DD period can share a directional beam number, with which the wireless terminal stations can communicate with each other, by transmitting frames including directional beam numbers (directional beam information) of the wireless terminal stations to each other. Further, the wireless terminal stations notify the wireless base station 0 of a result of the device discovery (Device Discovery Report), whereby the wireless base station 0 can store combinations of wireless base stations that can perform direct communication and directional beam numbers. Thereafter, the respective wireless terminals can perform direct communication in a time period allocated to the wireless base station 0 by performing "direct communication request" in a band designated in advance and at timing designated in advance.

Therefore, although, in the past, when data is transmitted from the wireless terminal station 1 to the wireless terminal station 2, the data needs to be once transmitted to the wireless base station 0 and then wireless base station 0 transfer the data to the wireless terminal station 2 (i.e., the wireless terminal stations 1 and 2 needs to perform data communication via the base station 0), lit is possible to effectively use a band because the present invention allows the wireless terminal stations to perform direct communication. Further, because beams having directivity are used, it is possible to realize SDMA (Space Division Multiple Access) in which the wireless base station 0 simultaneously communicate with the other wireless terminal station 3 in a period in which the wireless terminal stations 1 and 2 perform direct communication under the management of the wireless base station 0. It is possible to substantially increase efficiency of use of a band.

In this embodiment, a DD frame is specified as shown in FIG. 17. However, it is also possible to repeatedly transmit the PLCP preamble section in which a MAC ID and a code (Beam Num) meaning a directional beam number are inserted as shown in FIG. 17. In this case, because the PLCP header section and the PSDU section can be reduced, it is possible to realize a highly-efficient transmission method during transmission of the DD frame. The wireless terminal station that receives the DD frame performs processing of only the PLC preamble section. It is possible to further simplify the processing than demodulating the PLCP header section and the PSDU section. If a coded packet is defined as the DD frame, when the packet is received, a receiving wireless terminal station can recognize the packet as the DD frame. It goes without saying that a Type/Subtype can be coded and inserted.

Figure 20:
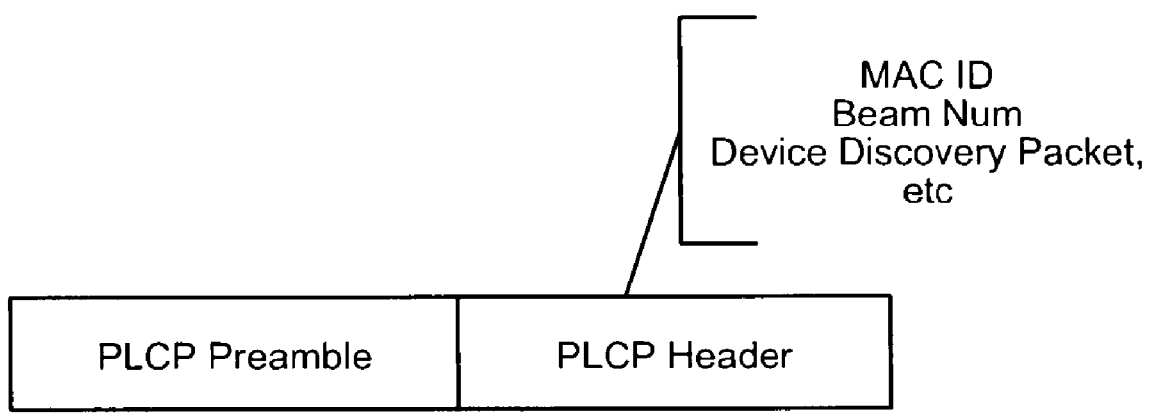
FIG. 20 is a diagram of an example of the PLCP preamble section and a PLCP header section.

As shown in FIG. 20, it is also possible to use a format including a preamble (PLCP Preamble) section and a header (PLCP Header) section. In this case, because information concerning a PHY Header and a MAC Header included in a header can be used, a receiver of the DD frame can use a larger amount of information.

Figure 19:
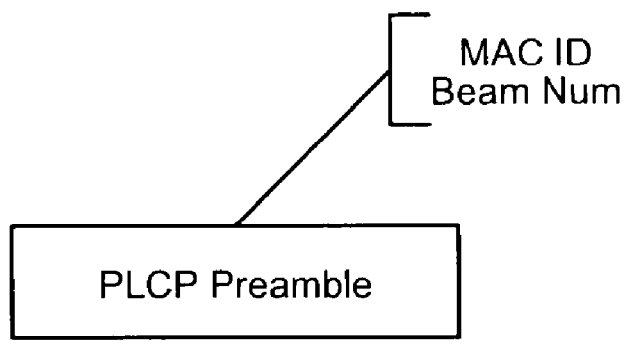
FIG. 19 is a diagram of an example of a PLCP preamble section.

The DD having the configuration shown in FIGS. 19 and 20 can also be applied to embodiments explained later.

Second Embodiment

A second embodiment is explained. In this embodiment, operation for efficiently transmitting a DD frame compared with the first embodiment and performing device discovery is explained. A precondition (a configuration of a wireless communication system) and a basic sequence are the same as those shown in FIGS. 14 and 15 explained in the first embodiment. Therefore, only differences are explained in this embodiment.

First, operation until the wireless base station 0 performs "Device Discovery start notification" to the wireless terminal station 1 shown in FIG. 15 is the same as that in the first embodiment. Operation from the "Device Discovery start notification" is explained.

The wireless base station 0 transmits "Device Discovery start notification" including start and end times (a DD period) of device discovery, directional beam switching timing, and an access method to the wireless terminal station 1 and the wireless terminal station 2 using announcement information frame or an individual frame. The other wireless terminal station 3 that receives this frame recognizes that the DD period has started and does not perform communication for a fixed time (the DD period).

In this embodiment, the wireless base station 0 refers to, in advance, a combination of directional beam numbers with which the wireless terminal stations 1 and 2 perform communication each other. The base station 0 stores information concerning a communication history such as connection sequences of the respective wireless terminal stations in the information storing unit 20. Therefore, the wireless base station 0 can estimate rough locations of the respective wireless terminal stations based on the information stored in the information storing unit 20 and notify an efficient transmission method for the DD frame.

The wireless base station 0 adds information indicating that "device discovery is carried out counterclockwise from the directional beam #b14" to the information notified to the wireless terminal station 1 by the wireless base station 0 in the procedure in the first embodiment and transmits "Device Discovery start notification". The wireless base station 0 adds information indicating that "device discovery is carried out clockwise from the directional beam #b22" to the "Device Discovery start notification" and notifies the wireless terminal station 2 of the information. In this way, the wireless base station 0 makes it possible to perform early search.

Figure 21:
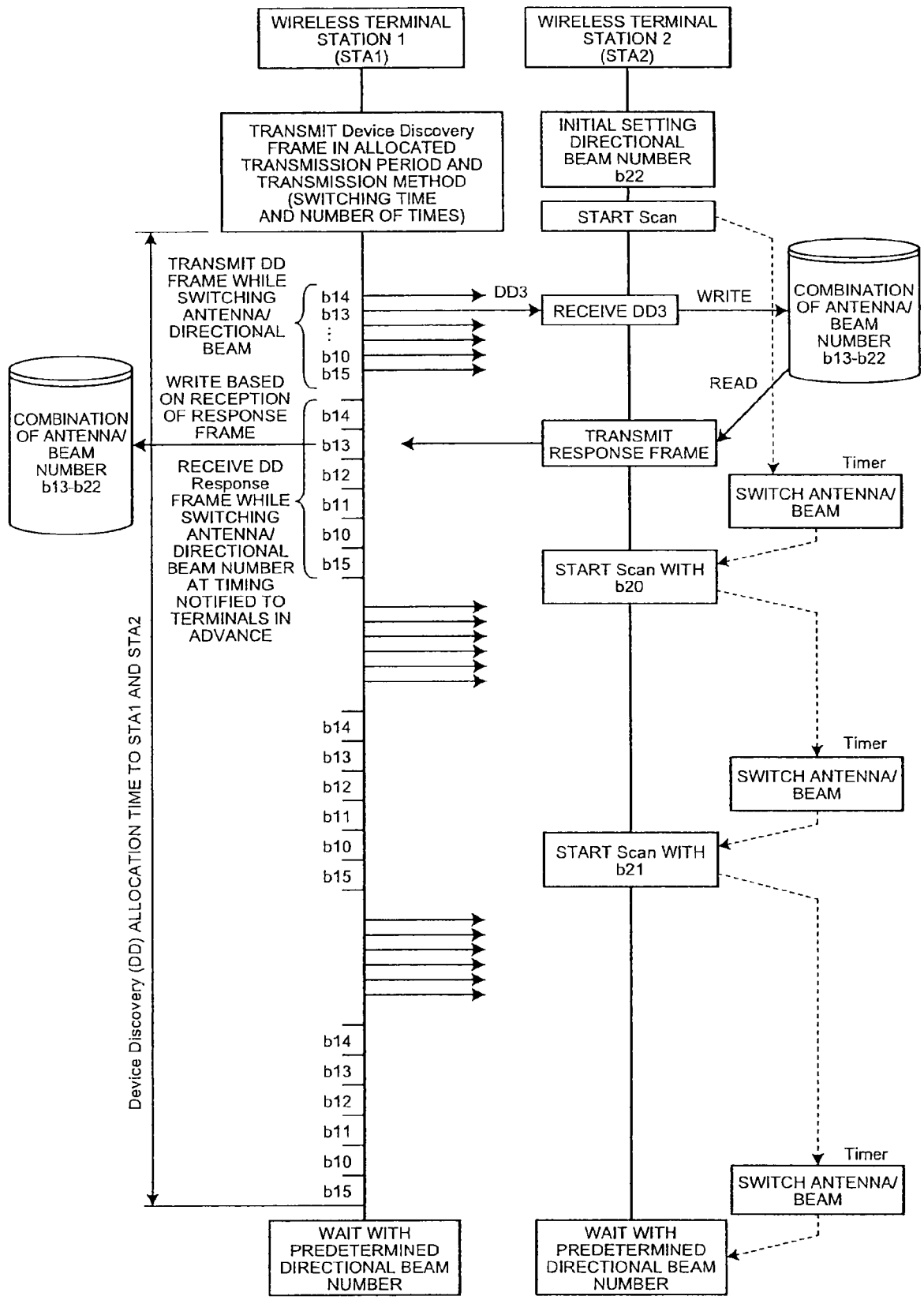
FIG. 21 is a diagram of a detailed procedure of devise discovery in which a search method is designated.

A specific method of transmitting a DD frame is explained below. FIG. 21 is a diagram of a detailed procedure of device discovery in which a search method is designated. In this embodiment, for the wireless terminal station 1, directional beam numbers are designated in order of b14, b13, b12, b11, b10, and b15 in advance and, for the wireless terminal station 2, directional beam numbers are designated in order of b22, b20, and b21. In initial setting, the respective wireless terminal stations set the directional beam numbers b14 and b22. Thereafter, a procedure in which the wireless terminal station 1 transmits the DD frame is executed. However, the procedure is the same as the procedure explained in the first embodiment. Therefore, explanation of the procedure is omitted.

As explained above, in this embodiment, the wireless base station 0 estimates rough locations of the respective wireless terminal stations that perform direct communication and notifies the respective wireless terminal stations of order of use of directional beams such that a partner terminal can be efficiently detected. Consequently, compared with the device discovery procedure (see FIG. 18) explained in the first embodiment, the wireless terminal station 2 can respond to a DD3 frame that the wireless terminal station 1 transmits second. The wireless terminal station 1 can detect a partner terminal (the wireless terminal station 2) early compared with the case of the first embodiment.

In this embodiment, the wireless base station 0 refers to, in advance, a combination of directional beam numbers with which the wireless terminal stations 1 and 2 perform communication each other. The wireless base station 0 estimates, based on the information stored in the information storing unit 20, rough locations of the wireless terminal stations 1 and 2 and notifies the wireless terminal stations 1 and 2 of an efficient transmission method for a DD frame. Consequently, the wireless terminal stations 1 and 2 can grasp a combination of directional beam numbers early in the device discovery sequence but a total number of transmitted DD frames does not change. However, it is possible to simplify the sequence and perform more efficient search by, for example, notifying the wireless terminal station 1 of limited information indicating that "device discovery is carried out counterclockwise from the directional beam #b14 to b12 (restricted to transmit the DD frame to b14, b13, and 12)" and notifying the wireless terminal station 1 of limited information indicating that "device discovery is carried out clockwise from the directional beam #b20 to b21 (restricted to b20 and b21)". Therefore, when a total number of directional beams is six in the wireless terminal station 1 and a total number of directional beams is three in the wireless terminal station 2 as in this embodiment, because original combinations are not many, an effect of implementation is small. However, when a total number of directional beams is large, it can be said that this is extremely effective means.

Third Embodiment

Subsequently, a third embodiment is explained. In this embodiment, a highly-efficient discovery procedure is explained. A configuration of a wireless communication system is the same as that in the first embodiment (see FIG. 14) explained above.

Figure 22:
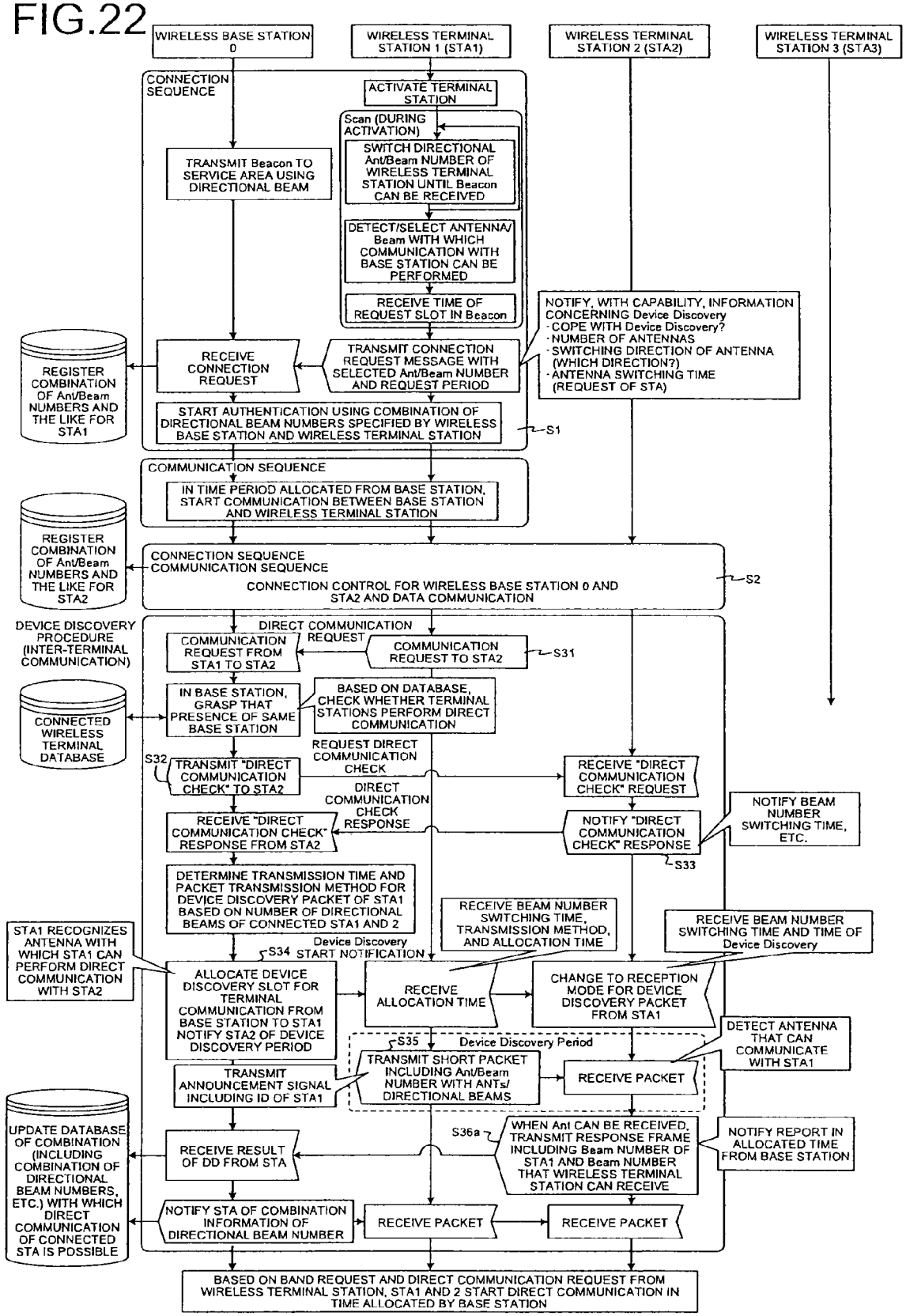
FIG. 22 is a diagram of an example of a device discovery procedure in a third embodiment.

FIG. 22 is a diagram of an example of a device discovery procedure in the third embodiment. A procedure until "Device Discovery start notification" is the same as that in the first embodiment. Therefore, explanation of this part of the procedure is omitted.

The wireless base station 0 transmits "Device Discovery start notification" including start and end times of device discovery (DD period), directional beam switching timing, an access method, and the like to the wireless terminal stations 1 and 2 using announcement information frame or an individual frame (Step S31). The other wireless terminal station 3 that receives this frame recognizes that the DD period has started and does not perform communication for a fixed time.

A device discovery procedure in this embodiment is explained below. This device discovery procedure is referred to as "Delayed-Device Discovery". In the device discovery in this embodiment, a request source wireless terminal station (the wireless terminal station 1) transmits a DD frame to a request destination wireless terminal station (the wireless terminal station 2) as in the first and second embodiments. However, this embodiment is different from the first and second embodiments in that the request destination wireless terminal station (the wireless terminal station 2) notifies the wireless base station 0 of a result of the device discovery (Device Discovery Report).

Figure 23:
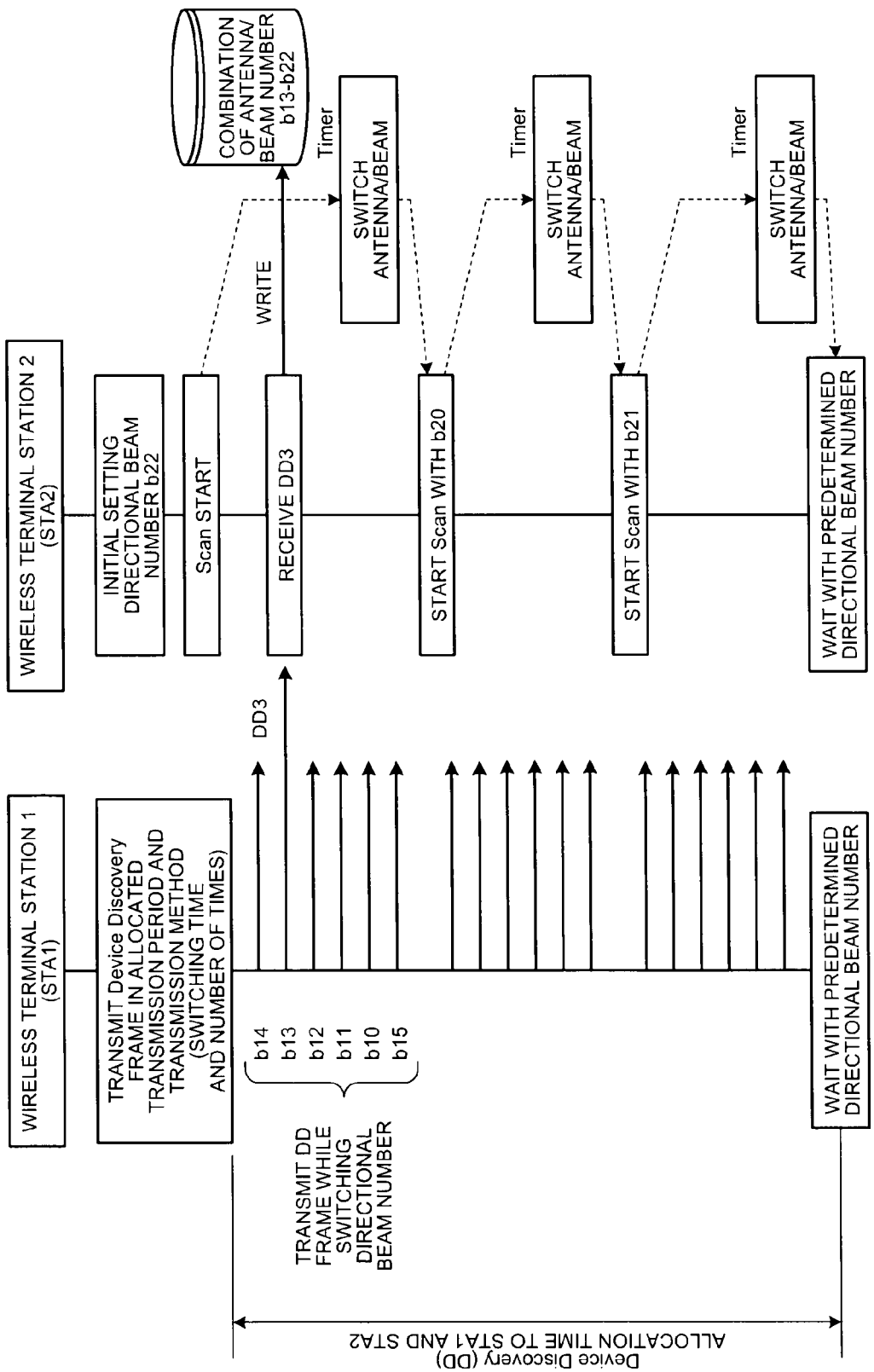
FIG. 23 is a diagram of an example of operation in a DD period (Delayed-Device Discovery) in the third embodiment.

FIG. 23 is a diagram of an example of operation (Delayed-Device Discovery) in the DD period in the third embodiment. First, in Step S34, the wireless terminal stations 1 and 2 perform initial setting based on the "Device Discovery start notification" notified by the wireless base station 0. For example, the wireless terminal station 2 changes a directional beam number to b22 and starts scan. On the other hand, the wireless terminal station 1 transmits a DD frame in order while switching directional beams at transmission timing and in the number of times of transmission determined in advance (Step S35). In this embodiment, it is assumed that the wireless base station 0 instructs in advance to transmit the DD frame in order of b14, b13, b12, b11, b10, b15, . . . . The transmission timing is determined by taking into account directional beam switching times and the like of the wireless terminal stations 1 and 2. When the wireless terminal station 1 finishes the DD frame transmission according to the transmission timing, the access method, and the number of times of transmission determined in advance, the wireless terminal station 1 resets the directional beam number to a predetermined directional beam number. Similarly, when the wireless terminal station 2 receives a DD frame in a predetermined DD frame transmission period, the wireless terminal station 2 stores information concerning a combination with a directional beam number of the wireless terminal station 2 in the information storing unit and repeats, while switching the directional beam number at determined directional beam number switching time, scan for deciding whether the DD frame is received. When the DD frame transmission period ends, the wireless terminal station 2 resets the directional beam number to a predetermined directional beam number. The DD frame transmission period in this embodiment ends.

Returning to the explanation of the device discovery procedure shown in FIG. 22, after the DD frame transmission period ends, the request destination wireless terminal station (the wireless terminal station 2) transmits a DD frame receivability report "Device Discovery report" (Step S36a) and the wireless base station 0 receives this report. The "Device Discovery report" includes combination information "b13, b22" of directional beam numbers with which the wireless terminal station 1 and the wireless terminal station 2 can perform direct communication, information indicating whether the wireless terminal station 2 accepts direct communication from the wireless terminal station 1, and band amount information used when the direct communication is acceptable.

In this sequence, the wireless base station 0 can allocate transmission timing of a "DD report" to the wireless terminal station 2 in advance (the sequence shown in FIG. 22). Alternatively, the wireless base station 0 can transmit a request frame "DD report request" to the wireless terminal station 2 and the wireless terminal station 2 can transmit a "DD report". When the wireless terminal station 2 cannot detect the wireless terminal station 1 in the DD period the wireless terminal station 2 notifies the wireless base station 0 of a result indicating that "the wireless terminal station 1 cannot be detected".

When the wireless base station 0 receives a result of the DD (Device Discovery Report), the wireless base station 0 updates the data of terminal combinations with which direct communication of connected terminal stations can be performed.

The wireless base station 0 notifies the request source wireless terminal station of an information frame including a combination of directional antenna numbers of the request source wireless terminal station (the wireless terminal station 1) and the request destination wireless terminal station (the wireless terminal station 2) using an announcement information frame or an individual frame.

Figures 24, 25:
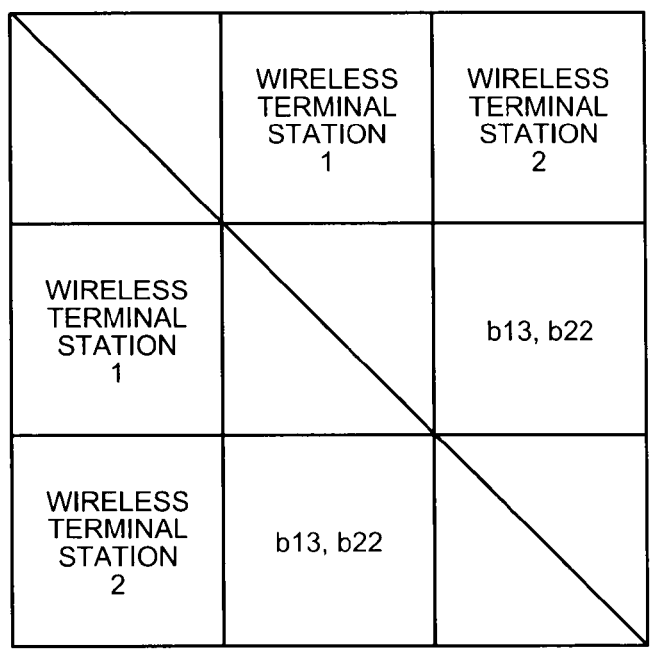
FIG. 24 is a diagram of a configuration example of a Directional Beam Combination IE.
FIG. 25 is a diagram of a configuration example of a Combination MAP.

For example, in this embodiment, the information frame is information frame including a "Directional Beam Combination IE" shown in FIG. 24. This "Directional Beam Combination IE" has field formats such as an identifier (Element ID) for identifying an IE, information (Station Number) indicating the number of terminals to be notified (the number of combinations), a MAC identifier (MAC ID) of a relevant wireless terminal station, and information (Combination MAP) indicating a combination of directional beam numbers with which communication is possible. The IE can be an IE obtained by extending the IE used in the first embodiment (se FIGS. 6, 8, and 10). When the information frame is notified to three or more terminals, it is sufficient to extend the field of "Station Number" to 3, 4, . . . , and n and extend the field of "MAC ID" to 3, 4, . . . , and n. When it is desired to add a plurality of pieces of information (e.g., a support range and QoS information) and notify the information, the "Combination MAP" only has to be extended.

The "Combination MAP" has contents shown in FIG. 25, for example, when only combination information of directional beam numbers is notified between the wireless terminal stations 1 and 2.

Consequently, the wireless terminal station 1 can specify a combination of directional beam numbers. After that, when a direct communication request is received from the wireless terminal stations 1 and 2, the wireless base station 0 notifies the wireless terminal stations 1 and 2 of time of direct communication using an announcement signal or the like. The wireless terminal stations 1 and 2 carry out data communication of file data and the like in an allocated time period.

As explained above, in this embodiment, the wireless base station 0 refers to, in advance, a combination of directional beam numbers with which the wireless terminal stations 1 and 2 perform communication each other. The base station 0 notifies an efficient transmission method for a DD frame using rough location information of the wireless terminal stations 1 and 2 based on the information stored in the information storing unit 20. Consequently, in the device discovery sequence, it is possible to grasp a combination of directional beams early.

A transmission and reception period of the "Device Discovery response" is omitted. After the DD period (Device Discovery Period) ends, the wireless base station 0 receives the "DD report" from the request destination wireless terminal station (the wireless terminal station 2). The wireless base station 0 notifies the wireless terminal stations including the wireless terminal station 1 of combination information of directional beam numbers using an announcement information frame or an individual frame. Consequently, it is possible to specify a combination of directional beams between the wireless terminal stations 1 and 2 and the wireless base station 0. Compared with the case of the second embodiment, it is further simplify the sequence and make the device discovery procedure efficient.

Fourth Embodiment

A fourth embodiment is explained. In the first to third embodiments explained above, the method of a wireless terminal station detecting a wireless base station and the discovery procedure for a request source wireless terminal station of direct communication to perform direct communication with a request destination wireless terminal station based on information notified from the wireless base station are explained. In this embodiment, a procedure of the request source wireless terminal station detecting a wireless terminal station that is present around the request source wireless terminal station and can perform direct communication is explained.

Figure 26:
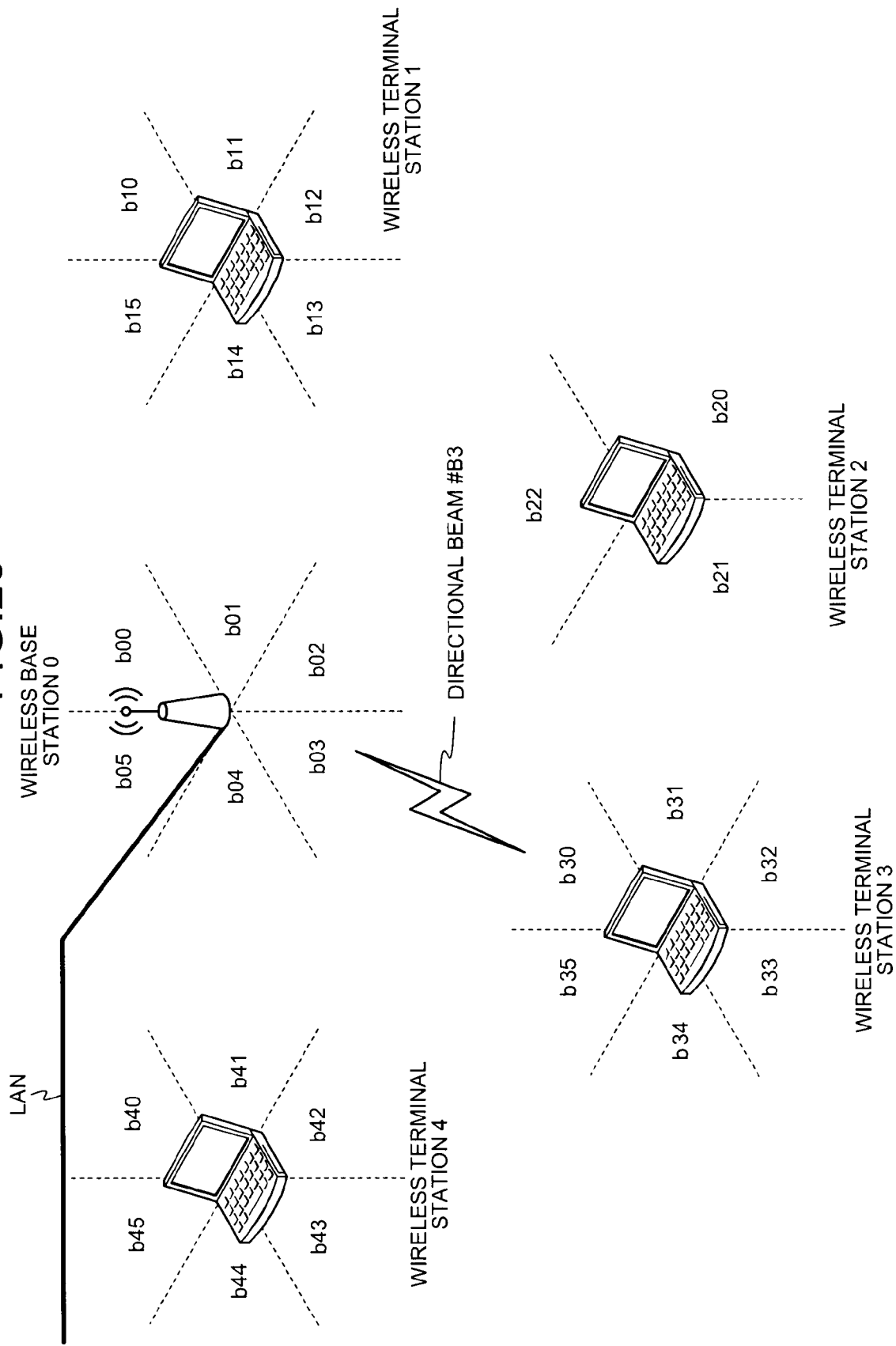
FIG. 26 is a diagram of a configuration example of a wireless communication system according to a fourth embodiment.

FIG. 26 is a diagram of a configuration example of a wireless communication system according to the fourth embodiment. This wireless communication system is a system in which a wireless terminal station 4 is added to the wireless system according to the first to third embodiment. Setting locations of the wireless base station 0 and the wireless terminal stations 1 to 3 are the same as those in the first to third embodiments.

In FIG. 26, a state in which the wireless base station 0 performs communication with the wireless terminal station 3 using the directional beam #B3 is shown. As an example, in this embodiment, a number of a directional beam that the wireless base station 0 uses to communicate with the wireless terminal station 3 is represented as b03 and a directional beam number that the wireless terminal station 3 uses to communicate with the wireless base station 0 is represented as b30. Because the wireless base station 0 and the wireless terminal station 3 use directional beams, in FIG. 26, the wireless base station 0 and the wireless terminal station 3 perform communication after performing control for setting directivities thereof opposite to each other. In this embodiment, a device discovery procedure of the wireless terminal station 3 in detecting a wireless terminal station that is present around the wireless terminal station 3 and can perform direct communication.

Figure 27:
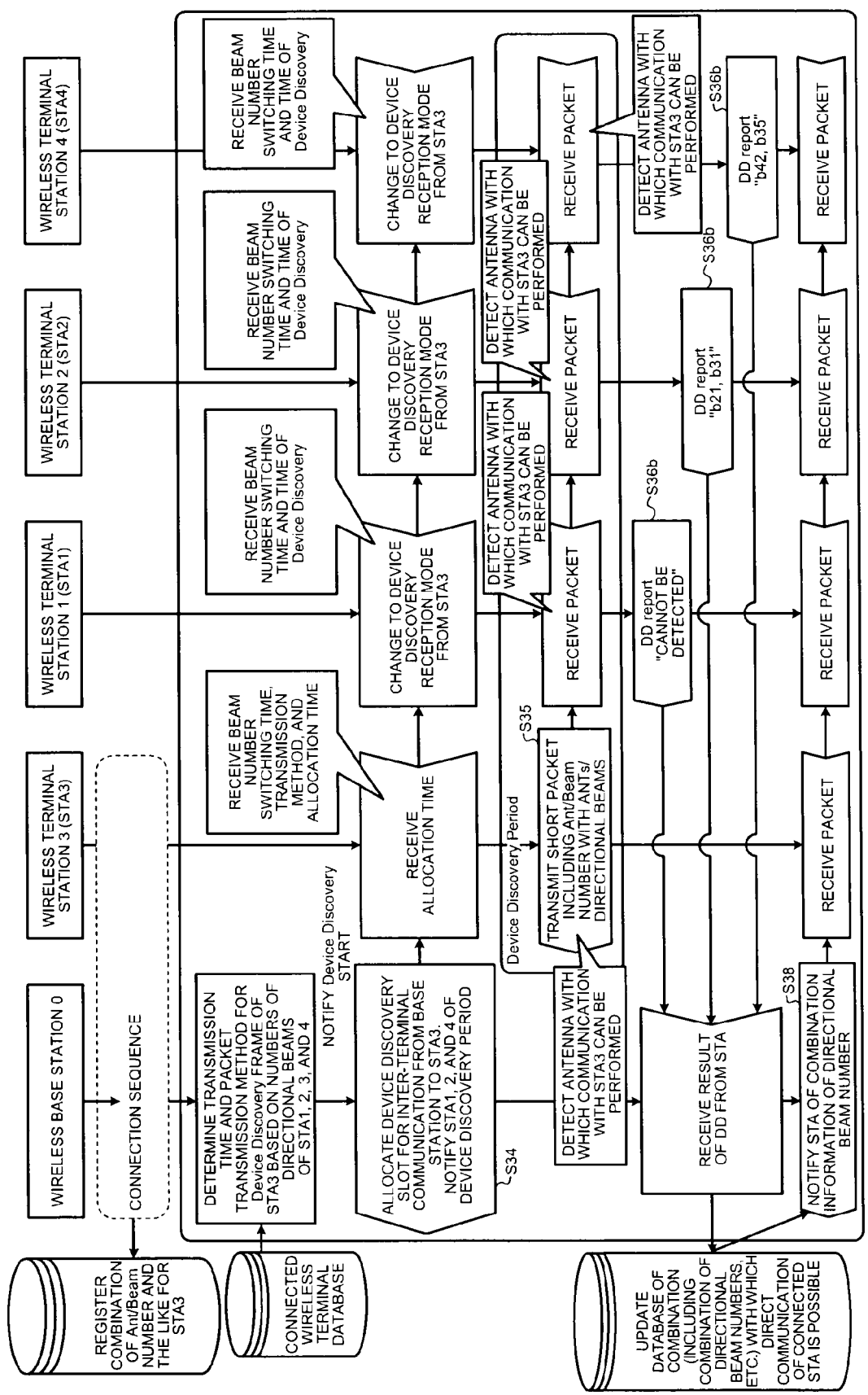
FIG. 27 is a sequence chart of an example of a device discovery procedure in the fourth embodiment.

The device discovery procedure in this embodiment is explained below with reference to FIG. 27. FIG. 27 is a sequence chart of an example of the device discovery procedure in the fourth embodiment. In an example shown in FIG. 27, the wireless terminal stations 1, 2, and 4 have already completed a connection sequence to the wireless base terminal 0 and can perform a communication sequence and the wireless terminal station 3 starts a connection sequence for connection to the wireless base station 0. Details of the connection sequence are the same as the first embodiment explained above. Therefore, explanation of the details is omitted.

In the sequence shown in FIG. 27, when the connection sequence for the wireless terminal station 3 is completed, the wireless base station 0 starts a device discovery procedure for the wireless terminal station 3. At this point, the wireless base station 0 stores combinations of directional beam numbers and the like in the information storing unit 20 from information such as a DBIE obtained from the respective wireless terminal stations in the connection sequence. Therefore, the wireless base station 0 "determines transmission time of a DD frame, a frame transmitting method, an access system, and the like of the wireless terminal station 3 based on the number of directional beams of "all or a part of the connected wireless terminal stations (the wireless terminal stations 1 to 4). When a wireless terminal station that does not support direct communication is present, the wireless base station 0 can omit information concerning a terminal that does not support direct communication in QoS information and a DBIE.

Subsequently, the wireless base station 0 notifies the respective wireless terminal stations of "Device Discovery start notification" using an announcement information frame or an individual frame (Step S34). The wireless terminal stations 1, 2, and 4 that receive the frame receive information notification such as directional beam number switching time (timing) of the terminals, a transmission method (a transmission method for a device discovery result), and start and end times (a DD period) of device discovery. On the other hand, the wireless terminal station 3 receives information notification such as transmission timing of a DD frame, directional beam number switching time (timing), a transmission method (a transmission method for a device discovery result), start and end times (a DD period of device discovery.

The DD period starts from the start time notified by the "Device Discovery start notification". In the DD period, only a wireless terminal station allocated in advance among the wireless terminal stations other than the request source wireless terminal station (the wireless terminal station 3) can perform transmission in allowed time (in the case of the procedure shown in FIG. 15, etc.). In this embodiment, device discovery is executed according to the procedure shown in FIG. 2. The wireless terminal stations other than the wireless terminal station 3 cannot perform transmission in the DD period. The notification of the transmission prohibition time can be performed by the "Device Discovery start notification" or can be performed by other announcement information frames.

Figure 28:
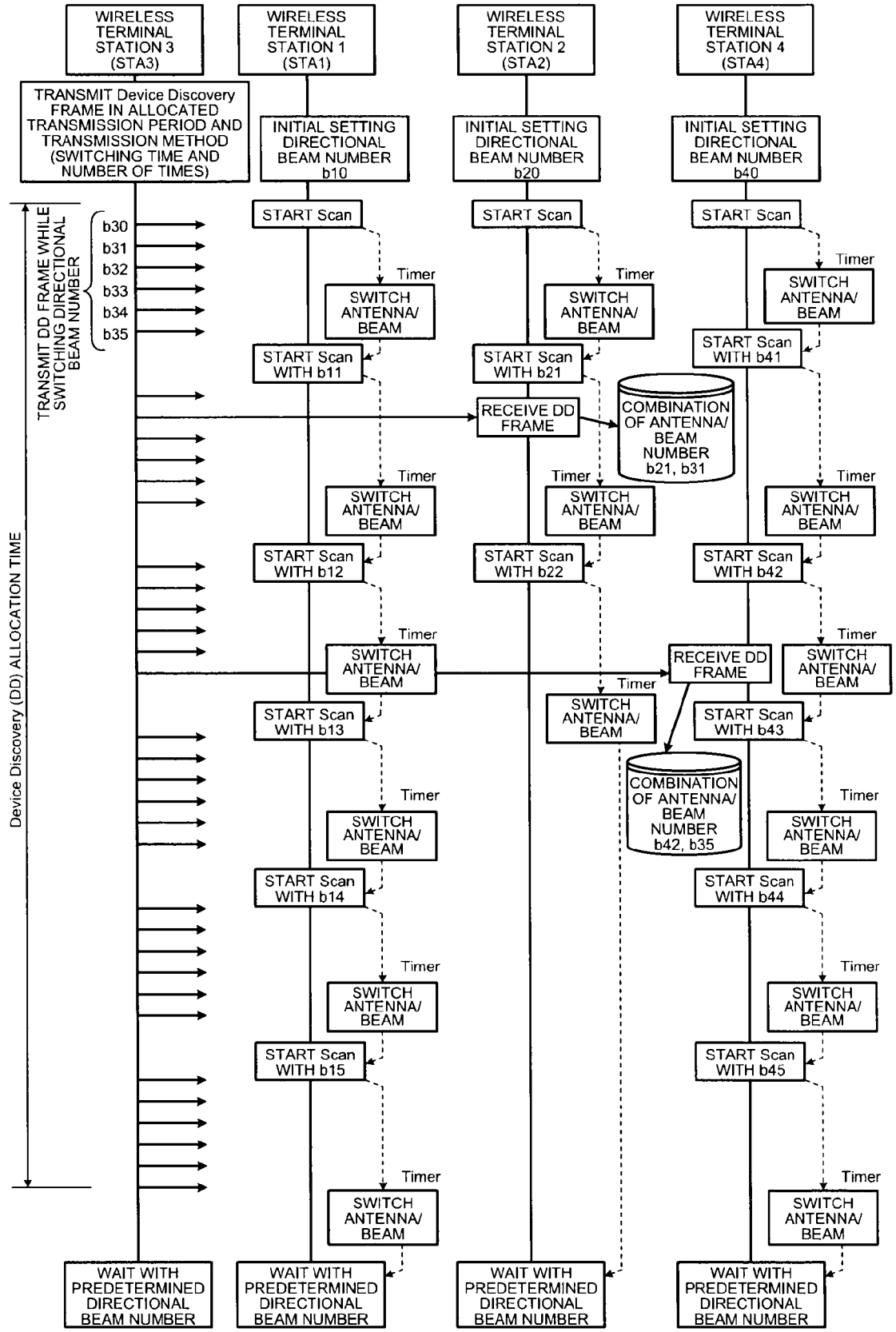
FIG. 28 is a diagram of an example of the device discovery in the fourth embodiment.

Specific operation of the respective wireless terminal stations in the DD period is explained with reference to FIG. 28. FIG. 28 is a diagram of an example of a device discovery procedure in the fourth embodiment. The wireless terminal stations 1 to 4 perform initial setting based on parameters notified by the "Device Discovery start notification". Subsequently, the wireless terminal station 3 as the request source wireless terminal station transmits a DD frame sequentially using directional beams #b30, b31, b32, b33, b34, and b35 (Step S35 in FIG. 27). When the wireless terminal stations 1, 2, and 4 receive the DD frame, the wireless terminal stations 1, 2, and 4 stores combinations of a directional beam number at that point of the wireless terminal station 3 included in the DD frame and directional beam numbers received by the wireless terminal stations 1, 2, and 4 in the information storing unit 20. The wireless terminal stations 1, 2, and 4 switch antennas/directional beams at timing determined based on antenna/directional beam switching timing notified by the "Device Discovery start notification" in advance and attempts to receive the DD frame. In this embodiment, the wireless terminal stations 1, 2, and 4 switch antennas/directional beams of the wireless terminal stations 1, 2, and 4 at timing after the wireless terminal station 3 transmits directional beams in all the directions (i.e., transmits the DD frame using a directional beam #b35).

As switching minimum time for the antennas/directional beams of the wireless terminal stations 1, 2, and 4, the wireless base station 0 can determine, based on the switching time information notified by the DBIE or the like, time in which all the terminals can be sufficiently switched and notify the switching minimum time with the "Device Discovery start notification". Timing when the wireless terminal station 3 transmits the DD frame only has to be determined by the wireless base station 0 based on the switching time information notified by the DBIE or the like.

In the example shown in FIG. 28, the wireless terminal station 2 receives the DD frame from the wireless terminal station 3 when the wireless terminal station 2 performs scan using a directional antenna with a number B21. The DD frame includes an address of the wireless terminal station 3 and a directional beam number (b31) that the wireless terminal station 3 uses to transmit the DD frame. When the wireless terminal station 2 normally receives the DD frame, the wireless terminal station 2 stores combination information of the directional beam numbers of the DD frame in the information storing unit 20 in the wireless terminal station 2.

Similarly, the wireless terminal station 4 receives the DD frame when the wireless terminal station 4 uses a directional antenna with a number B42 and stores combination information of the directional beam numbers of the DD frame in the information storing unit 20 in the wireless terminal station 4.

In an example shown in FIG. 28, the wireless terminal station 1 cannot receive a DD frame in a DD period because, for example, a propagation environment is deteriorated, a distance between terminals is long, the wireless terminal station 1 is outside a support area of a directional beam, or the DD frame cannot be normally received because of a frame error. A combination of directional beam numbers is not found until the end of the DD period.

Returning to the explanation of the device discovery procedure shown in FIG. 27, after the end of the DD period, the respective wireless terminal stations transmit DD reports (Device Discovery Reports) (Step S36*b*) and the wireless base station 0 receives the DD reports. As a notification method for the DD reports, as in the first embodiment, the wireless base station 0 notifies transmission time (timing) of the DD reports with "Device Discovery start notification" in advance. The wireless terminal stations 1, 2, and 4 can notify the DD reports at the allocated time, the wireless base station 0 can transmit a DD report request frame (DD report Request frame) to the respective wireless terminal stations, and the respective wireless terminal stations can transmit a DD report frame as a response to the DD report request frame.

In the example shown in FIG. 27, the wireless terminal station 1 notifies a DD report including information indicating "no detection" and the wireless terminal station 2 notifies a DD report including information concerning "a combination b21, b31 of directional beam numbers". The wireless terminal station 4 notifies a DD report including information concerning "a combination b42, b35 of directional beam numbers". The wireless base station 0 that receives the DD reports from the respective wireless terminal stations update a data of combinations (including combinations of directional beam numbers) with which the connected wireless stations can perform direct communication. The wireless base station 0 notifies the respective wireless terminal stations of "combination information of directional beam numbers" with an announcement information frame or an individual frame (Step S38). The respective wireless terminal stations store the notified "combination information of directional beam numbers" in the information storing units and, when the wireless terminal stations perform direct inter-terminal communication after that, the wireless terminal stations select, based on the stored in formation, directional beams to be used.

As explained above, in this embodiment, the wireless base station 0 allocates a DD period to a specific wireless terminal station (in the above example, the wireless terminal station 3). The specific wireless terminal station transmits a DD frame using a directional beam. On the other hand, the other wireless terminal stations that receive the DD frame notifies the wireless base station 0 of a result of the reception with a DD report. The wireless base station 0 updates the database. The wireless base station 0 transmits combination (combination of wireless terminal stations that can perform direct communication) information of directional beam numbers using an announcement information frame or an individual frame to thereby notify the respective wireless terminal stations connected to the wireless base station 0 of the combination information. Consequently, the wireless terminal station can detect the other wireless terminal stations and can perform direct inter-terminal communication.

In the example explained in this embodiment, device discovery is executed by the wireless base station 0 immediately after the connection sequence of the wireless terminal station 3. However, the present invention is not limited to this sequence (i.e., a sequence in which, when a wireless terminal station executes the connection sequence, the wireless terminal station subsequently executes device discovery). For example, it is also possible to cause the respective terminals to perform device discovery at every fixed period. Alternatively, when the wireless base station detects that the respective terminals move or a line state worsens, it is also possible to cause the respective terminals to perform device discovery with the detection as a trigger.

Fifth Embodiment

A fifth embodiment is explained. In the first to fourth embodiments, the method of a wireless terminal station detecting a wireless base station, a device discovery procedure for a request source wireless terminal station of direct communication to perform direct communication with a specific request destination wireless terminal station based on information notified from a wireless base station, and the procedure for the request source wireless terminal station to detect a wireless terminal station that is present around the request source wireless terminal station and can perform direct communication are explained. In this embodiment, a frame format (A-MSDU) exchanged between a wireless base station and a wireless terminal station or between wireless terminal stations to realize highly efficient communication is explained.

The frame format explained in this embodiment can be applied to all the wireless communication systems according to the first to fourth embodiments.

Figure 29:
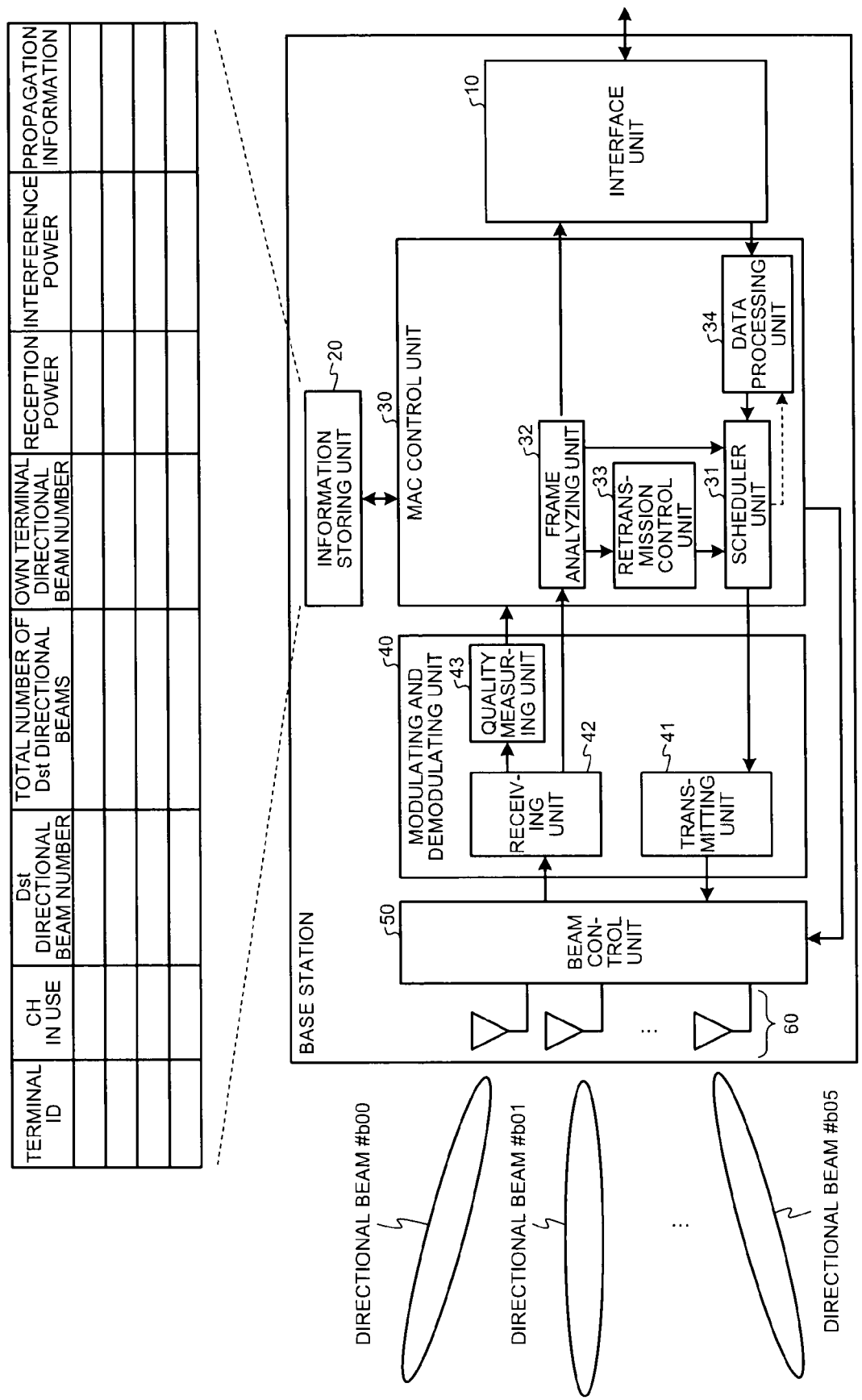
FIG. 29 is a diagram of a circuit configuration example of a wireless base station according to a fifth embodiment.

FIG. 29 is a diagram of a circuit configuration example of a wireless base station according to the fifth embodiment. In this wireless base station, a data processing unit 34 is added to the circuit configuration example of the wireless base station 0 explained in the first to fourth embodiments. Other components are the same as those of the base station 0. Therefore, the components are denoted by the same reference numerals and signs and explanation of the components is omitted. The data processing unit 34 applies, based on a propagation environment, QoS, and the like and according to an instruction from the scheduler unit 31, grant of a sequence number, grant of a fragmentation number, grant of a MAC header, frame aggregation and fragmentation, and the like to transmission data passed from the interface unit 10 and creates a transmission frame. The frame analyzing unit 32 has a function of dividing, if a received frame is aggregated, the frame for each MSDU and passes the divided frames to the interface unit 10 or creating, when the frame is fragmented, an MSDU from a plurality of fragments and passes the MSDU to the interface unit 10.

As explained above, the PHY frame format specified in the conventional ultra-wideband wireless system includes a MAC header in a PLCP header. Therefore, the MAC header can be transmitted with relatively robust transmission system/encoding ratio. However, a frame aggregation technology proposed in the ultra-wideband wireless system is configured to aggregate a plurality of MSDUs and adding a MAC header and an FCS to the aggregated frame. Therefore, there is a problem in that, in a situation in which a propagation path is deteriorated, frame length cannot be extended or frame transmission is often performed and throughput is not increased. Further, because a target of frame aggregation is only a Data frame, frame aggregation with other ACK frames and Command frames cannot be performed. Therefore, for example, there is a problem in that, when bidirectional traffic occurs, it is necessary to transmit an ACK frame responding to a received frame separately from an aggregated data frame (Aggregated Data frame).

Figure 30:
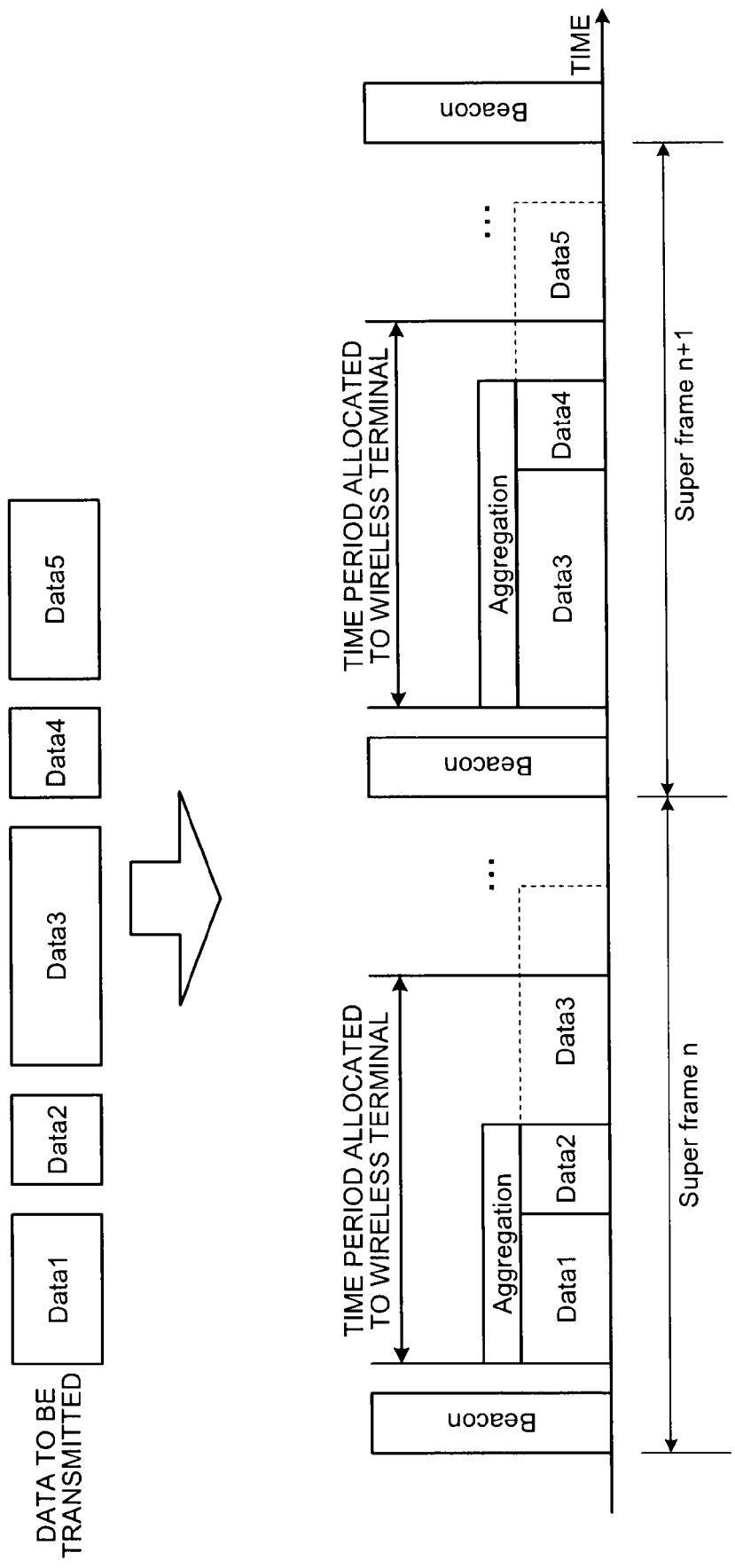
FIG. 30 is a diagram for explaining a problem at the time of conventional aggregation and band allocation.

Variable-length frames are simply aggregated and transmitted and frame length substantially changes for each burst. Therefore, as shown in FIG. 30, even if it is attempted to perform aggregation and effectively use an allocated time period, aggregation cannot be performed when time exceeds a time period allocated to a wireless terminal because of the aggregation. Therefore, as a result, there is a problem in that the allocated time period cannot be effectively used. Further, because frame size is different for each burst, there is a problem in that, in the system, a fixed PER (Packet Error Rate) cannot be guaranteed.

Figure 31:
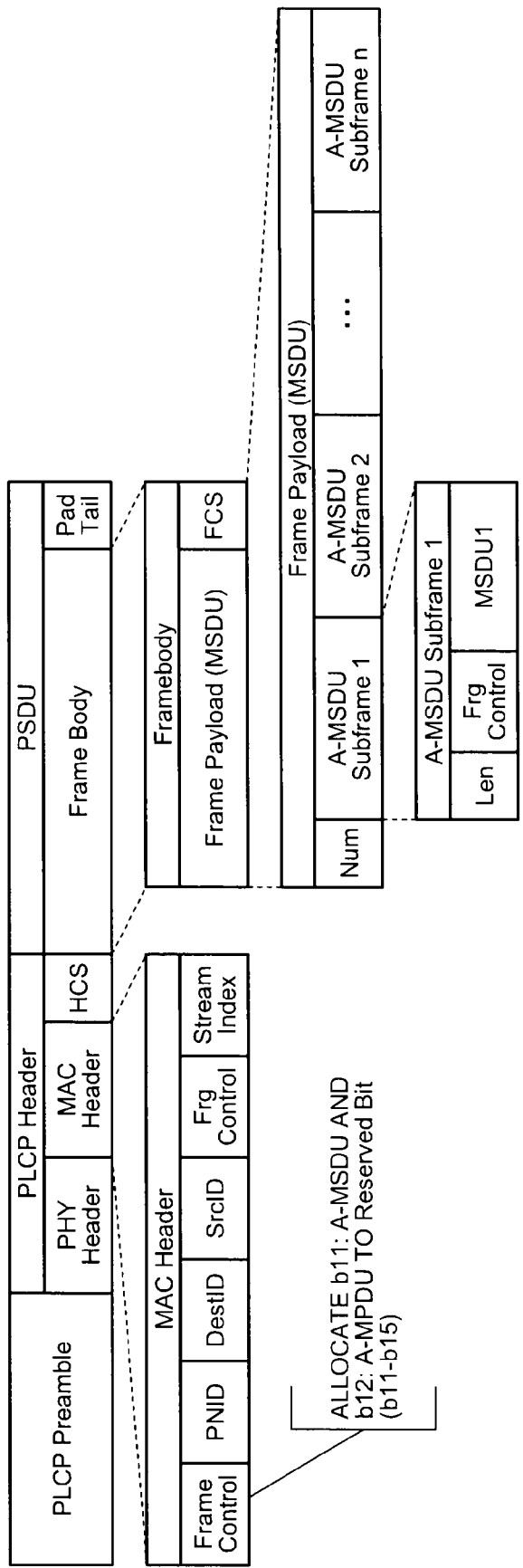
FIG. 31 is a diagram of a configuration example of a frame used in the fifth embodiment.

Therefore, in this embodiment, a frame aggregation system for solving such problems is explained. FIG. 31 is a diagram of an example of a PHY frame format in performing A-MSDU exchanged between a wireless base station and respective wireless terminal stations according to this embodiment.

As shown in FIG. 31, this PHY frame a PLCP (Physical Layer Convergence Protocol) preamble section for performing time synchronization/frequency synchronization/AGC, carrier detection, and the like, a PLCP header including information for demodulating a PSDU (PLCP Protocol Data Unit), a frame body (Frame Body) unit, and a PSDU unit including Tail bits and Pad bits added as required.

The frame body section includes a frame payload section (also referred to as MSDU) and an FCS section. In the A-MSDU in this embodiment, the frame payload section includes a plurality of A-MSDU Subframe sections (also referred to as sub-frame payload sections) and a Num (Number) section indicating the number of A-MSDU Subframes.

The A-MSDU Subframe section includes a Length section indicating MSDU length, a Fragmentation Control section including fragmentation and a frame sequence number, and one MSDU.

In this embodiment, it is also possible to use a Reserved Bit (e.g., b11) in a Frame Control field in a MAC header to indicate an A-MSDU. In the case of an A-MSDU not including a plurality of sequence numbers, the Fragmentation Control section of the A-MSDU Subframe section can be omitted. The Num section can be included in the MAC header. A method of using a More A-MSDU Subframe field indicating the presence of the next A-MSDU Subframe in each of the A-MSDU Subframes can be adopted.

A method of creating, using the frame format, a quasi-fixed length frame and efficiently using a band is explained.

A method of creating a quasi-fixed length frame using fragmentation and aggregation in combination is explained below. In an example shown in FIG. 32, the data processing unit 34 adds a sequence number to each of data passed from an upper layer (e.g., the interface unit 10). Further, the data processing unit 34 carries out fragmentation on an MSDU2 to thereby divide the MSDU2 into two (MSDU2 Frag1 and MSDU2 Frag2) and aggregates the MSDU1 and the MSDU2 Frag1 to create a quasi-fixed length frame. This state is shown in the figure.

Figure 32:
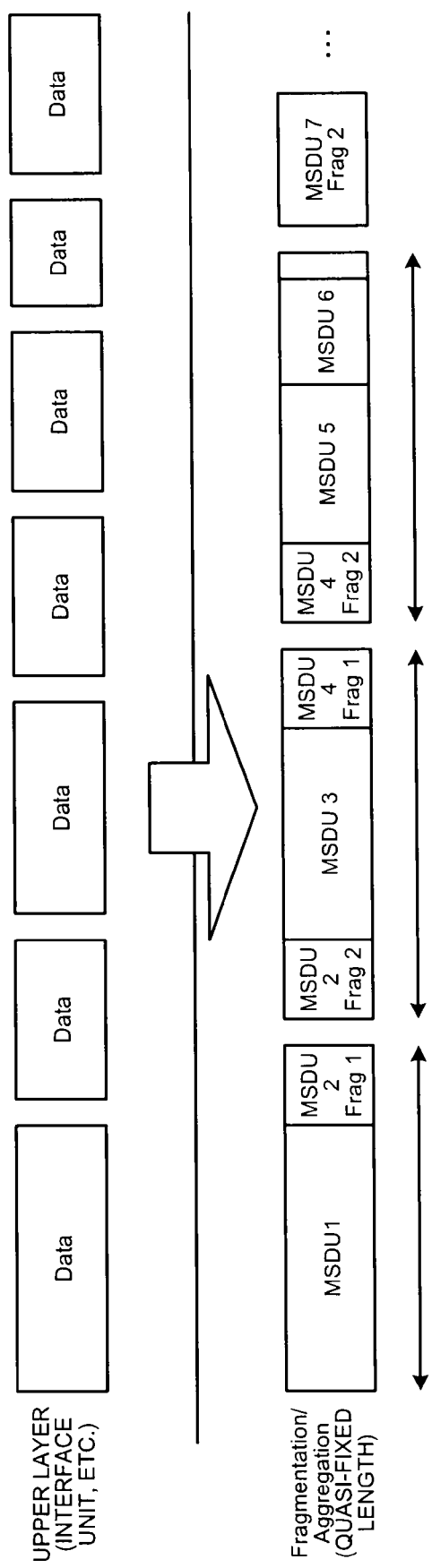
FIG. 32 is a diagram for explaining a method of creating a quasi-fixed length frame.

In the example shown in FIG. 32, aggregation is performed after fragmentation is carried out. However, for data of the same type transmitted to the same destination, it is also possible to perform control for, after carrying out aggregation to create a long frame in advance, carrying out fragmentation and slicing a quasi-fixed length frame.

A frame type field specified anew in the present invention is explained. In this embodiment, a frame format in which a plurality of frames such as Data+ACK and Data+Command are aggregated in the conventional frame type field anew is specified (see FIG. 33).

This makes it possible to aggregate a plurality of kinds of frames and transmit the frames at a time. In other words, it is possible to aggregate a Data frame and an ACK frame or aggregate a Data frame and a Command frame. When a plurality of frame types are aggregated, if a position of an ACK or Command frame is inserted at the start of the A-MSDU in advance, it is possible to easily analyze the frame.

Figure 34:
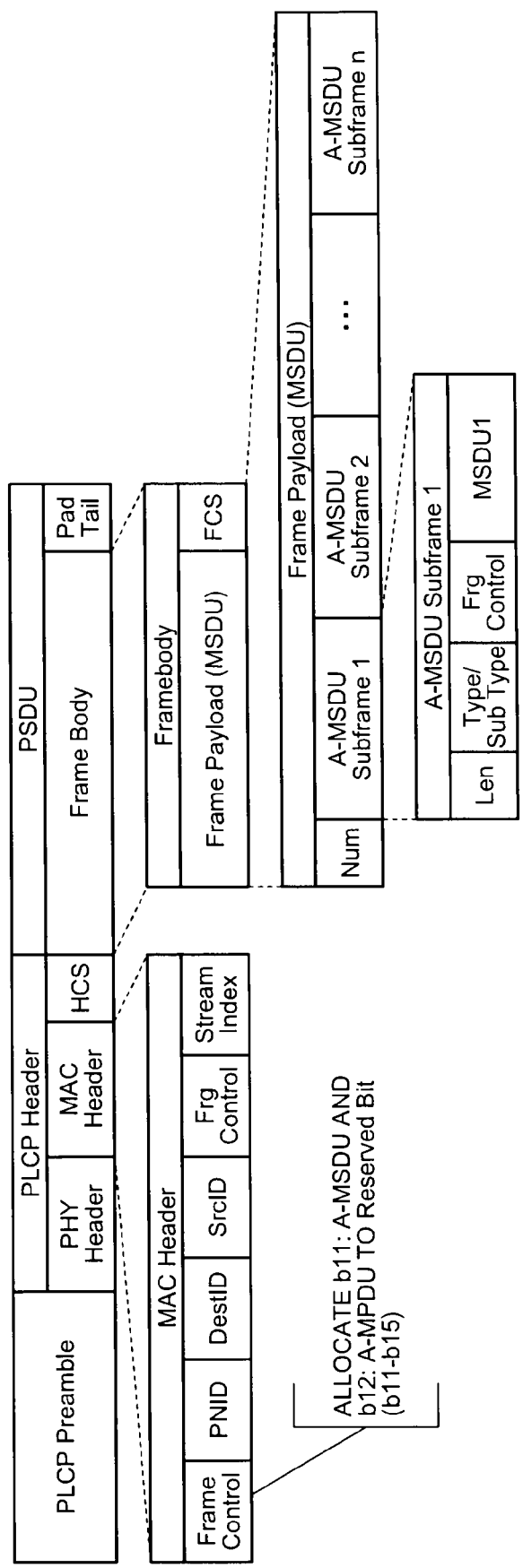
FIG. 34 is a diagram of a configuration example of a frame used in the fifth embodiment.

Rather than extending the Frame Type field, as indicated by an example shown in FIG. 34, a Frame Type field and a Frame SubType field (a frame subtype field) for indicating a type of each MSDU can be added in the A-MSDU Subframe (e.g., the Frame Type field and the Frame SubType field are inserted between Len and Frg Control).

As explained above, in this embodiment, a Fragmentation Control field is added anew in the A-MSDU Subframe. Therefore, for example, the data processing unit 34 can apply, as required, fragmentation to a plurality of variable length data passed from the interface unit 10 and further apply aggregation thereto to thereby complete a quasi-fixed length data frame. A buffer management on a reception side can be simplified. Because short packets are aggregated as one packet without being repeatedly transmitted, it is possible to reduce PHY overhead and protocol overhead such as carrier sense and back-off algorithm and realize high efficiency. Further, because a plurality of kinds of frames are aggregated in one frame, it is possible to reduce PHY overhead and protocol overhead such as carrier sense and back-off algorithm and realize high efficiency. Aggregation and fragmentation can be simultaneously used as explained in this embodiment or can be exclusively used. In this embodiment, the operation of the wireless base station is explained as an example. However, the present invention is also applicable to the wireless terminal stations. In other words, the present invention is applicable to both communication between the wireless base station and the wireless terminal stations and communication between the wireless terminal stations.

Sixth Embodiment

A sixth embodiment is explained. In the first to fifth embodiments, the method of a wireless terminal station detecting a wireless base station, a device discovery procedure for a request source wireless terminal station of direct communication to perform direct communication with a specific request destination wireless terminal station based on information notified from a wireless base station, the procedure for the request source wireless terminal station to detect a wireless terminal station that is present around the request source wireless terminal station and can perform direct communication, and the MSDU aggregation are explained. In this embodiment, a frame format (A-MPDU) exchanged between a wireless base station and a wireless terminal station or between wireless terminal stations to realize highly efficient communication is explained.

The frame format explained in this embodiment can be applied to all the wireless communication systems according to the first to fourth embodiments. A method of combining fragmentation and aggregation and parameters of a Type field are the same as those in the fifth embodiment. Therefore, explanation of the method and the parameters is omitted.

As explained in the fifth embodiment as well, the frame aggregation technology (system) proposed in the conventional ultra-wideband wireless system has the problems in that, for example, throughput is not increased in a situation in which a propagation path is deteriorated, a target of aggregation is only a data frame, a time period cannot be effectively used, and a PER cannot be guaranteed in a system. Therefore, in this embodiment, a frame aggregation system for solving such problems, which is different from the system explained in the fifth embodiment, is explained.

Figure 35:
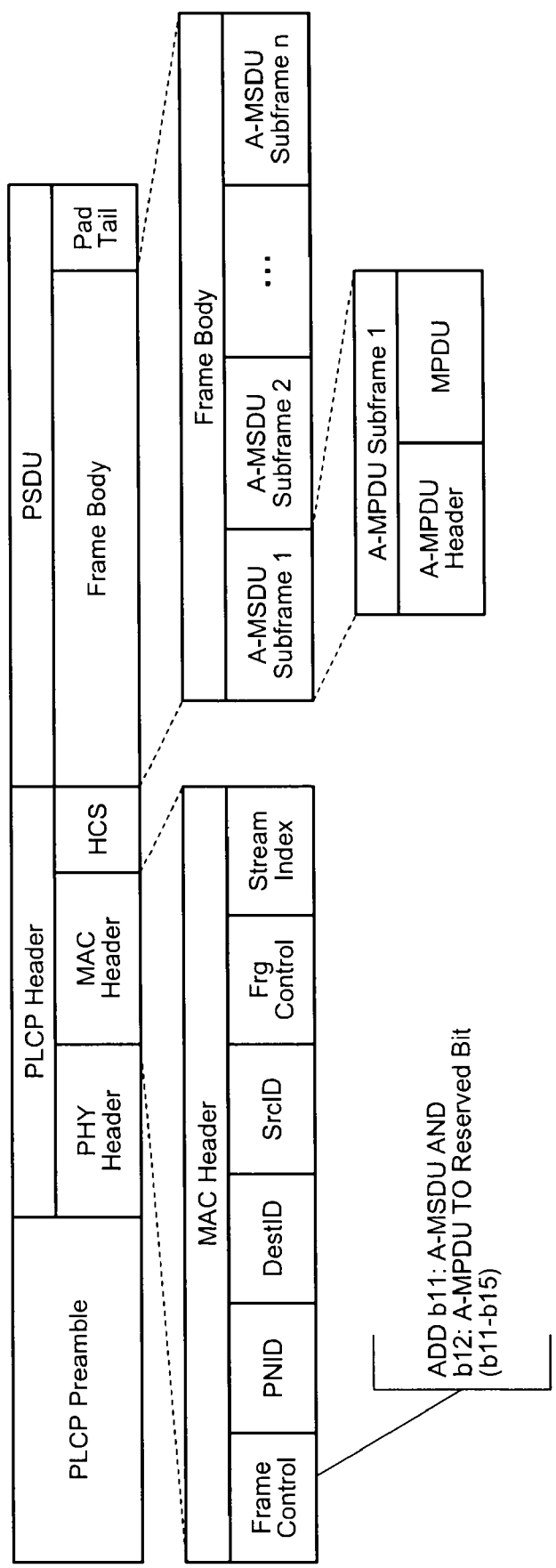
FIG. 35 is a diagram of a configuration example of a frame used in a sixth embodiment.

FIG. 35 is a diagram of an example of a PHY frame format in performing A-MPDU exchanged between a wireless base station and wireless terminal stations 1 to 3 according to this embodiment.

As shown in FIG. 35, this PHY frame includes a PLCP (Physical Layer Convergence Protocol) preamble section for performing, time synchronization/frequency synchronization/AGC, carrier detection, and the like, a PLCP header section including information for demodulating a PSDU (PLCP Protocol Data Unit), a frame body section, and a PSDU section including Tail bits and Pad bits added as required.

The frame body section of the PSDU includes a plurality of A-MPDU Subframe sections (A-MPDU Subframe 1, A-MPDU, Subframe 2, . . . ). The A-MPDU Subframe section includes an A-MPDU Header section and an MPDU section.

Figure 36:
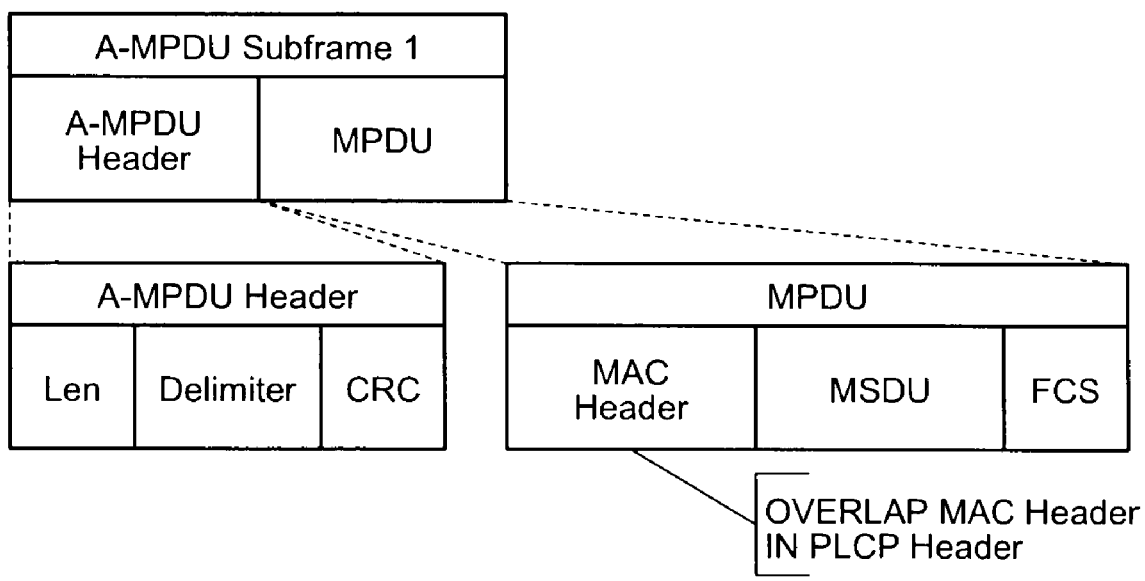
FIG. 36 is a diagram of a configuration example of an A-MPDU Subframe section.

Further, as shown in FIG. 36, the A-MPDU header section includes a Length field indicating frame length of the MPDU section, a Delimiter section including a unique word for detecting a frame, and a CRC as a header check sequence for a header section. The MPDU section includes a MAC header section, an MSDU section corresponding to frame payload, and an FCS for distinguishing right and wrong of a frame.

Figure 37:
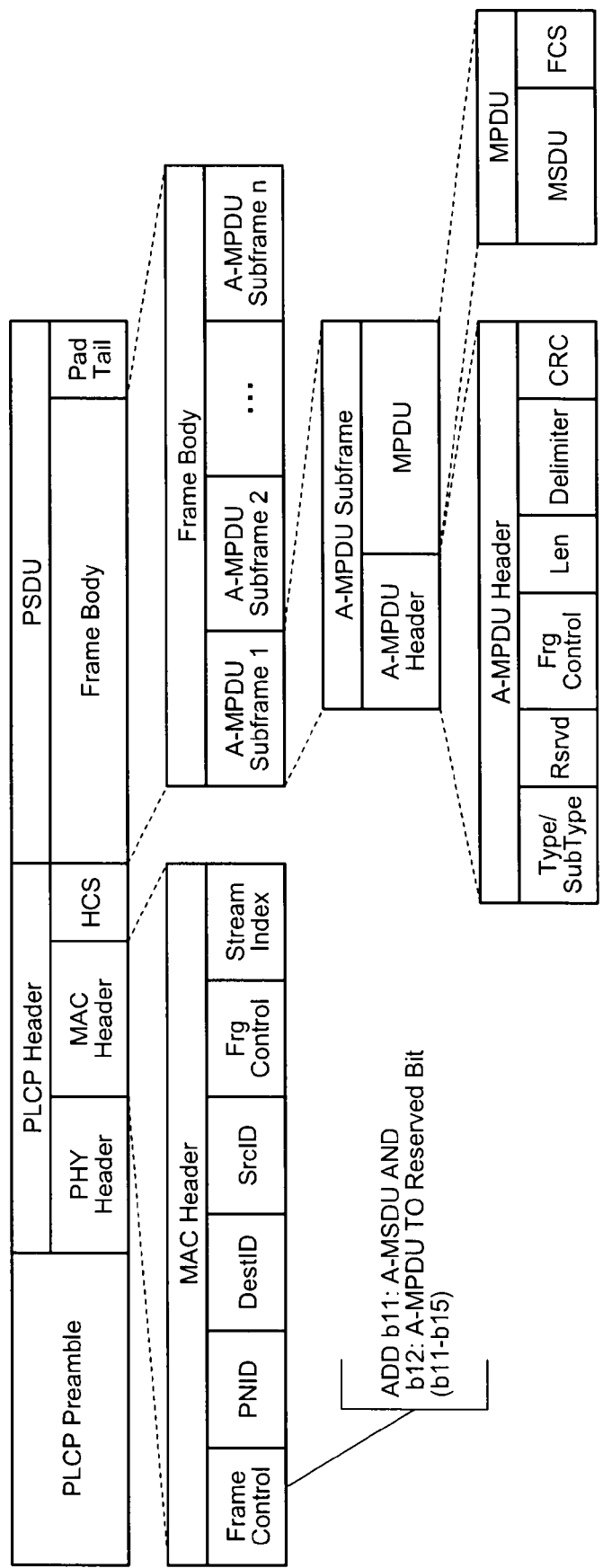
FIG. 37 is a diagram of a configuration example of a frame used in the fifth embodiment.

Because the MAC header section overlaps that present in the PLCP header, the MAC header section can be partially omitted. When the MAC header section is partially omitted, as shown in FIG. 37, the MAC header section can partially include a Type/SubType field and Frg Control (Fragmentation Control) field.

A method of creating a quasi-fixed length frame using fragmentation and aggregation in combination is explained. In an example shown in FIG. 38, the data processing unit 34 adds a sequence number to each of data passed from an upper layer (e.g., the interface unit 10). Further, the data processing unit 34 carries out fragmentation on an MSDU2 to thereby divide the MSDU2 into two (MSDU2 Frag1 and MSDU2 Frag2) and aggregates the MSDU1 and the MSDU2 Frag1 to create a quasi-fixed length frame. This state is shown in the figure.

Figure 38:
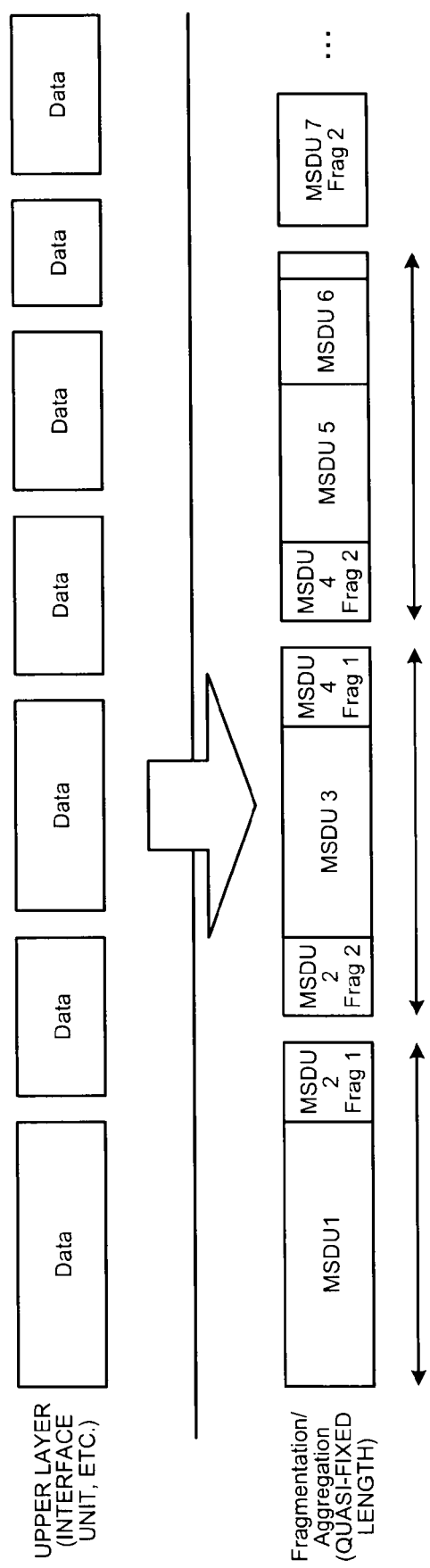
FIG. 38 is a diagram for explaining a method of creating a quasi-fixed length frame.

In the example shown in FIG. 38, aggregation is performed after fragmentation is carried out. However, for data of the same type transmitted to the same destination, it is also possible to perform control for, after carrying out aggregation to create a long frame in advance, carrying out fragmentation and slicing a quasi-fixed length frame.

A new Frame Type field specified anew in the present invention is explained. In this embodiment, a frame format in which a plurality of frames such as Data+ACK and Data+Command are aggregated in the conventional Frame Type field anew is specified (see FIG. 39).

This makes it possible to aggregate a plurality of kinds of frames and transmit the frames at a time. When a plurality of frame types are aggregated, if a position of an ACK or Command frame is inserted at the start of the A-MSDU in advance, it is possible to easily analyze the frame.

In the conventional ultra-wideband wireless system (UWB) and the like, an A-MPDU is not implemented. However, as indicated by the present invention, by realizing an A-MPDU frame format in the PHY frame format in which the MAC header section is included in the PLCP header section, even in a large-capacity wireless communication system of a millimeter wave, it is possible to efficiently transmit a data frame in the same manner as at the time when the A-MSDU is used.

In particular, in the present invention, necessary header sections and FCS sections can be added to the respective frames. As a result, even if an A-MPDU Subframe is partially lost because of a cause such as fading, interference, or collision, it is possible to cut and receive A-MPDU Subframes other than the lost A-MPDU Subframe. Therefore, even when a long frame of several Kbytes to several tens Kbytes is created, it is unnecessary to retransmit the entire frame. It is possible to improve retransmission efficiency by partially selecting and retransmitting the frame as required. When an ACK frame as an acknowledgement frame is unnecessary, the entire frame is not lost but data is only partially lost. Therefore, extremely efficient data delivery is possible for streaming, sound, and the like for which some packet error can be allowed but delay cannot be allow.

In this embodiment, the operation of the wireless base station is explained as an example. However, the present invention is also applicable to the wireless terminal stations as in the fifth embodiment.

Seventh Embodiment

A seventh embodiment is explained. In the first to sixth embodiments, the method of a wireless terminal station detecting a wireless base station, a device discovery procedure for a request source wireless terminal station of direct communication to perform direct communication with a specific request destination wireless terminal station based on information notified from a wireless base station, the procedure for the request source wireless terminal station to detect a wireless terminal station that is present around the request source wireless terminal station and can perform direct communication, the MSDU aggregation, and the MPDU aggregation are explained. In this embodiment, a frame format exchanged between a wireless base station and a wireless terminal station or between wireless terminal stations to realize highly efficient communication is explained as in the fifth and sixth embodiments.

The frame format explained in this embodiment can be applied to all the wireless communication systems according to the first to fourth embodiments. A system not using frame aggregation and a system using frame aggregation (A-MSDU, A-MPDU) can be identified from fields (information) in frames. Therefore, it is possible to freely use the systems according to each terminal, each application, a combination of the terminal and the application, and the like. Description of fields of antenna number and the like in a frame is omitted for convenience of explanation. However, the frame format can also be applied to the methods (the device discovery operation, etc. in the first to fourth embodiments. Naturally, the frame format is not limited. A method of combining fragmentation and aggregation and parameters of the TYPE field are the same as those in the fifth and sixth embodiments explained above. Therefore, explanation of the method and the parameters is omitted.

Figure 40:
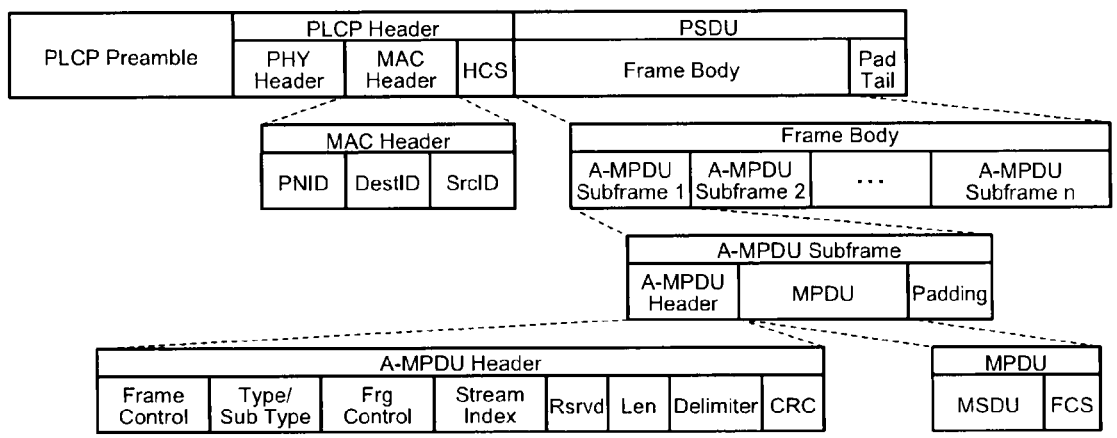
FIG. 40 is a diagram of a configuration example of a frame used in a seventh embodiment.

FIG. 40 is a diagram of an example of a PHY frame format in performing A-MPDU exchanged between a wireless base station and wireless terminal stations 1 to 3 according to this embodiment. As shown in FIG. 40, this PHY frame includes a PLCP (Physical Layer Convergence Protocol) preamble section for performing, time synchronization/frequency synchronization/AGC, carrier detection, and the like, a PLCP header section including information for demodulating a PSDU (PLCP Protocol Data Unit), a frame body section, and a PSDU section including Tail bits and Pad bits added as required.

A difference from the PHY frame (see FIGS. 35 and 36) explained in the sixth embodiment is explained. In a PHY frame in this embodiment, compared with the PHY frame explained in the sixth embodiment, a redundant portion is deleted from a MAC header to realize improvement of efficiency of a PLCP header. An A-MPDU bit for notifying that aggregation is performed can be arranged in a PLCP preamble as an identification code such as a spread code as explained in the fifth or sixth embodiment, or can be arranged in the PLCP header, or can be arranged in the MAC header. Padding for bounding data length with byte length determined in advance is inserted in an A-MPDU sub-frame as required. Notification of an A-MPDU can be inserted in the MAC Header or can be inserted in the PLCP header as explained in the first embodiment. Alternatively, information indicating a frame configuration can be coded in the PLCP Preamble section and pattern detection is performed to detect the frame configuration.

An A-MPDU header section includes, to indicate information of the MPDU in the A-MPDU sub-frame, a frame control field, a frame type/subtype field, a fragmentation control (Frg Control) field, a stream index field, a length field, a delimiter field, a CRC field, and a field for identifying QoS.

By adopting such a configuration, respective A-MPDU sub-frame individually have frame type/subtype fields indicating types of frames. For example, it is possible to multiplex frames of different frame types such as Data and BlockACK frames, Data and ManagementFrame frames, and Data and Command frames. When frames of the same type are treated, it is possible to efficiently multiplex frames of different stream levels or QoS levels such as best-effort data and VoIP data.

When a plurality of frame types are aggregated, if a position of a frame of ACK or Command is inserted at the start of an A-MPDU in advance, it is possible to easily analyze the frame. When a frame such as a Block ACK request for requesting ACK for a plurality of MPDUs is aggregated, the frame is allocated to the next A-MPDU sub-frame of a corresponding last MPDU or allocated to the last A-MPDU sub-frame. Consequently, a reception side of the frame does not need to perform order control for each frame type. Therefore, it is possible to easily analyze the frame.

As in the fifth and sixth embodiments, it is also possible to perform control for, after carrying out aggregation to create a long frame in advance, carrying out fragmentation and slicing a quasi-fixed length frame. Frame Control, Frg Control, and Stream Index included in the A-MPDU header can be included before the MSDU frame in the MPDU. The order of fields in the A-MPDU header is not limited to the order in this embodiment.

In the conventional ultra-wideband wireless system (UWB) or the like, an A-MPDU is not implemented. However, as indicated by the present invention, by realizing an A-MPDU frame format in the PHY frame format in which the MAC header section is included in the PLCP header section, even in a large-capacity wireless communication system of a millimeter wave, it is possible to efficiently transmit a data frame in the same manner as at the time when the A-MSDU is used.

In particular, in the present invention, necessary header sections and FCS sections can be added to the respective frames. As a result, even if an A-MPDU Subframe is partially lost because of a cause such as fading, interference, or collision, it is possible to cut and receive A-MPDU Subframes other than the lost A-MPDU Subframe. Therefore, even when a long frame of several Kbytes to several tens Kbytes is created, it is unnecessary to retransmit the entire frame. It is possible to improve retransmission efficiency by partially selecting and retransmitting the frame as required. When an ACK frame as an acknowledgement frame is unnecessary, the entire frame is not lost but data is only partially lost. Therefore, extremely efficient data delivery is possible for streaming, sound, and the like for which some packet error can be allowed but delay cannot be allow.

Figure 41:
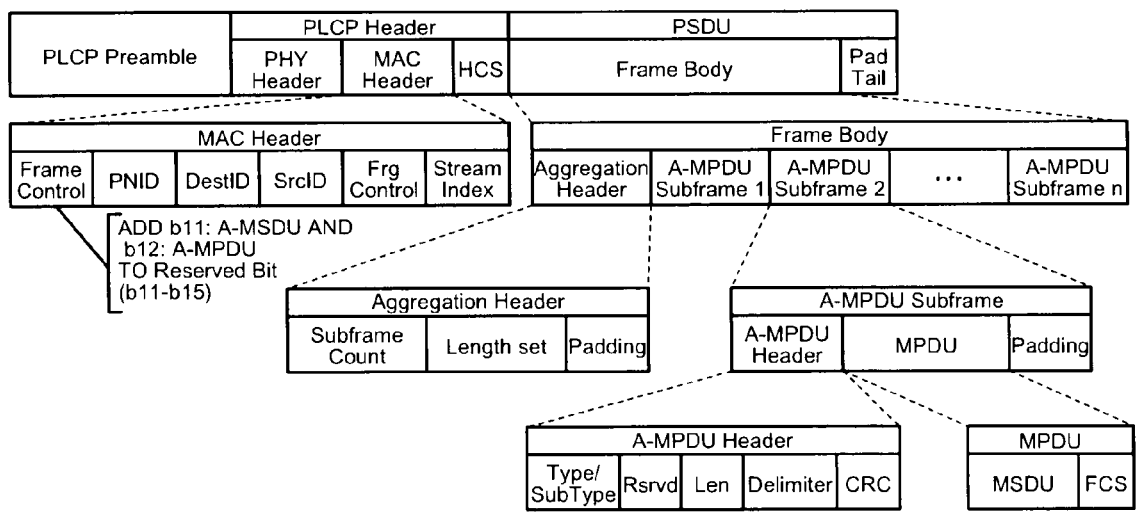
FIG. 41 is a diagram of a configuration example of a frame used in the seventh embodiment.

As shown in FIG. 41, it is also possible to individually add an aggregation header to a PSDU. In this case, the aggregation header includes a sub-frame number (Subframe Count) indicating the number of sub-frames, a plurality of length fields (Length Set) indicating each of sub-frame lengths, and Padding for bounding, as required, data length with byte length determined in advance. Because lengths (Length Set) in this sub-frame overlap lengths in the A-MPDU header, the lengths can be exclusively used. In other words, it is possible to delete the lengths in the sub-frame or the lengths in the A-MPDU header.

Figure 42:
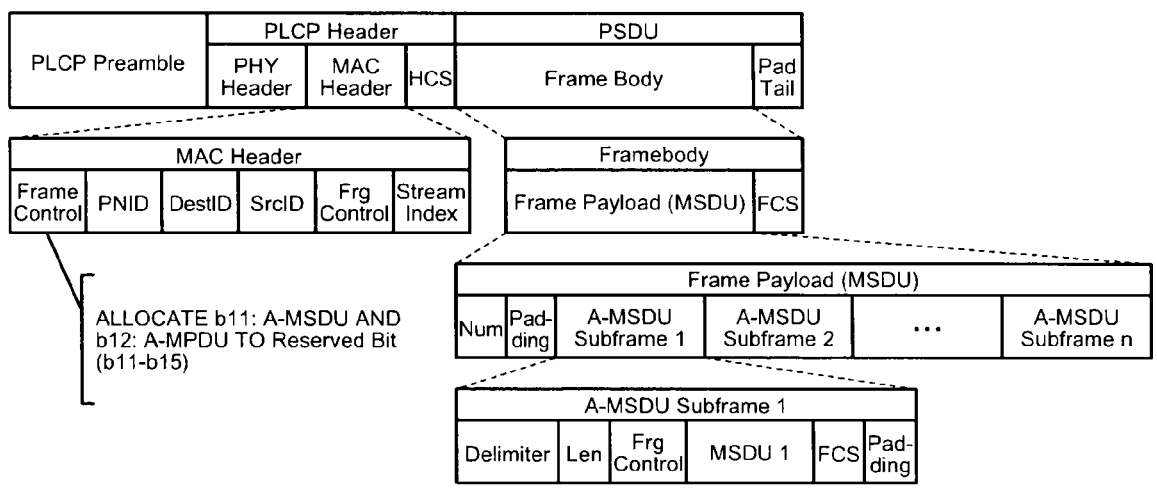
FIG. 42 is a diagram of a configuration example of a frame used in the seventh embodiment.
Figure 43:
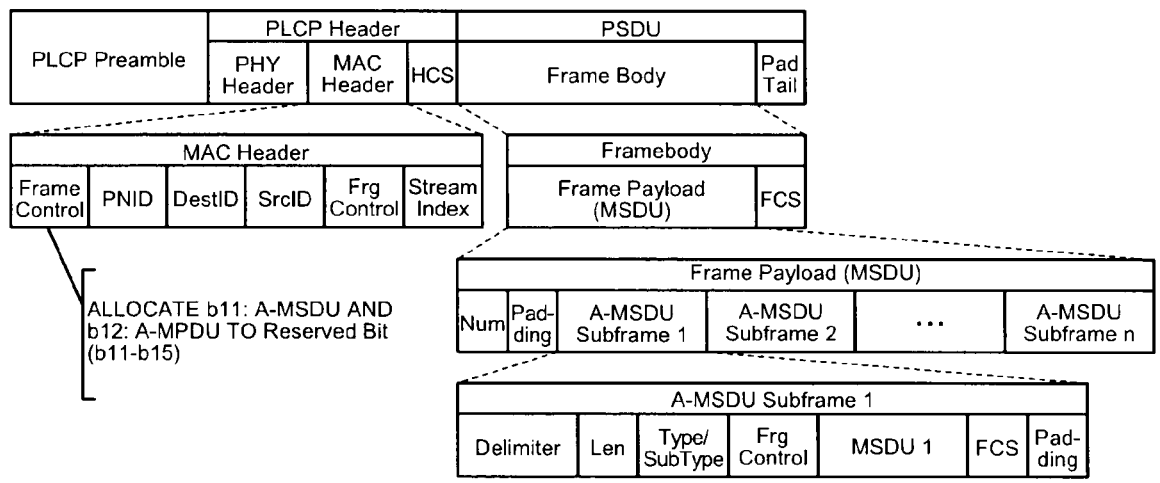
FIG. 43 is a diagram of a configuration example of a frame used in the seventh embodiment.

In FIGS. 31 and 34 referred to in the fifth embodiment, the frame in which the A-MSDU sub-frame includes Len, Frg Control, and MSDU is shown. However, a delimiter for detecting a frame top position and an FCS and Padding in sub-frame units can be inserted. In other words, a configuration shown in FIGS. 42 and 43 can be adopted. In this case, an FCS of a frame body can be omitted to reduce a circuit size.

In this embodiment, a PHY frame format in which frames of different frame types can be multiplexed by an A-MPDU is defined anew and the A-MPDU is performed by using the format defined anew. This makes it possible to aggregate a plurality of kinds of frames and transmit the frames, which is impossible in the past.

Eighth Embodiment

An eighth embodiment is explained. In the first to seventh embodiments, the method of a wireless terminal station detecting a wireless base station, a device discovery procedure for a request source wireless terminal station of direct communication to perform direct communication with a specific request destination wireless terminal station based on information notified from a wireless base station, the procedure for the request source wireless terminal station to detect a wireless terminal station that is present around the request source wireless terminal station and can perform direct communication, the MSDU aggregation, and the MPDU aggregation are explained. In this embodiment, a method of suppressing a careless connection request from a wireless terminal station and a new wireless base station, which could be interference, transmission of an announcement signal such as Beacon, and the like by specifying a connection control system for unexpected new wireless terminal station and new wireless base station is explained.

Figure 44:
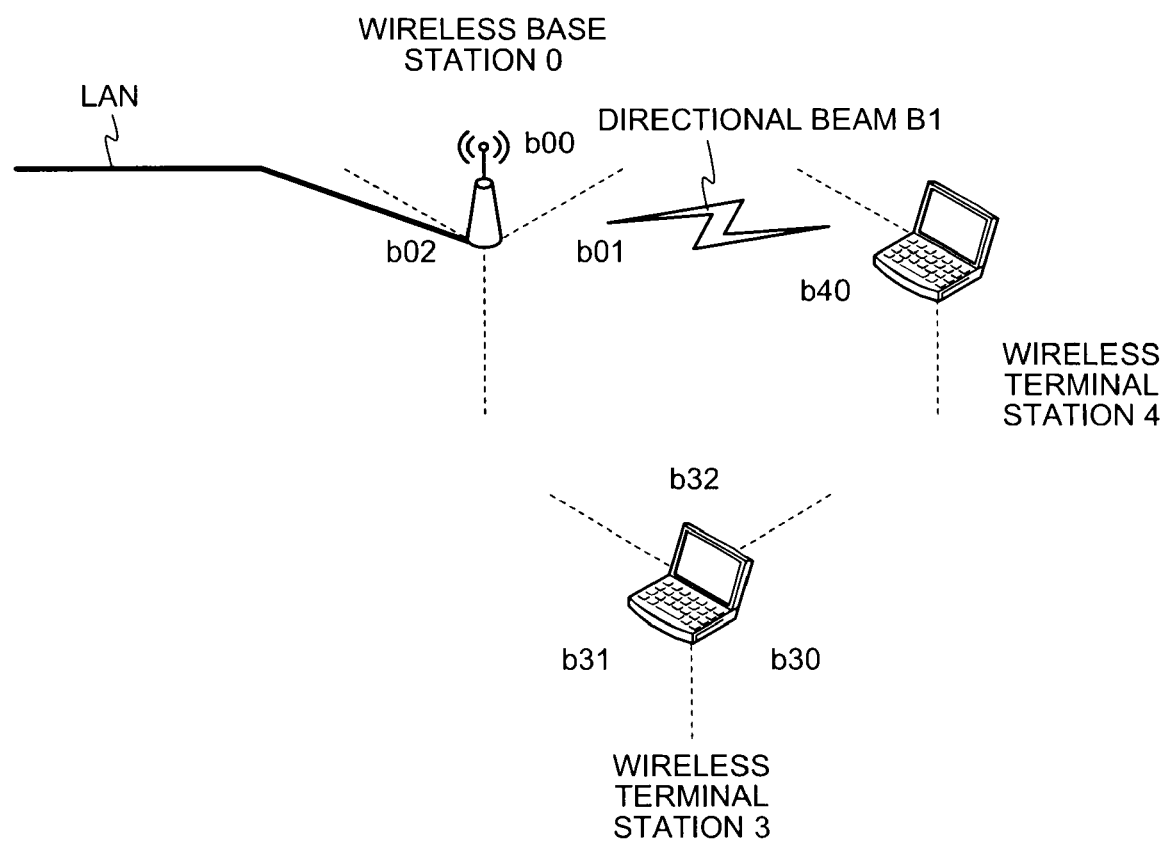
FIG. 44 is a diagram of a configuration example of an eighth embodiment of the wireless communication system according to the present invention.

FIG. 44 is a diagram of a configuration example of an eighth embodiment of the wireless communication system according to the present invention. This wireless communication system includes a wireless base station (which may also be referred to as PNC or AP) 0 connected to, for example, a LAN as a wired network, a wireless terminal station (which may also be referred to as DEV or STA) 3 set in a service area of the wireless base station 0, and the wireless terminal station 4 started anew. As in the first embodiment and the like explained above, areas divided by dotted lines arranged around the wireless base station 0 and the wireless terminal stations 3 and 4 indicate directions of directional beams set for convenience. This indicates that, when the wireless base station 0 transmits data or the like in the respective directions, the wireless base station 0 can transmit the data or the like using directional beams formed in desired directions by setting directional beams of beam numbers (b00, b01, and b02) shown in the areas (also referred to as sectors). The same applies to dotted lines arranged around the respective wireless terminal stations 3 and 4. The directional beams can be something like beam forming formed by a plurality of antennas. Alternatively, a plurality of directional antennas can be provided and switched to create directional beams.

As the respective communication apparatuses (the wireless base station and the wireless terminal stations) according to this embodiment, unlike the embodiments explained above, a system that can direct directional beams only in specific directions to perform communication is assumed. Directions, angles, the number of times of switching, and the like of the directional beams are not limited to those explained in this embodiment. In the example shown in FIG. 44, a signal that the wireless base station 0 transmits with the directional beam number b01 can be received with a directional beam number b32 of the wireless terminal station 3 and a directional beam number b40 of the wireless terminal station 4.

In the wireless access system with strong directivity, a wireless base station may not be able to be detected regardless of the fact that the wireless base station is present in a communication area (an area in which both apparatuses can perform communication if directional beams thereof are set opposite to each other). Therefore, there is a problem in that, when the wireless terminal station 4 started anew has a function of operating as a wireless base station and cannot detect an existing wireless base station, the wireless terminal station 4 itself operates as a new base station to form a new network. There is also a problem in that a sufficient band cannot be guaranteed for a terminal communicating with the existing wireless base station in a CAP period (Contention Access Period) as a random access period because of a careless connection request from other terminals or announcement signal transmission from a new base station. Therefore, the present invention provides a mechanism for suppressing transmission from a wireless terminal station that could be interference with an existing network (also referred to as piconet).

In this embodiment, the wireless terminal station 4 is explained as a wireless terminal started anew. However, the wireless terminal station 4 is not limited to a wireless terminal station. Control operation explained later can also be applied to a wireless base station started anew. Further, in a system such as a wireless PAN (Personal Area Network), when a wireless terminal station is actuated and a wireless base station synchronizing with the wireless terminal station is not found, the wireless terminal station itself may operate as a wireless base station. In other words, it is likely that the wireless terminal station operates as a wireless base station or the wireless base station operates as a wireless terminal station.

Figure 45:
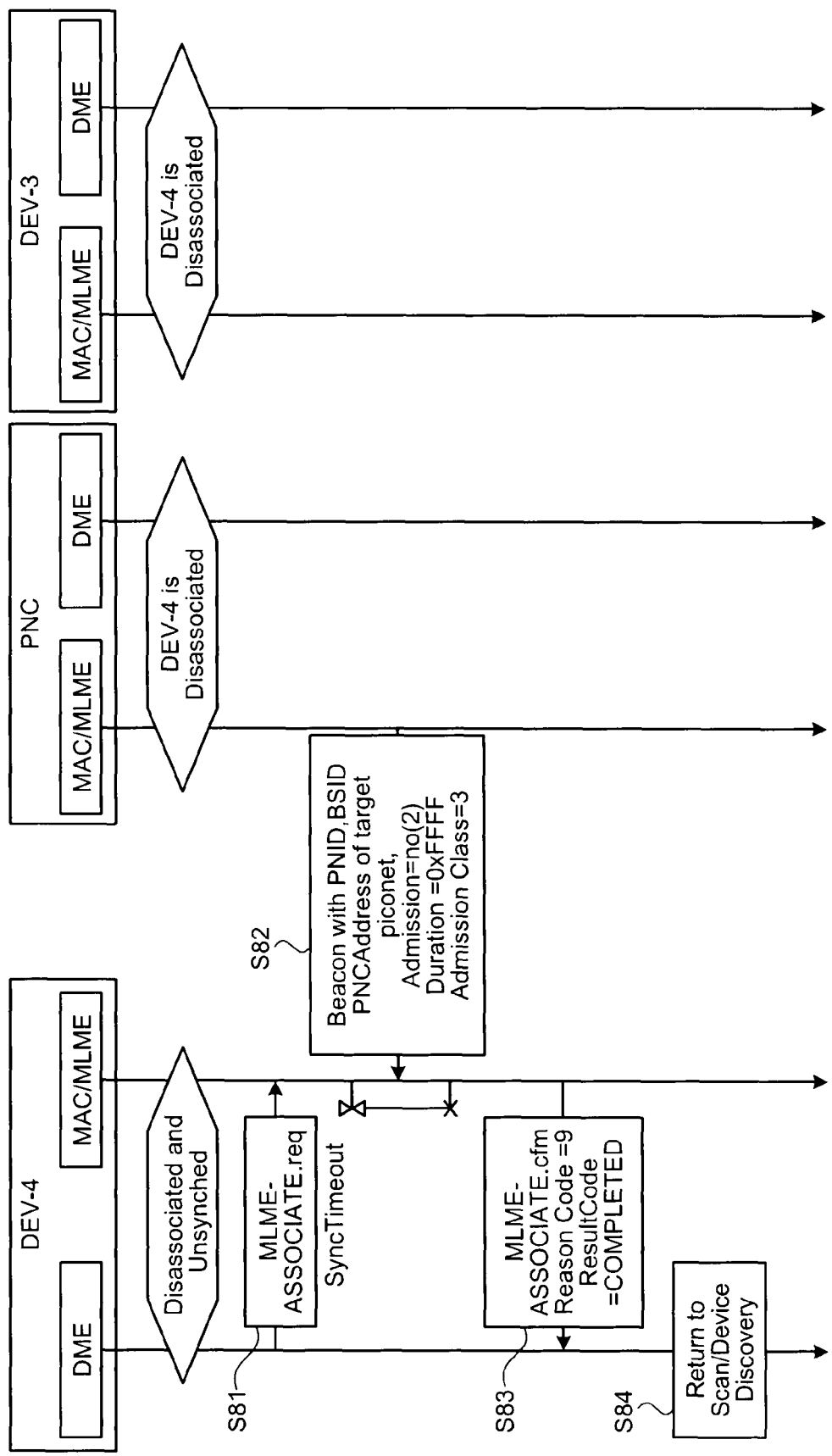
FIG. 45 is a diagram of an example of a sequence of a wireless terminal station in making connection to a wireless base station.

FIG. 45 is a diagram of an example of a sequence of a wireless terminal station in making connection to a wireless base station. The wireless base station 0 adds, as entry restriction information, "entry prohibition (Admission)", "prohibition time (Duration)", "connectable class (QoS LEVEL)", and the like in an announcement signal (Beacon, etc.) transmitted by broadcast or multicast.

The entry prohibition information is, for example, "0: all permitted", "1: entry as a wireless terminal station (DEV) is prohibited", "2: entry as a wireless terminal station (DEV) is prohibited and new network start is prohibited", "3: entry as a wireless terminal station (DEV) is prohibited but, when a base station (PNC) is not seen, a new base station (PNC) can be started", and "4: entry permitted". Types are not limited to those explained above. Entry prohibition can be controlled according to a QoS level of each terminal. A QoS level can be provided for each frame type. For example, connection classes are set as "0: transmission of all frames is permitted", "1: transmission of connection request frame is permitted", "2: transmission of only a band request frame is permitted", "3: only transmission of a frame of emergency information is permitted", "4: transmission of only a control frame is permitted", and the like to provide a QoS class for each frame type and designate a QoS level at which transmission is possible. Types are not limited to those explained above and combined types can be set. Entry prohibition information and connectable class information are described as being individually set. However, the entry prohibition information and the connectable class information are not limited to those explained in this embodiment and can be used in combination.

The prohibition time is used to indicate, for example, a time period until the next entry permission. A prohibition period can be designated in a unit of announcement signal transmission time (also referred to as Superframe Period unit and Beacon Period unit) or can be designated in an actual time unit. It is possible to permanently set the prohibition period by always setting the prohibition period to a maximum value. It is also possible to set the prohibition time using standby time and longest waiting time. In that case, as the standby time, for example, time when an announcement signal (Beacon) should be checked next is designated in a present Superframe length unit. However, when Superframe length is changed for each Superframe, time when an announcement signal should be checked is not always a value indicated by the number of standby Superframes. The longest waiting time indicates that a wireless terminal station is allowed to perform a connection request after indicated time from the present point. As in the prohibition time, a new wireless terminal station has to wait for an entry restriction is released. The prohibition time can be notified in actual time (msec, μsec, etc.) instead of the Superframe length unit.

Operation in this embodiment is explained below with reference to FIG. 45. The ordinate indicates a time axis and the abscissa indicates transmission and reception of a frame or transmission and reception of a primitive.

The new wireless terminal station 4 (DEV-4) is connected to neither the wireless base station 0 (PNC) nor the wireless terminal station 3 (DEV-3). The wireless terminal station 4 is connected to and synchronizes with none of the wireless base station.

In the example shown in FIG. 45, when the new wireless terminal station 4 is activated, first, the wireless terminal station 4 issues an MLME-ASSOCIATE.req primitive as an associate implementation request from a DME (Device Management Entity) sub-layer to a MAC/MLME (Step S81). The MAC/MLME that receives the request primitive scans a channel for time specified in advance and receives an announcement signal (Beacon). Although a specific Scan sequence during the activation is not particularly specified, for example, the procedure shown in FIG. 12 explained in the first embodiment is used. In FIG. 45, a state in which the wireless terminal station 4 receives an announcement signal (Beacon) from the wireless base station 0 is shown (Step S82). Specifically, a state in which the wireless terminal station 4 receives an announcement signal indicating "entry prohibition (Admission)=2: entry as a wireless terminal station (DEV) is prohibited and start of a new network is prohibited", "prohibition period=0xFFFF (maximum value)", and "connection class=3: only transmission of a frame of emergency information is permitted" is shown.

Subsequently, the MAC/MLME of the wireless terminal station 4 that receives the announcement signal from the wireless base station issues an MLME-ASSOCIATE.cfm primitive to the DME as a response to the MLME-ASSOCIATE.req received at Step S81 (Step S83). In this example, the MLME-ASSOCIATE.cfm includes "Reason Code=9 (connection not allowed, activation as a base station is not allowed)" and "Result Code=COMPLETE (processing of Req primitive is normally completed)". The MLME-ASSOCIATE.cfm notifies that a connectable wireless base station is not present. In this case, the wireless terminal station 4 does not operate as a new wireless terminal station nor a new wireless base station in a relevant channel.

In this embodiment, a scan result for one wireless base station 0 is notified by the MLME-ASSOCIATE.cfm. However, when a plurality of wireless base stations are found (announcement signals are received from a plurality of base stations), a parameter et of the wireless base stations is notified. When a plurality of wireless base stations are found and a connectable wireless base station is present among the wireless base stations, ASSOCIATION is executed on the relevant wireless base station. After the processing is finished, an execution completion result is notified as the MLME-ASSOCIATE.cfm. Details of ASSOCIATION operation are explained later.

When a connectable wireless base station cannot be found, the DME of the wireless terminal station 4 that receives the MLME-ASSOCIATE.cfm returns to the state of scan/device discovery (Step S84). The DME notifies an upper layer of a Scan result as required and notifies a user of the apparatus that a connectable wireless base station is not detected and the wireless terminal station 4 is prohibited from being started as a wireless base station. Further, after a fixed time elapses, the Scan sequence during activation shown in FIG. 12 can be carried out.

In this embodiment, the connection period is set to a maximum value and the wireless base station is permanently set in an entry prohibition state. However, as explained before, when entry permission is periodically performed, a time period until the next "prohibition release" is notified.

Figure 46:
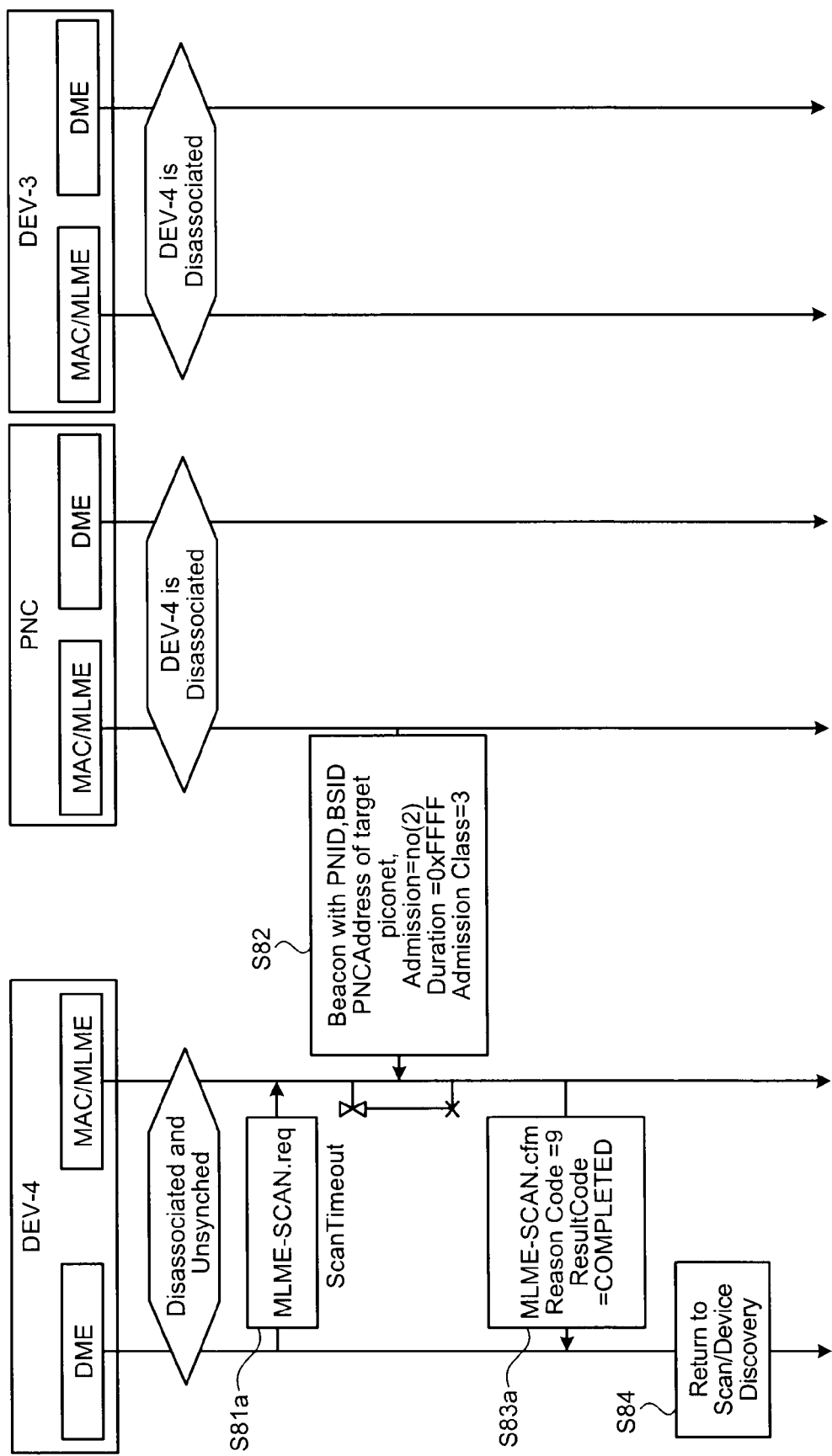
FIG. 46 is a diagram of an example of a sequence of the wireless terminal station in making connection to the wireless base station.

In FIG. 45, the ASSOCIATE primitive is used. However, as shown in FIG. 46, connection control can be executed during scan/Device Discovery. In this case, the connection control is carried out by responding to, in MLME-Scan.cfm (Step S83a), MLME-Scan.req (Step S81a) from the DME of the wireless terminal station 4 (DEV-4).

Figure 47:
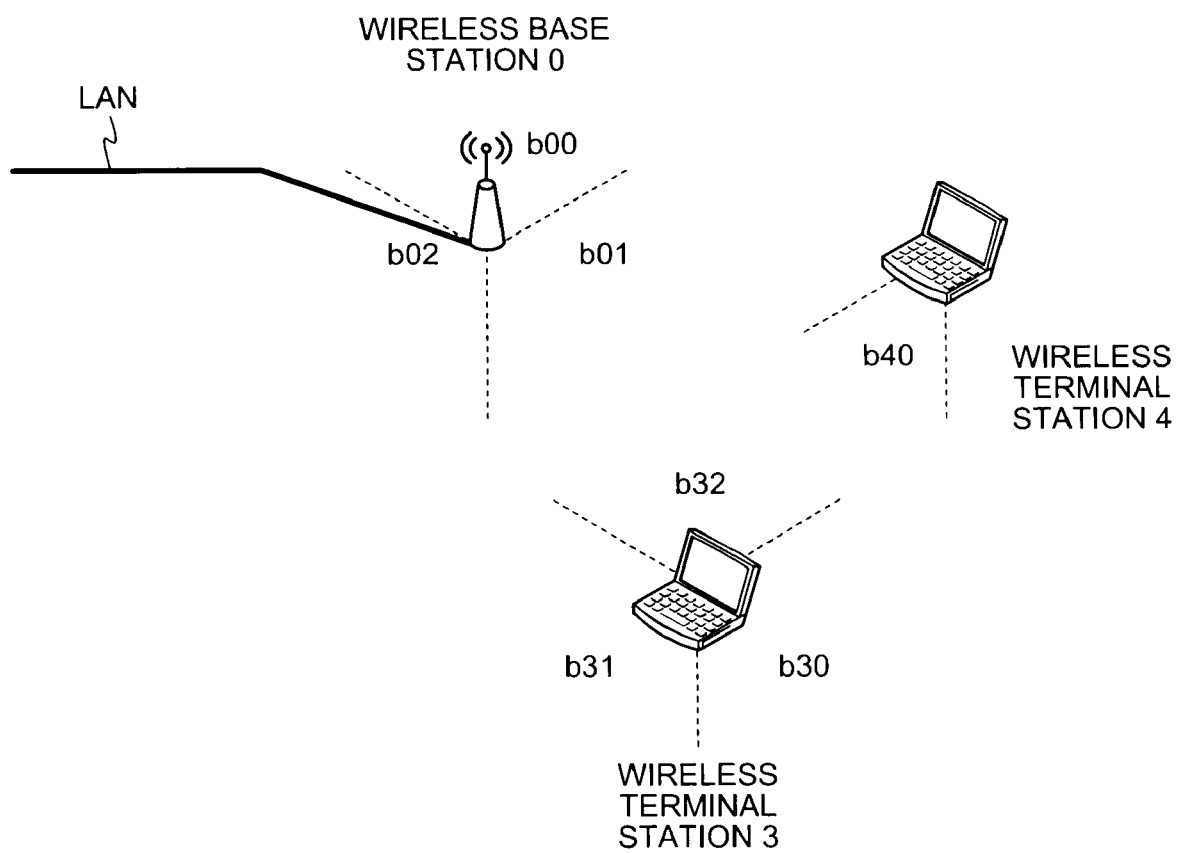
FIG. 47 is a diagram of a configuration example of the eighth embodiment of the wireless communication system according to the present invention.

With the MLME-Scan.req/cmf specified in IEEE 802.15, a PNID (or BSID) is searched for with respect to requested time/channel/antenna (directional beam number, sector). Basically, an announcement signal (Beacon, etc.) transmitted by a wireless base station in broadcast or multicast is received. Therefore, for example, in the case of a state shown in FIG. 47 (a state in which a directional beam of the wireless terminal 4 is not directed to the direction of the wireless base station 0), if the new wireless terminal station 4 cannot receive an announcement signal from the wireless base station 0, even when the new wireless terminal station 4 can receive a frame from the wireless terminal station 3 connected to the wireless base station 0, the wireless base station 0 cannot perform connection control for the new wireless terminal station 4.

To solve such a problem, in the present invention, connection control is performed by using MLME-ALL-Scan.req/cfm specified anew. Specifically, Scan is executed on all frames and a candidate PNID (or BSID) is searched for, whereby connection control for the new wireless terminal station 4 and control for starting of a new network are realized.

Figure 48:
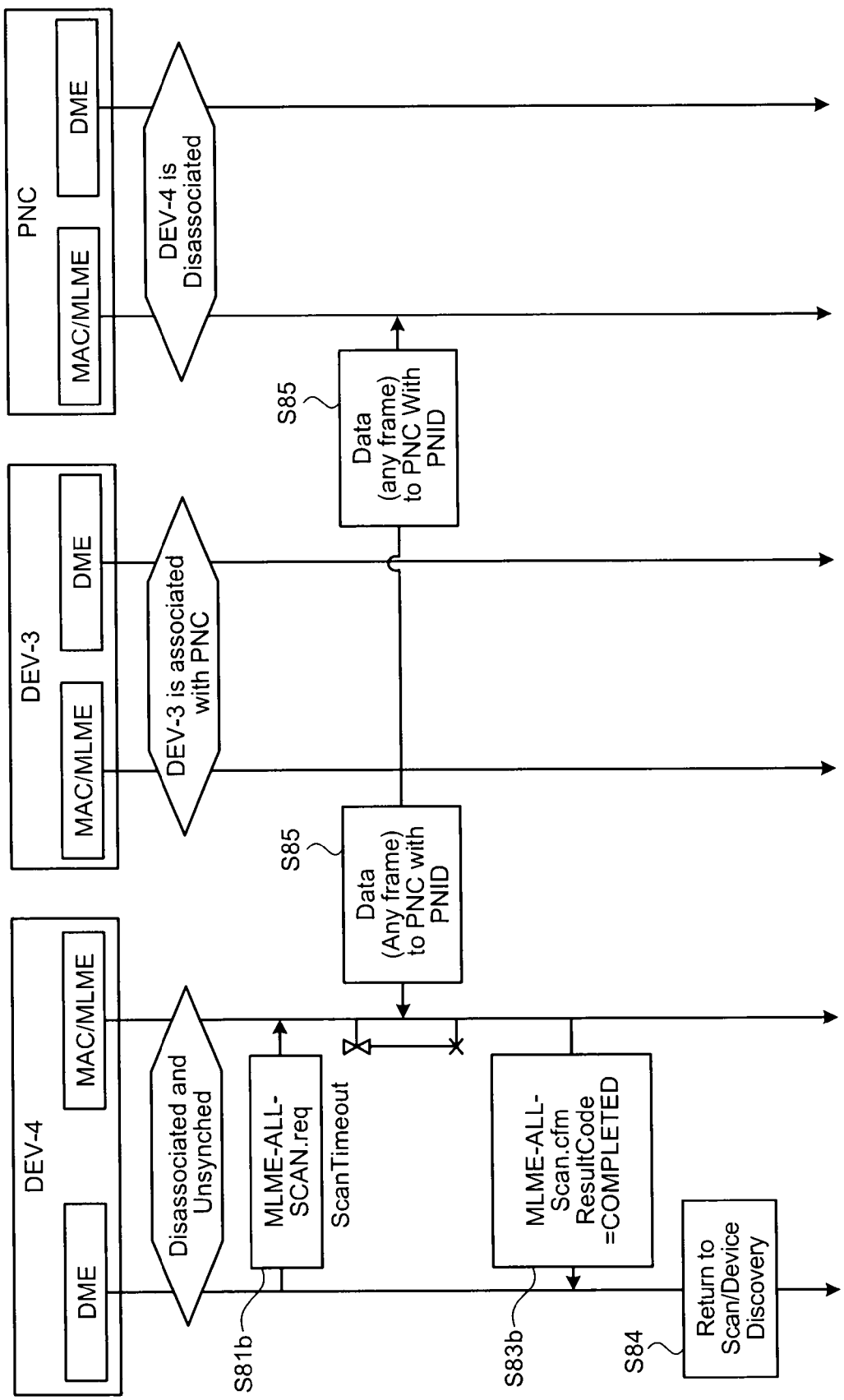
FIG. 48 is a diagram of an example of a sequence of the wireless terminal station in making connection to the wireless base station.

Connection control operation in using the MLME-ALL-Scan.req/cfm specified anew is explained with reference to FIG. 48. The ordinate indicates a time axis and the abscissa indicates transmission and reception of a frame or transmission and reception of a primitive.

First, the new wireless terminal station 4 (equivalent to DEV-4) is connected to neither the wireless base station 0 (equivalent to PNC) nor the wireless terminal station 3 (equivalent to DEV-3). The wireless terminal station 4 is connected to and synchronizes with none of the wireless base station.

When the new wireless terminal station 4 is activated, first, the wireless terminal station 4 issues an MLME-All-Scan.req as a Scan execution request from a DME sub-layer to the MAC/MLME (Step S81b). The MAC/MLME that receives the request primitive scans a channel only for time specified in advance and receives an announcement signal. A specific Scan sequence during activation is not particularly specified. However, the procedure shown in FIG. 12 explained in the first embodiment is used. In FIG. 48, a state in which the wireless terminal station 4 receives a data frame directed from the wireless terminal station 3 to the PNC (a data frame not directed to the wireless terminal station 4) is shown (Step S85). Specifically, a state in which the wireless terminal station 4 receives a data frame including a PNID as a network identifier formed by the wireless base station 0 is shown.

Subsequently, The MAC/MLME of the wireless terminal station 4 that receives the data frame including the PNID issues an MLME-All-Scan.cfm primitive to the DME as a response to the MLME-All-Scan.req received at Step S81b (Step S83b).

In this example, the MLME-All-scan.cfm includes "Number Of Piconets" indicating the number of piconets found during a scan process, "Piconet Description Set" as an information set of the found piconets, "Potential Piconets Description Set" as an information set for a PNID that is likely to be a piconet because, although a frame from the PNC cannot be directly received, a frame from a wireless terminal station is received, "Number Of Channels" as scanned frequency channel information, "Channel Rating List" indicating a recommendation degree with respect to a detected channel, and "Result Code" for the request primitive received from the MLME at Step S81b. When information such as the same PNID (BSID) and channel number from a plurality of wireless terminal stations, the wireless terminal station 3 selects more reliable information based on transmission path information such as reception power.

By performing the operation explained above, the new wireless terminal station 4 grasps the presence of the wireless base station 0 from the PNID received through the other wireless terminal stations. The wireless terminal gives up the operation in this channel and performs operation for making connection to a wireless base station operating on another channel notified by the "Piconet Description Set" or operation for starting as a wireless base station.

A connection operation example of the new wireless terminal station 4 in using a procedure different from a procedure using the MLME-All-Scan.req/cfm is explained. In this example, "entry prohibition (Admission)", "prohibition time (Duration)", and "connectable class (QoS Level)" are also added in a frame transmitted by the wireless terminal station 3 registered in the wireless base station 9 that performs connection control. When a plurality of wireless terminal stations are connected, all the wireless terminal stations transmit the same frame. Further the fields are added in frames other than the announcement signal by the wireless base station 0 in broadcast or multicast.

Connection control operation is explained below with reference to FIG. 49. The ordinate indicates a time axis and the abscissa indicates transmission and reception of a frame or transmission and reception of a primitive. It is assumed that the wireless terminal station 3 (DEV-3) performs operation from a state in which the wireless terminal station 3 is not connected to the wireless base station 0 (PNC). It is assumed that the wireless terminal station 4 (DEV-4) starts operation after connection control for connection of the wireless terminal station 3 to the wireless base station 0 is finished. Steps overlapping the explanation based on FIG. 45 such as issuance of a primitive are denoted by the same step numbers and explanation of the steps is omitted.

First, operation of the wireless terminal station 3 in making connection to the wireless base station 0 is explained. The wireless terminal station 3 receives an announcement signal from the wireless base station 0 during channel scan time (Sync Timeout). When content of the announcement signal indicates that entry is possible ("Admission=Yes and Duration=0x0000", which indicate an entry possible state) (Step S82), the wireless terminal station 3 sets a timer for connection request/authentication (Assoc Timeout) and carries out connection processing. Specifically, the wireless terminal station 3 transmits an Association Request Command frame (Step S86). The wireless base station 0 returns an Association Response Command frame including an affirmative message (Step S87) and sets a device address and the like. Further, the wireless base station 0 notifies the DME of a result of association using the MLME-ASSOCIATE.cfm (Step S84), whereby the wireless terminal station 3 is associated with the wireless base station 0. Similarly, when the transmission of Imm-Ack (a confirmation frame) for the Association Request Command frame from the wireless terminal station 3 is completed (Steps S88 and S89), the wireless base station 0 issues a primitive of MLME-ASSOCIATE.ind to the DME (Step S90) and is associated with the wireless terminal station 3.

When associated with the wireless terminal station 3, the wireless base station 0 inserts, in the following announcement signal (Beacon), information indicating that the wireless terminal station 3 is associated and transmits the information to subordinate wireless terminal stations (Step S91). When the wireless base station 0 determines that the wireless base station 0 cannot cover more wireless terminal stations (the number of covered wireless terminal stations reaches an upper limit), as explained above (see FIGS. 45 and 46), the wireless base station 0 transmits an announcement signal including information such as "entry prohibition" and "prohibition period" and suppresses connection of a new wireless terminal station.

The wireless terminal station 3 that receives the announcement signal transmitted from the wireless base station 0 at Step S91 transmits, in the following data transmission operation, the information concerning connection control such as "entry prohibition" and "prohibition period", which is included in the received announcement signal, with the information included in a frame transmitted by the wireless terminal station 3 (Steps S92-1 and S92-2).

As explained above, in the connection control shown in FIG. 49, an associated wireless terminal station copies connection control information notified from a wireless base station and transmits the connection control information with the connection control information embedded in a frame transmitted by the wireless terminal station. Consequently, for example, when the new wireless terminal station 4 cannot receive an announcement signal from the wireless base station 0 but can receive a frame from the wireless terminal station 3 connected to the wireless base station 0, it is possible to suppress the wireless terminal station 4 from performing a careless connection request. Further, depending on connection control information, it is possible to suppress the wireless terminal station from operating as a new wireless base station and suppress a wireless base station that could be interference from starting anew.

Figure 49:
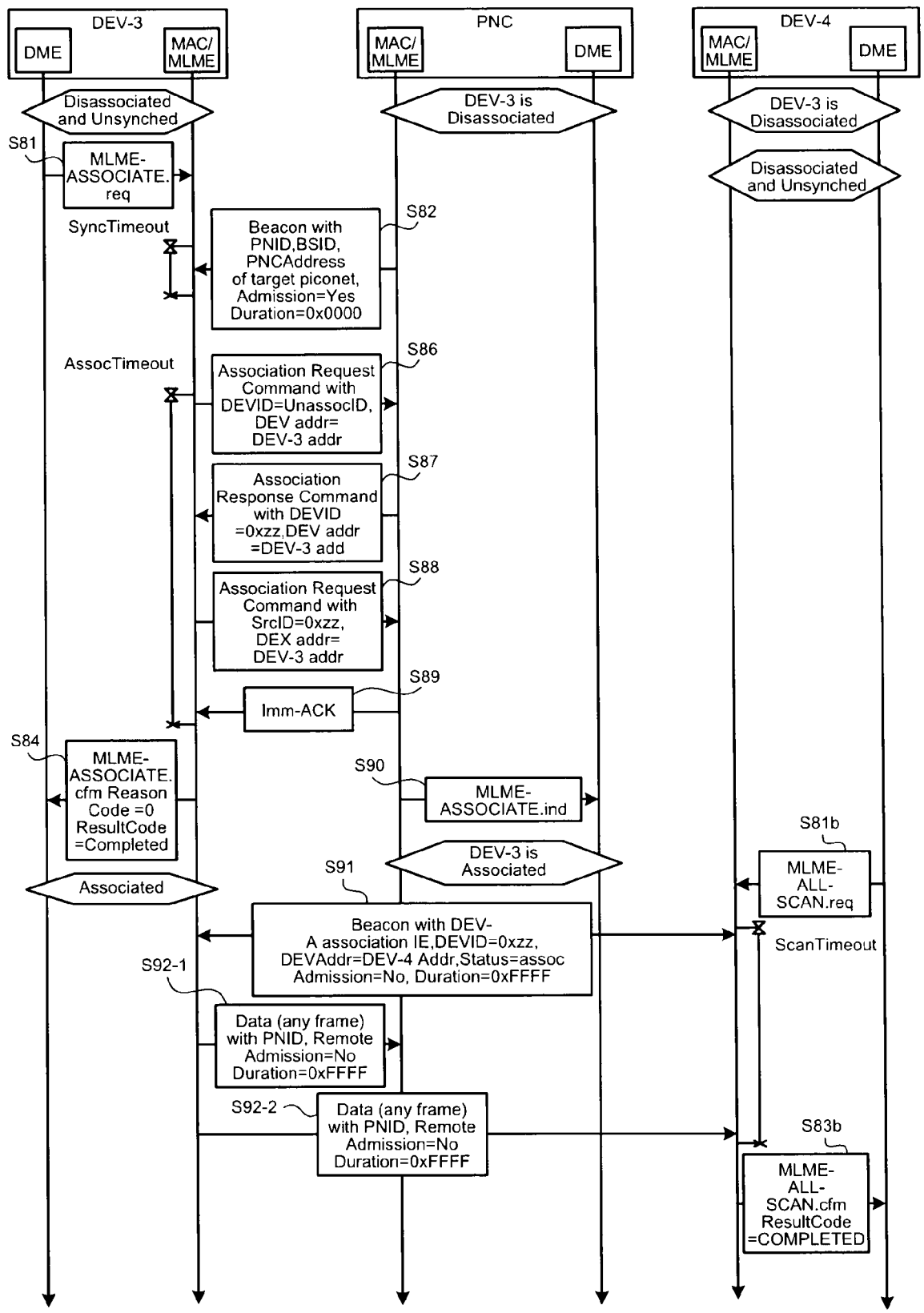
FIG. 49 is a diagram of an example of a sequence of the wireless terminal station in making connection to the wireless base station.

In the connection control shown in FIG. 49, the method of the wireless base station 0 and the wireless terminal station 3 (the wireless terminal station associated with the wireless base station 0) suppressing a connection request of a new wireless terminal station and the operation of a new wireless base station by performing connection control for entry prohibition is explained. However, when the wireless base station 0 or the wireless terminal station 3 unfortunately receives interference from other wireless terminal stations or other wireless base stations regardless of the fact that such control is performed, the wireless base station 0 can combine a control for changing a channel currently in use with the control. In this case, because the wireless terminal station and the wireless base station grasp a free channel through the MLME-SCAN.req/cfm sequence, the wireless terminal station and the wireless base station only have to perform channel change using information concerning the channel. It is also possible to simplify the sequence by notifying, in advance, the wireless terminal station connected to the wireless base station of a channel scheduled to be changed.

When the control for changing a channel currently in use with the sequence shown in FIG. 49, the wireless base station scans a channel as a shift destination candidate again based on a stored free channel table and, if the channel is not used or Channel Rating is high, performs shift of the channel. When the channel is shifted, if the connected wireless terminal station cannot perform frequency/time synchronization with the wireless base station, it is also possible to carry out, as required, a connection (Sync) sequence at a PHY level in which Scan is not used.

In addition, when the wireless terminal station or the wireless base station determines that a communication situation of the terminal is deteriorated, the wireless terminal station or the wireless base station spontaneously carries out Scan. For example, the wireless base station stores an RSSI value indicating a strongest reception power value for each PNID in advance and, when another terminal interferes with the wireless base station, executes a procedure conforming to the sequence to change a channel in use. The wireless terminal station that finds the other terminal notifies the connected wireless base station of the presence of a wireless base station that could be interference (an interfering wireless base station)/an interfering wireless terminal station. The wireless base station executes, as required, a procedure conforming to the sequence to change a channel in use.

Further, when a plurality of wireless base stations are found as a result of executing Scan when the wireless terminal station is started, for example, the wireless terminal station notifies a wireless base station, in which the wireless terminal station can enter, that the wireless base stations could be interference and urges to change a channel in use. Thereafter, the wireless terminal station sends a connection request to the wireless base station to which the wireless terminal station originally desires to make connection.

The entry restriction information specifies an IE shown in FIG. 50, for example, as entry restriction IE (Information Element) and can be inserted in all frames including the announcement signal (Beacon) and the Command frame for Association and the like. In that case, the wireless terminal station or the wireless base station that receives a frame analyzes whether an Element ID of the IE is included in the frame. When the entry restriction IE is included, the wireless terminal station or the wireless base station operates as explained in this embodiment. When the entry restriction IE is not included, because entry restriction information is not present, the wireless terminal station or the wireless base station can operate in a state in which entry is possible. The entry restriction information can be inserted in a PLCP header, inserted in a MAC header, or inserted in a frame body.

Depending on performance of the wireless terminal station or the wireless base station, a wireless station that can interpret the entry restriction IE may be mixed. In that case, it is also possible to specify, for example, a vendor independent extended IE for allowing vendor independent extension shown in FIG. 51 as an essential function and notify entry restriction information. In that case, an IE includes Element ID, Length, Type, Vendor OUI (Organizational Unique Identifier), and Vendor Specific Information. In a Type field, necessity of arbitration with the wireless base station, information indicating whether measures are essential, and the like are inserted. For example, "0: measures are essential and, when measures cannot be taken, entry is not allowed", "1: measures are essential and, when measures cannot be taken, entry is not allowed and start of a wireless base station at the same frequency is not allowed", "2: the wireless base station is arbitrated after association and entry is restricted with propriety of arbitrary (e.g., Diassociation is forcibly performed)", "3: the wireless base station is arbitrated after association but arbitration content is treated as Informative", and the like are written. In the Vendor OUI after that, it is possible to notify entry restriction. In the Vender Specific information, it is possible to notify entry restriction information.

Consequently, for example, when the Type field indicates "0" and the Vendor OUI indicates entry restriction, this indicates that entry is always impossible when content of the entry restriction cannot be understood. Therefore, it is possible to apply entry restriction to all the wireless terminal stations or wireless base terminals. The Vendor OUI and the Vender Specific Information are not limited to this embodiment and can be used in device discovery explained in the foregoing embodiments, authentication, notification of a modulation system in use (single carrier, multi-carrier, a coexistence system of single carrier and multi-carrier, etc.), and the like. Setting of the Type field is not limited to that explained in this embodiment.

In this embodiment, necessity of arbitrary and information concerning entry restriction are notified by using the Type field of the new IE. However, this can be realized by using Reserved Bits in an existing IE, extension of a filed of the existing IE, and the like. In that case, Reserved Bits of a CAT Status IE, a Capability IE, a DEV Association IE, and the like can be allocated or Length of the existing IE can be extended and inserted.

Further, it is also possible that the new wireless terminal station notifies the wireless base station of necessary of arbitration for entry conditions during an Association request and, as a result, for example, when the arbitration is necessary, the wireless base station does not perform arbitration itself and rejects Association. Alternatively, when arbitrary is performed, the wireless base station forcibly diasociate the new wireless terminal when the arbitration is not established. In that case, by prohibiting transmission other than a spontaneous Diassociation request and a response to a frame from the wireless base station until the arbitrary is finished, it is possible to suppress careless transmission of a frame from the new wireless terminal station being arbitrated. If the wireless base station does not notify the other connected wireless terminal stations of information concerning the new wireless terminal in an announcement signal until the arbitrary is completed, it is possible to also prohibit transmission of frames from the connected other terminal stations to the new wireless terminal station.

Not only in this embodiment but also in the first to seventh embodiments explained above, reference timing of Superframe grasped by the respective terminals can be based on a start Beacon#0 and offset time from the start Beacon#0 to any one of Beacons that the terminals receive. Alternatively, timing of any one of beacons received by the terminals can be set as a reference. In other words, even if the terminals do not grasp start timing for each Superframe generated by the base station, the terminals only have to be capable of recognizing a period of the Superframe and Superframe configuration information after any one of the Beacons received by the terminals. When the offset time is used, for example, the base station notifies offset in formation in each of the Beacons as time, the number of symbols, the number of beams, and the like.

As explained above, in this embodiment, the information for controlling new entry such as "entry prohibition", "prohibition time", and "connectable class" is included, as entry restriction information, in the frame transmitted by the wireless base station or the wireless terminal station. The wireless terminal station associated with the wireless base station transmits the information for controlling new entry received from the wireless base station with the information included in a frame. When a new wireless terminal station interferes with the wireless base station regardless of the fact that entry control for a new wireless terminal station is performed, a channel in use is changed. Consequently, it is possible to, while suppressing a careless connection request from a new wireless terminal station that could be interference, shift to or cause the new wireless terminal station to shift to another wireless channel as required. Therefore, it is possible to solve the problem in the wireless access system with strong directivity.

Ninth Embodiment

A ninth embodiment is explained. In the first to eighth embodiments, the method of a wireless terminal station detecting a wireless base station, a device discovery procedure for a request source wireless terminal station of direct communication to perform direct communication with a specific request destination wireless terminal station based on information notified from a wireless base station, the procedure for the request source wireless terminal station to detect a wireless terminal station that is present around the request source wireless terminal station and can perform direct communication, the MSDU aggregation, the MPDU aggregation, and the connection control for a new wireless terminal station are explained. In this embodiment, a device discovery procedure in which a wireless base station and a wireless terminal station use not only directional beams (also referred to as Directional) but also omni-directional beams (also referred to as Omni) is explained. A frame format explained in this embodiment can be applied to all the wireless communication systems according to the first to eighth embodiments.

Figure 52:
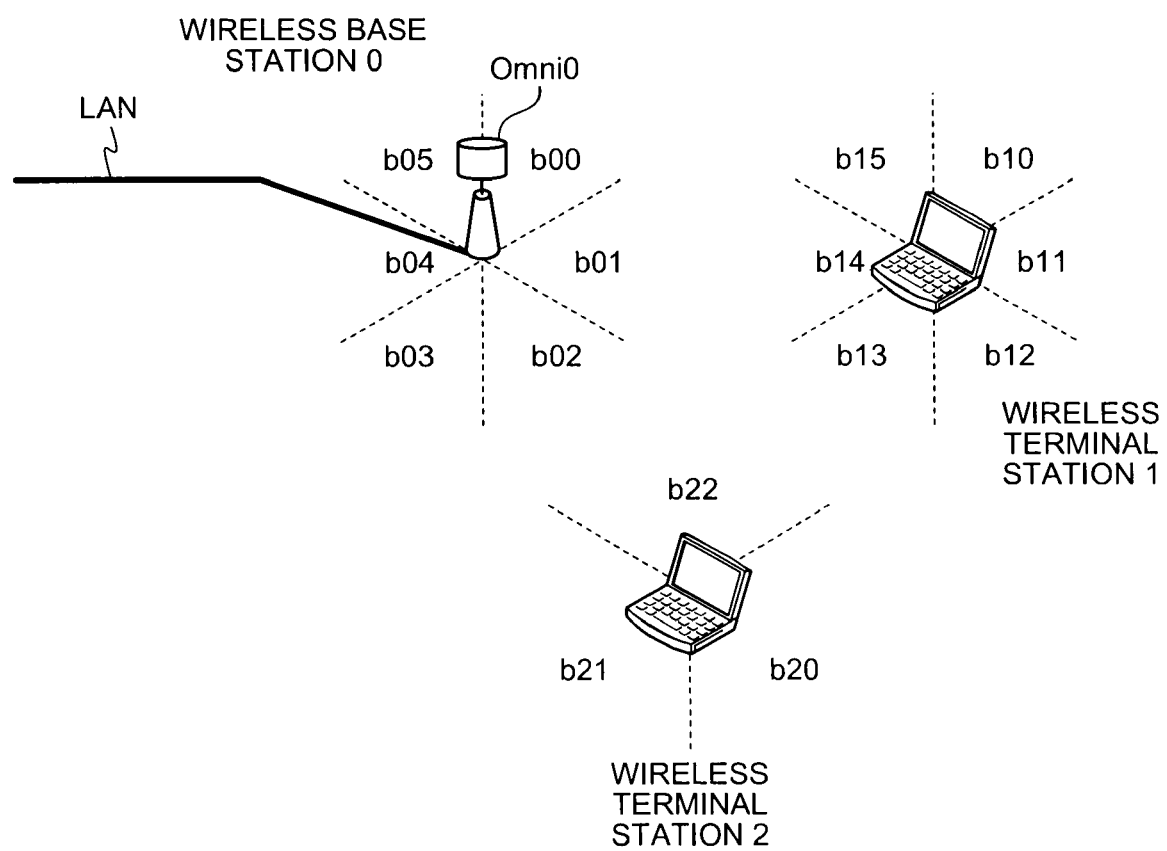
FIG. 52 is a diagram of a configuration example of a ninth embodiment of the wireless communication system according to the present invention.

FIG. 52 is a diagram of a configuration example of a ninth embodiment of the wireless communication system according to the present invention. This wireless communication system includes a wireless base station (also referred to as PNC or AP) 0 and wireless terminal stations (also referred to as DEV or STA) 1 and 2 set in a service area of the wireless base station 0. Unlike the first embodiment and the like, the wireless base station 0 can perform communication using omni-directional beams in addition to directional beams. The omni-directional beams can be obtained by combining a plurality of directional antennas or directional beams. A physically omni-directional antenna can be provided separately from an antenna for directional beam creation. As in the first embodiment and the like, areas divided by dotted lines arranged around the wireless base station 0 and the wireless terminal stations 1 and 2 indicate directions of directional beams set for convenience.

When transmission power is the same, it is known that a transmission distance (a signal reaching distance) is smaller in transmission in which omni-directional beams are used than in transmission in which directional beams are used. Therefore, for example, when the wireless base station 0 according to this embodiment performs transmission using omni-directional beams, the wireless base station 0 reduces transmission speed compared with transmission by directional beams to lower a required S/N and narrows a band width in use to improve transmission power density and supplement a difference in antenna gain. In the following explanation, it is assumed that a reachable range of a frame transmitted by a directional beam and a reachable range of a frame transmitted by an omni-directional beam are equivalent. When the frame is transmitted by the omni-directional beam, compared with the directional beam, at least one of a modulation system (the number of modulated multi-values) and band width has an extremely small value. Therefore, transmission time required when the same frame is transmitted is extremely large.

Figure 53:
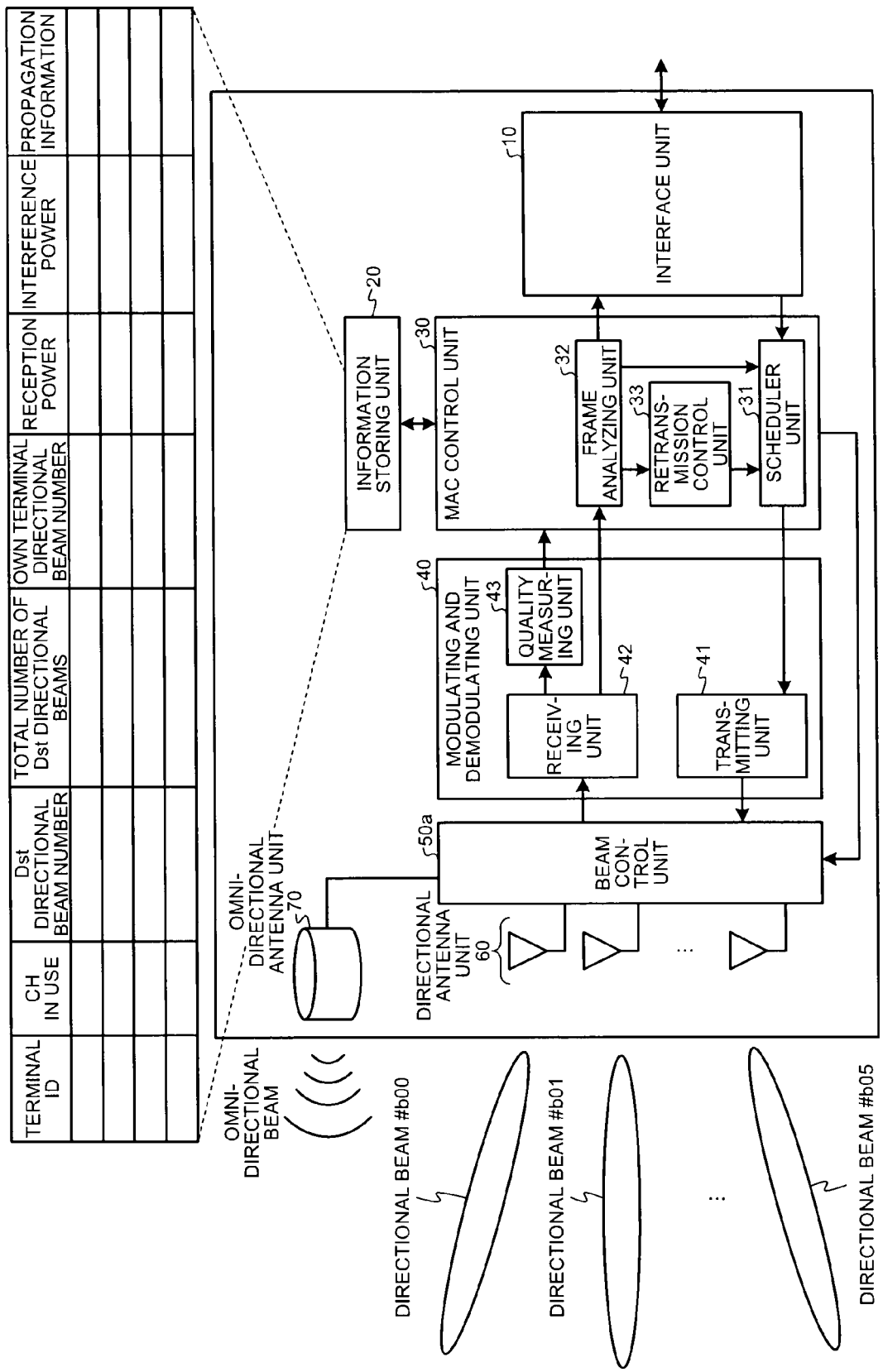
FIG. 53 is a diagram of a circuit configuration example of a wireless base station according to the ninth embodiment.

FIG. 53 is a diagram of a circuit configuration example of a wireless base station according to the ninth embodiment. This wireless base station includes a beam control unit 50*a* instead of the beam control unit 50 of the wireless base station (see FIG. 2) according to the first embodiment. Further, an omni-directional antenna unit 70 is added. Other components are the same as those of the wireless base station according to the first embodiment. Therefore, explanation of the components is omitted.

When the MAC control unit 30 of this wireless base station transmits an omni-directional beam, the MAC control unit 30 passes data received from the interface unit 10 to the modulating and demodulating unit 40 after adding a modulation system and band width or a control signal for controlling both the modulation system and the band width to the data. Consequently, the wireless base station 0 can perform transmission and reception control for a directional beam and an omni-directional beam in every frame transmission. The beam control unit 50*a* performs control of the directional antenna unit 60 and the omni-directional antenna unit 70 based on information (the modulation system and the band width, the control signal for controlling both the modulation system and the band width, etc.) added to the data received via the modulating and demodulating unit 40. The omni-directional antenna unit 70 is used in transmitting the omni-directional beam and is controlled by the beam control unit 50*a*.

A circuit configuration for transmitting the directional beam and the omni-directional beam is not limited to that shown in FIG. 53. For example, rather than configuring the omni-directional antenna and the directional antenna physically independently from each other, a plurality of directional antennas or directional beams can be combined to form an omni-directional beam. A transmission system in use can be a transmission system by single carrier or can be a transmission system by multi-carrier such as OFDM (Orthogonal Frequency Division Multiplexing) or OFDMA (Orthogonal Frequency Division Multiple Access). Further, code spreading can be performed. A multi-band system in which a plurality of single carriers or multi-carriers are arranged in parallel on a frequency axis can be adopted. Spatial multiplexing such as MIMO can be used. The single carrier and the multi-carrier can be used as appropriate during use of a directional beam and during use of an omni-directional beam. In other words, the explanation in this embodiment does not limit a modulation and demodulation system.

A device discovery operation in this embodiment is explained with reference to the drawings. Device discovery performed by using an omni-directional beam and device discovery performed by using a directional beam are explained in order below. It is assumed that a locational relation between the wireless base station and the respective terminal stations is in the state shown in FIG. 52.

FIG. 54 is a diagram of a sequence example in performing device discovery using an omni-directional beam. An operation example of the wireless base station 0 and the wireless terminal 2 is shown in the figure. As shown in FIG. 54, in this device discovery operation, the wireless base station 0 periodically transmits an announcement signal (Beacon) using an omni-directional beam. On the other hand, like the wireless terminal station explained in the first embodiment, the wireless terminal station 2 scans the announcement signal from the wireless base station 0 while appropriately switching a directional beam number. As shown in FIG. 52, the wireless terminal station 2 can communicate with the wireless base station 0 using a directional beam with a beam number b22. Therefore, when a directional beam is switched to the directional beam with the number b22, the wireless terminal station 2 receives the announcement signal from the wireless base station 0. When the announcement signal is received, the wireless terminal station 2 grasps a beam number (in this example, b22) used in the communication with the wireless base station 0. When the wireless terminal station 2 grasps the beam number used in the communication with the wireless base station 0, the wireless terminal station 2 stores information concerning the beam number in the information storing unit 20.

Figure 55:
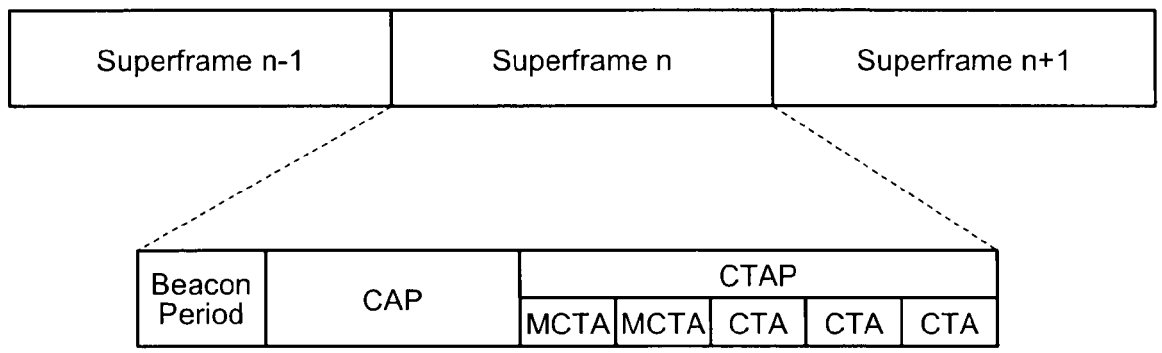
FIG. 55 is a diagram of a configuration example of a frame used in the ninth embodiment.

The wireless terminal station 2 grasps, from super frame configuration information included in the announcement signal, a super frame configuration such as a CAP (Contention Access Period) as a random access period and a CTAP (Channel Time Allocation Period) as a band reservation period. The CTAP can include an MCTA (Management CTA) for mainly performing management of a network by the wireless base station 0 and a CTA mainly used for data communication by the wireless base station 0. FIG. 55 is a diagram of a configuration example of a super frame.

The wireless terminal station 2 transmits a connection request (also referred to as Probe request, Association request, Authentication request, etc.) frame to the wireless base station 0 in a CAP period. If the wireless base station 0 is performing reception with an omni-directional beam, the wireless base station 0 receives a connection request from the wireless terminal station 2 using an omni-directional beam.

Figure 56:
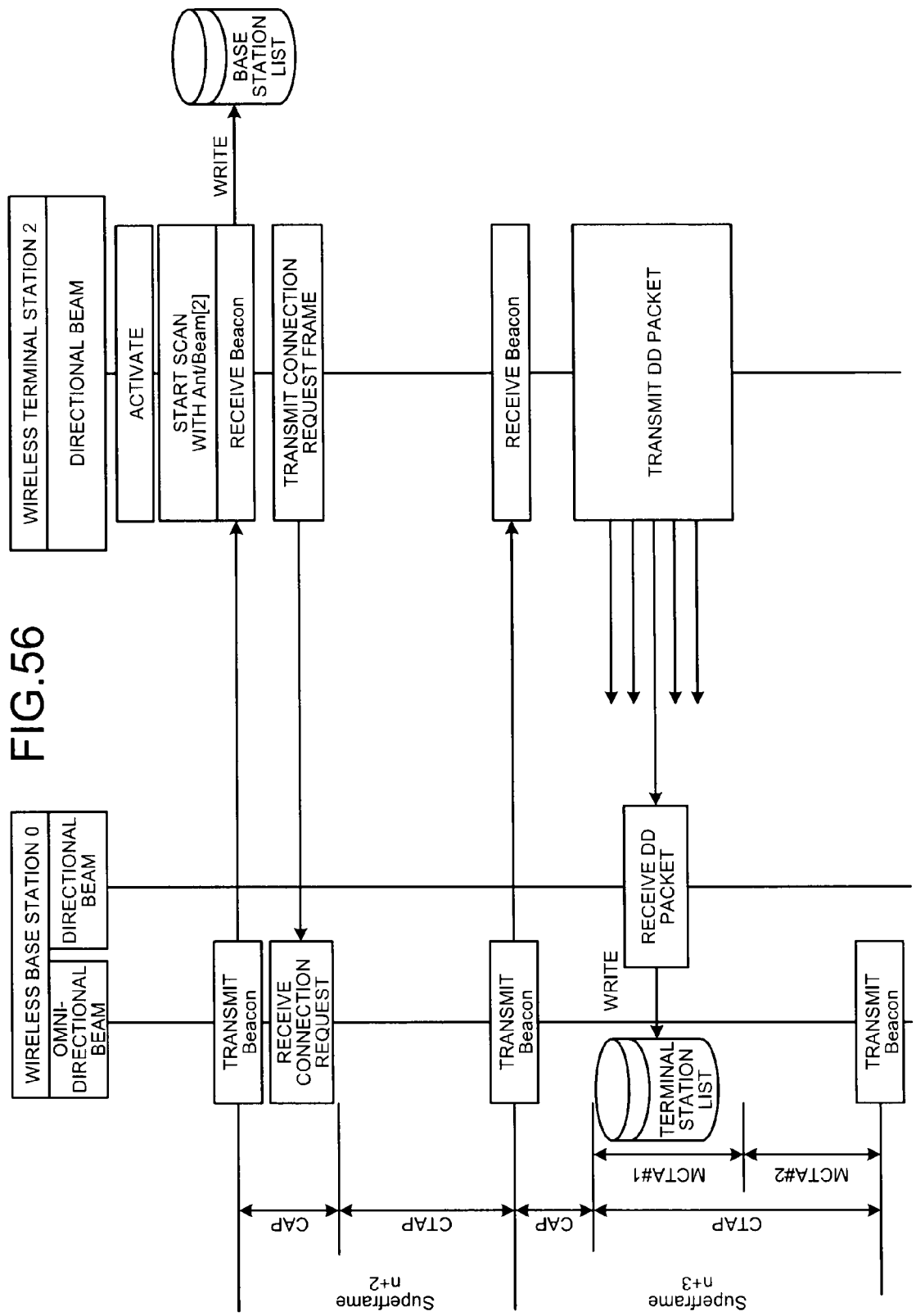
FIG. 56 is a diagram of an example of the wireless terminal station in making connection to the wireless base station.

At this point, the wireless base station 0 can recognize the presence of the wireless terminal station 2. However, a directional beam number usable for the wireless terminal station 2 (a number of a directional beam used in communication with the wireless terminal station 2) is not determined. Therefore, the wireless base station 0 needs to determine a directional beam number for performing high-speed communication with the wireless terminal station 2. Operation of the wireless base station 0 specifying a directional beam number is explained with reference to FIG. 56. FIG. 56 is a diagram of a sequence example in which the wireless base station specifies a directional beam number.

As shown in FIG. 56, after receiving a connection request from the wireless terminal station 2, the wireless base station 0 instructs the wireless terminal station 2 to perform device discovery (transmit a DD packet) in an MCTA/CTA (MCTA#1) in a CTAP period while announcing, using an announcement signal transmitted first, (notifying the wireless terminal station 2) that the connection request from the wireless terminal station 2 is received. In this announcement signal transmission, the wireless base station 0 notifies the number of times of transmission and transmission timing, which are determined according to the number of directional beam numbers of the wireless base station 0, to the wireless terminal station 2. The wireless terminal station 2 that receives the announcement signal continuously transmits a DD packet (a DD frame) in an MCA/CTA (MCTA#1) period indicated by information included in the announcement signal in the same manner as the device discovery procedure (see FIG. 18 and the like) in the first embodiment. On the other hand, the wireless base station 0 attempts reception of the DD packet from the wireless terminal station 2 by switching a directional beam number to b00, b01, . . . , and b05 in the MCTA/CTA (MCTA#1) period designated by the execution instruction for device discovery. In this example, the wireless base station 0 receives a frame from the wireless terminal station 2 with a directional beam number b02. Further, the wireless base station 0 stores the received directional beam number b02 in the information storing unit 20 in the same manner as the device discovery operation time in the first embodiment. The wireless base station 0 can specify a directional beam (number) used for the wireless terminal station 2 by executing the operation explained above. After that, the wireless base station 0 can perform high-speed data communication with the wireless terminal station 2 by selecting a directional beam with the number b02 and performing communication. Operation performed by the respective apparatuses after the directional beam is specified is the same as that in the first embodiment.

The wireless base station 0 can also receive the connection request frame from the wireless terminal station 2 with a directional beam. Device discovery performed by using a directional beam is explained below.

In device discovery in receiving the connection request frame from the wireless terminal station 2 with a directional beam, for example, the wireless base station 0 performs reception operation for the connection request frame while switching a directional beam used in a CAP for each super frame or performs the reception operation while switching a directional beam in one CAP. Consequently, the wireless base terminal 0 can recognize a directional beam (number) used in communication with the wireless terminal station 2 without carrying out device discovery using a DD packet. As an example, a sequence in performing the reception operation the connection request frame while switching a directional beam used in the CAP for each super frame is shown in FIG. 57.

Figure 57:
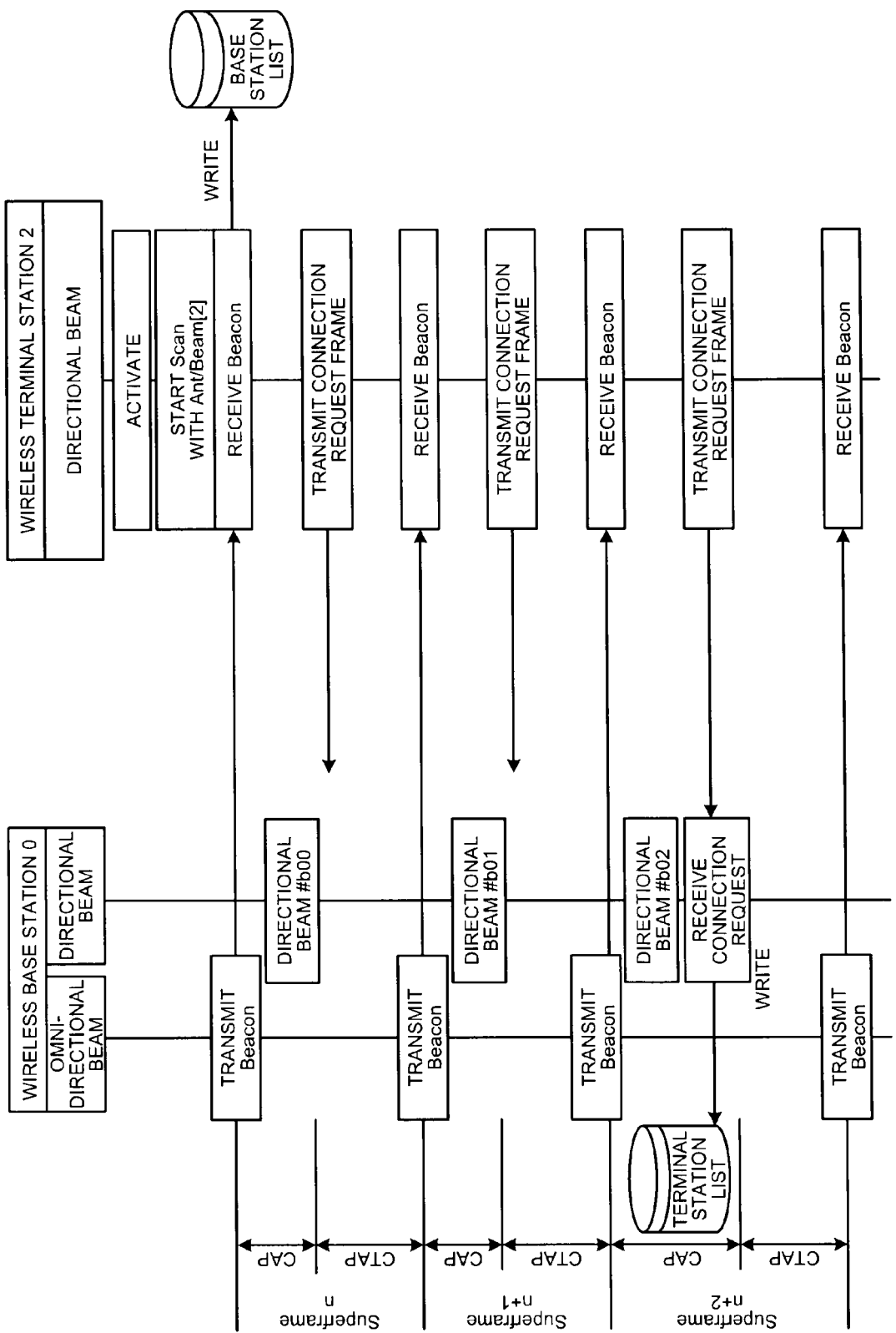
FIG. 57 is a diagram of an example of a sequence of the wireless terminal station in making connection to the wireless base station.

In the sequence shown in FIG. 57, the wireless base station 0 witches a directional beam number used for each CAP to b00, b01, b02, . . . . Therefore, even if the wireless terminal station 2 transmits the connection request frame in Superframe n or Superframe n+1, the wireless base station 0 cannot receive the connection request frame because a directional beam (number) selected by the wireless base station 0 is different. However, in the next Superframe n+2, the wireless base station 0 selects a directional beam with the number b02 and receives the connection request frame from the wireless terminal station 2. The wireless base station 0 notifies, in the next Beacon transmission, the wireless terminal station 2 that the connection request frame is normally received.

By performing the reception operation while switching the directional beam used in the CAP on the wireless base station 0 side, although the wireless terminal side needs to transmit the connection request frame a plurality of times, the wireless base station 0 does not need to perform device discovery using an MCTA. Further, the wireless base station 0 receives a frame using a directional beam. Therefore, there is an advantage that the wireless base station 0 less interferes with wireless terminal stations around the wireless base station 0 than receiving the frame using an omni-directional beam.

By performing the control shown in FIGS. 56 and 57, it is possible to efficiently execute device discovery even when the wireless base station includes an omni-directional beam and a directional beam and, on the other hand, the wireless terminal station includes only a directional beam.

In the above explanation, only the wireless base station uses a directional beam and an omni-directional beam. However, the wireless terminal station can also be configured to use both an omni-directional beam and a directional beam. In that case, it is also possible to transmit management frames such as an ACK frame, a control frame (also referred to as command frame) such as CTS/RTS, and a connection request frame transmitted by the wireless terminal station are transmitted with an omni-directional beam and use the management frames to notify wireless terminals stations around the wireless terminal station of the presence of the wireless terminal stations. Further, efficient device discovery can be realized by embedding directional beam numbers and the like in the frames.

Figure 58:
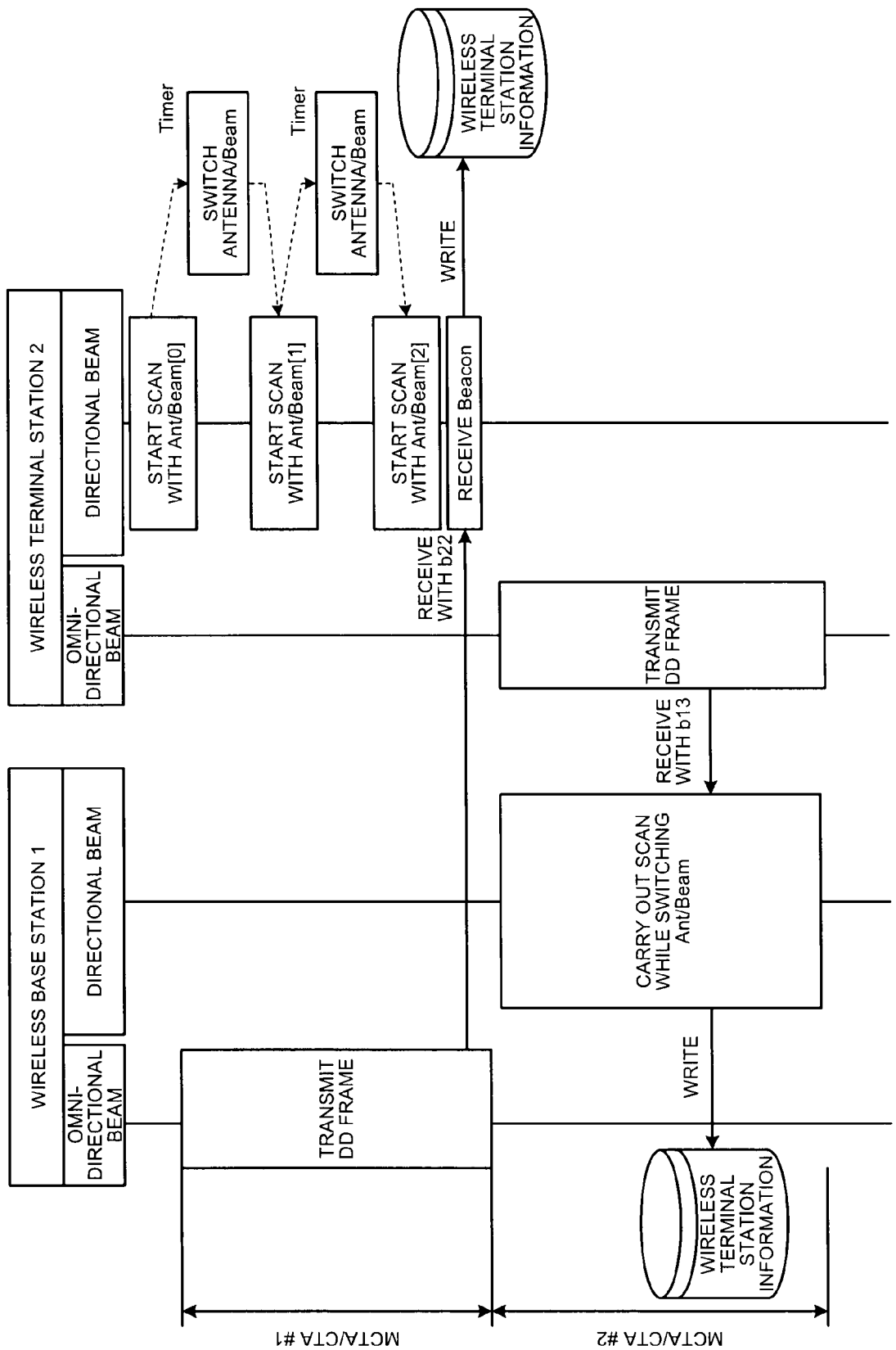
FIG. 58 is a diagram of an example of a sequence of the wireless terminal station in making connection to the wireless base station.
Figure 59:
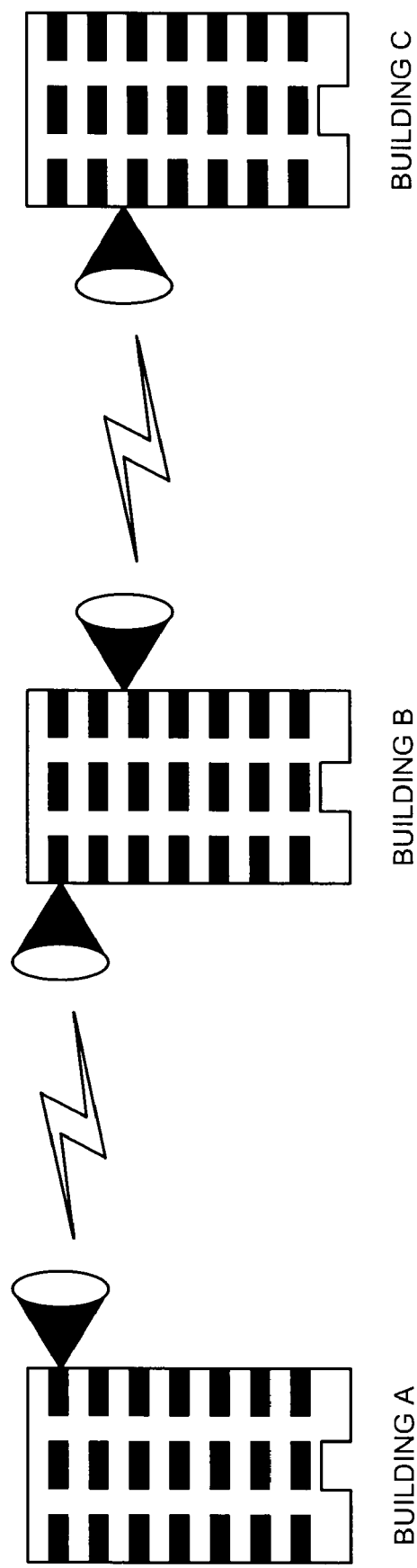
FIG. 59 is a diagram for explaining a conventional technology.
Figure 60:
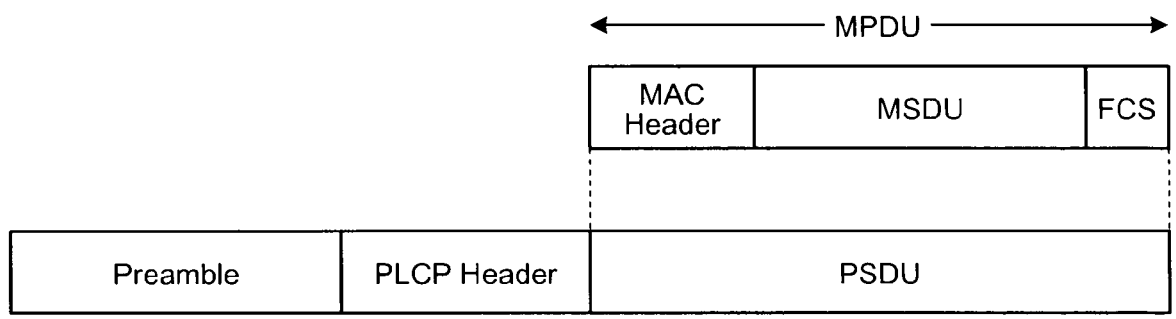
FIG. 60 is a diagram for explaining a problem in the conventional technology.

When device discovery between wireless terminal stations is executed, MCTA/CTA allocated from the wireless base station can be used. As an example, as shown in FIG. 58, first, the wireless terminal station 2 receives a DD frame (a DD packet) transmitted from the wireless terminal station 1 with an omni-directional beam while switching a directional beam (number) to thereby specify a directional beam number (b22) used in communication with the wireless terminal station 1. Subsequently, the wireless terminal station 1 receives a DD packet transmitted from the wireless terminal station 2 with an omni-directional beam while switching a directional beam (number) to thereby specify a number (b13) of a directional beam used in communication with the wireless terminal station 2. The DD frame used here does not include directional beam number information on a transmission side. The DD frame includes information indicating that the transmission side uses an omni-directional antenna.

In the example shown in FIG. 58, a sequence in which, in a period of MCTA/CTA#2, the wireless terminal station 1 receives the DD packet transmitted by the wireless terminal station 2 with the omni-directional bema while switching a directional beam (number) to specify the number (b13) of the beam number used by the wireless terminal station 1 is shown. However, because the number (b22) of the directional beam used by the wireless terminal station 2 is already specified in a period of CMTA/CTA#1, the wireless terminal station 2 can transmit the DD packet using the specified directional beam (the directional beam with the number b22) instead of an omni-directional beam. As explained above, when a directional beam is used, because transmission speed is lower than that at the time when an omni-directional beam is used. Therefore, an effect that time required for device discovery is reduced can be expected. Processing after the operation for specifying an omni-directional beam (number) is finished is the same as that in the first embodiment explained above (see FIG. 15, etc.).

As explained above, device discovery performed by using an omni-directional beam explained in this embodiment can be applied not only to communication between the wireless base station and the wireless terminal station but also to communication between the wireless terminal stations.

In this way, in the device discovery operation in this embodiment, signals (an announcement signal and a DD packet) for a partner side to specify a directional beam used in data communication or the like are transmitted with an omni-directional beam. Consequently, a transmission side of the announcement signal and the DD packet does not transmit the signals while switching a directional beam. Therefore, processing is simplified.

INDUSTRIAL APPLICABILITY

As explained above, the wireless communication system according to the present invention is useful for wireless communication performed by using a beam having directivity and is suitable for, in particular, control of a directional antenna (a directional beam) used for wireless communication performed by using a millimeter wave band.

The invention claimed is:

1. A wireless communication system including a wireless terminal station that performs a communication using directional beams formed in a plurality of directions, wherein
the wireless terminal station includes at least
a first wireless terminal station that transmits beam transmission direction identification information in all directions, in which the information can be transmitted, over a period designated from a wireless base station covering the first wireless terminal station at a beam switching execution interval notified to the wireless base station in advance, and
a second wireless terminal station that performs, when the second wireless terminal station is covered by the wireless base station together with the first wireless terminal station, a reception operation for the transmission direction identification information, which is transmitted from the first wireless terminal station, in all reception directions over a period designated from the wireless base station at an antenna switching execution interval designated from the wireless base station, combines reception direction identification information and the transmission direction identification information at the reception of the transmission direction identification information to specify the combined reception direction identification information and the transmission direction identification information as directivity direction combination information, and transmits the directivity direction combination information to the first wireless terminal station, and
the wireless communication system further comprises a wireless base station that determines the period and the antenna switching execution interval based on a number of directivity directions of directional beams notified from the first and second wireless terminal stations and the beam switching execution interval, and
the first wireless terminal station and the second wireless terminal station form the directional beams in directions indicated by the directivity direction combination information to thereby perform a direct communication.

2. The wireless communication system according to claim 1, wherein
the wireless base station estimates a location of the first wireless terminal station and a location of the second wireless terminal station based on a communication history and notifies, taking into account a result of the estimation, the first wireless terminal station and the second wireless terminal station of a directional beam using an order of the first wireless terminal station in transmitting the transmission direction identification information and receiving a direction switching order of the second wireless terminal station in receiving the transmission direction identification information together with the period and the antenna switching execution interval,
the first wireless terminal station transmits the transmission direction identification information in respective directions in the directional beam using the order notified from the wireless base station, and
the second wireless terminal station performs the reception operation for the transmission direction identification information in the respective directions in the receiving direction switching order notified from the wireless base station.

3. The wireless communication system according to claim 1, wherein the first wireless terminal station transmits the directional beam identification information using a device discovery frame independently defined as a frame for transmitting the transmission direction identification information with the directional beam identification information included in a frame body section of the device recovery frame.

4. The wireless communication system according to claim 1, wherein the first wireless terminal station transmits the directional beam identification information using a device discovery frame independently defined as a frame for transmitting the transmission direction identification information with the directional beam identification information included in a header section of the device recovery frame and a frame body section of the device recovery frame omitted.

5. The wireless communication system according to claim 1, wherein the first wireless terminal station transmits the directional beam identification information using a device discovery frame independently defined as a frame for transmitting the transmission direction identification information with the directional beam identification information included in a preamble section of the device recovery frame and a header section and a frame body section of the device recovery frame omitted.

6. The wireless communication system according to claim 1, wherein when the wireless base station has a function of selectively using a directional beam, a direction of which can be switched, and an omni-directional beam, the wireless base station performs transmission of an announcement signal and reception of the connection request signal from the wireless terminal station using the omni-directional beam, when the connection request signal is received from the wireless terminal that receives the announcement signal, instructs, using the omni-directional beam, the wireless terminal station to transmit a predetermined signal and thereafter executes reception operation for the predetermined signal transmitted from the wireless terminal station while switching direction of the directional beam, and specifies the direction of the directional beam at the reception of the predetermined signal as a direction of a directional beam used in communication with the wireless terminal station.

7. The wireless communication system according to claim 1, wherein when the wireless base station has a function of selectively using a directional beam,
the first wireless terminal station transmits, using the omni-directional beam, transmits a first predetermined signal, which is held by the first wireless terminal station, over a first period designated from a wireless base station, which covers the first wireless terminal station, at a first interval notified to the wireless base station in advance,
the second wireless terminal station performs, over the first period, reception operation for the first predetermined signal transmitted from the first wireless terminal station while changing direction of the directional beam at the first interval designated from the wireless base station, specifies direction in receiving the first predetermined signal as direction of a directional beam used in direct communication with the first wireless terminal station, and transmits, using the omni-directional beam or the directional beam directed to the specified direction, a second predetermined signal, which is held by the second wireless terminal station, over a second period designated from the wireless base station at a second interval notified to the wireless base station in advance, and
the first wireless terminal station performs, after finishing the transmission operation for the first predetermined signal, reception operation for the second predetermined signal, which is transmitted from the second wireless terminal station, over the second period while switching direction of the directional beam at a second interval designated from the wireless base station.

8. The wireless communication system according to claim 1, wherein the first wireless terminal station has a function of reducing a protocol overhead by aggregating and transmitting a plurality of frames.

9. The wireless communication system according to claim 1, wherein the second wireless terminal station has an aggregate media-access-control protocol data unit function by including a fragmentation control field necessary in carrying out frame aggregation, a frame type field, a frame sub-type field, and a length field in a frame of a physical format in which a media-access-control header is included in a physical-layer-convergence-protocol header.

10. The wireless communication system according to claim 9, wherein the second wireless terminal station can efficiently aggregate a plurality of kinds of frames and perform highly-efficient transmission by using the frame type field and the frame sub-type field.

11. A wireless communication system including a wireless terminal station that performs a communication using directional beams formed in a plurality of directions, wherein
the wireless terminal station includes at least
a first wireless terminal station that transmits beam transmission direction identification information in all directions, in which the information can be transmitted, over a period designated from a wireless base station covering the first wireless terminal station at a beam switching execution interval notified to the wireless base station in advance, and
a second wireless terminal station that performs, when the second wireless terminal station is covered by the wireless base station together with the first wireless terminal station, a reception operation for the transmission direction identification information, which is transmitted from the first wireless terminal station, in all reception directions over a period designated from the wireless base station at an antenna switching execution interval designated from the wireless base station, combines reception direction identification information and the transmission direction identification information at the reception of the transmission direction identification information to specify the combined reception direction identification information and the transmission direction identification information as directivity direction combination information, and transmits the directivity direction combination information to the wireless base station, and
the wireless communication system further comprises a wireless base station that determines the period and the antenna switching execution interval based on a number of directivity directions of directional beams notified from the first and second wireless terminal stations and the beam switching execution interval, and when the directivity direction combination information is received from the second wireless terminal, notifies the first wireless terminal station of the received directivity direction combination information, and
the first wireless terminal station and the second wireless terminal station form the directional beams in directions indicated by the directivity direction combination information to thereby perform a direct communication.

12. The wireless communication system according to claim 11, wherein
the wireless base station estimates a location of the first wireless terminal station and a location of the second wireless terminal station based on a communication history and notifies, taking into account a result of the estimation, the first wireless terminal station and the second wireless terminal station of a directional beam using an order of the first wireless terminal station in transmitting the transmission direction identification information and receiving a direction switching order of the second wireless terminal station in receiving the transmission direction identification information together with the period and the antenna switching execution interval,
the first wireless terminal station transmits the transmission direction identification information in respective directions in the directional beam using the order notified from the wireless base station, and
the second wireless terminal station performs the reception operation for the transmission direction identification information in the respective directions in the receiving direction switching order notified from the wireless base station.

13. The wireless communication system according to claim 11, wherein the first wireless terminal station transmits the directional beam identification information using a device discovery frame independently defined as a frame for transmitting the transmission direction identification information with the directional beam identification information included in a header section of the device recovery frame and a frame body section of the device recovery frame omitted.

14. The wireless communication system according to claim 11, wherein when the wireless base station has a function of selectively using a directional beam, a direction of which can be switched, and an omni-directional beam, the wireless base station performs transmission of an announcement signal and reception of the connection request signal from the wireless terminal station using the omni-directional beam, when the connection request signal is received from the wireless terminal that receives the announcement signal, instructs, using the omni-directional beam, the wireless terminal station to transmit a predetermined signal and thereafter executes reception operation for the predetermined signal transmitted from the wireless terminal station while switching direction of the directional beam, and specifies the direction of the directional beam at the reception of the predetermined signal as a direction of a directional beam used in communication with the wireless terminal station.

15. The wireless communication system according to claim 11, wherein when the wireless base station has a function of selectively using a directional beam, a direction of which can be switched, and an omni-directional beam, the wireless base station transmits an announcement signal using the omni-directional beam, executes, while switching direction of the directional beam, operation for receiving a connection request signal from the wireless terminal station that receives the announcement signal, and specifies, when the connection request signal is received, the direction of the directional beam used during the reception as a direction of a directional beam used in communication with a transmission source wireless terminal station of the connection request signal.

16. The wireless communication system according to claim 11, wherein the wireless terminal station performs reception operation for an announcement signal transmitted from the wireless base station while switching direction of the directional beam and specifies direction in receiving the announcement signal as direction of a directional beam used in communication with the wireless base station.

17. The wireless communication system according to claim 11, wherein when the wireless base station has a function of selectively using a directional beam, the first wireless terminal station transmits, using the omni-directional beam, transmits a first predetermined signal, which is held by the first wireless terminal station, over a first period designated from a wireless base station, which covers the first wireless terminal station, at a first interval notified to the wireless base station in advance, the second wireless terminal station performs, over the first period, reception operation for the first predetermined signal transmitted from the first wireless terminal station while changing direction of the directional beam at the first interval designated from the wireless base station, specifies direction in receiving the first predetermined signal as direction of a directional beam used in direct communication with the first wireless terminal station, and transmits, using the omni-directional beam or the directional beam directed to the specified direction, a second predetermined signal, which is held by the second wireless terminal station, over a second period designated from the wireless base station at a second interval notified to the wireless base station in advance, and the first wireless terminal station performs, after finishing the transmission operation for the first predetermined signal, reception operation for the second predetermined signal, which is transmitted from the second wireless terminal station, over the second period while switching direction of the directional beam at a second interval designated from the wireless base station.

18. The wireless communication system according to claim 11, wherein the first wireless terminal station has a function of reducing a protocol overhead by aggregating and transmitting a plurality of frames.

19. The wireless communication system according to claim 11, wherein the first wireless terminal station has an aggregate media-access-control protocol data unit function by including a fragmentation control field necessary in carrying out frame aggregation, a frame type field, a frame sub-type field, and a length field in a frame of a physical format in which a media-access-control header is included in a physical-layer-convergence-protocol header.

20. A wireless communication system including a wireless terminal station that performs a communication using directional beams formed in a plurality of directions, wherein the wireless terminal station includes at least a first wireless terminal station that transmits beam transmission direction identification information in all directions, in which the information can be transmitted, over a period designated from a wireless base station covering the first wireless terminal station at a beam switching execution interval notified to the wireless base station in advance, and a plurality of second wireless terminal stations each performing, when the second wireless terminal station is covered by the wireless base station together with the first wireless terminal station, a reception operation for the transmission direction identification information, which is transmitted from the first wireless terminal station, in all reception directions over a period designated from the wireless base station at an antenna switching execution interval designated from the wireless base station, combines reception direction identification information and the transmission direction identification information at the reception of the transmission direction identification information to specify the combined reception direction identification information and the transmission direction identification information as directivity direction combination information, and transmits the directivity direction combination information to the wireless base station, and the wireless communication system further comprises a wireless base station that determines the period and the antenna switching execution interval based on a number of directivity directions of directional beams notified from the first and second wireless terminal stations and the beam switching execution interval, and when the directivity direction combination information is received from the second wireless terminal, notifies the first wireless terminal station of the received directivity direction combination information, and the first wireless terminal station forms the directional beams in a direction indicated by a corresponding directivity direction combination information among the second wireless terminal stations to thereby perform a direct communication.

* * * * *